United States Patent
Zarrabizadeh

(10) Patent No.: US 7,630,509 B2
(45) Date of Patent: Dec. 8, 2009

(54) COLOR SELECTION SCHEME FOR DIGITAL VIDEO WATERMARKING

(75) Inventor: Mohammad Hossein Zarrabizadeh, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 969 days.

(21) Appl. No.: 10/673,893

(22) Filed: Sep. 29, 2003

(65) Prior Publication Data

US 2005/0069168 A1     Mar. 31, 2005

(51) Int. Cl.
*G06K 9/00* (2006.01)
*H04N 1/40* (2006.01)

(52) U.S. Cl. .................. 382/100; 382/166; 358/3.28

(58) Field of Classification Search .............. 382/100, 382/168, 163–167, 232, 236, 237, 243, 244, 382/251, 253, 254, 274, 275, 276, 305, 248; 375/240.12; 358/3.28
See application file for complete search history.

(56) References Cited

U.S. PATENT DOCUMENTS

| | | | | |
|---|---|---|---|---|
| 6,298,166 B1 * | 10/2001 | Ratnakar et al. | ............. | 382/248 |
| 6,373,960 B1 * | 4/2002 | Conover et al. | ............. | 382/100 |
| 6,519,350 B1 | 2/2003 | Van Overveld et al. | ..... | 382/100 |
| 6,590,996 B1 * | 7/2003 | Reed et al. | ................... | 382/100 |
| 6,829,301 B1 * | 12/2004 | Tinker et al. | ........... | 375/240.12 |
| 7,006,656 B2 * | 2/2006 | Fridrich et al. | .............. | 382/100 |
| 7,072,487 B2 * | 7/2006 | Reed et al. | ................... | 382/100 |
| 7,154,638 B1 * | 12/2006 | Lapstun et al. | ............. | 358/3.28 |
| 2002/0027612 A1 | 3/2002 | Brill et al. | .................... | 348/473 |
| 2004/0136562 A1 | 7/2004 | Sarraf et al. | ................ | 382/100 |

FOREIGN PATENT DOCUMENTS

EP      1 073 015 A2      1/2001

OTHER PUBLICATIONS

U.S. Appl. No. 10/673,892, filed Sep. 29, 2003, Zarrabizadeh.
U.S. Appl. No. 10/673,894, filed Sep. 29, 2003, Zarrabizadeh.

* cited by examiner

*Primary Examiner*—Seyed Azarian
(74) *Attorney, Agent, or Firm*—E. J. Rosenthal

(57) ABSTRACT

Determining a chrominance portion to be watermarked employs a perception-based table that indicates for various pixel values which of the chrominance portions, if any, should be selected for watermarking. Only the Y, U, and V values of a pixel are needed to access the table and determine which chrominance portion should be selected. However, the table may be represented such that it may be accessed using only R, G, and B values. The table may be modified so that it may indicate which of U or V should be selected, or that neither should be selected, indicating that this pixel should not be watermarked at all. Advantageously, the table may be simplified by employing some processing, because a large section of the table may be replaced by a simple test on the pixel values, e.g., U<128, to determine the selected chrominance portion.

34 Claims, 12 Drawing Sheets

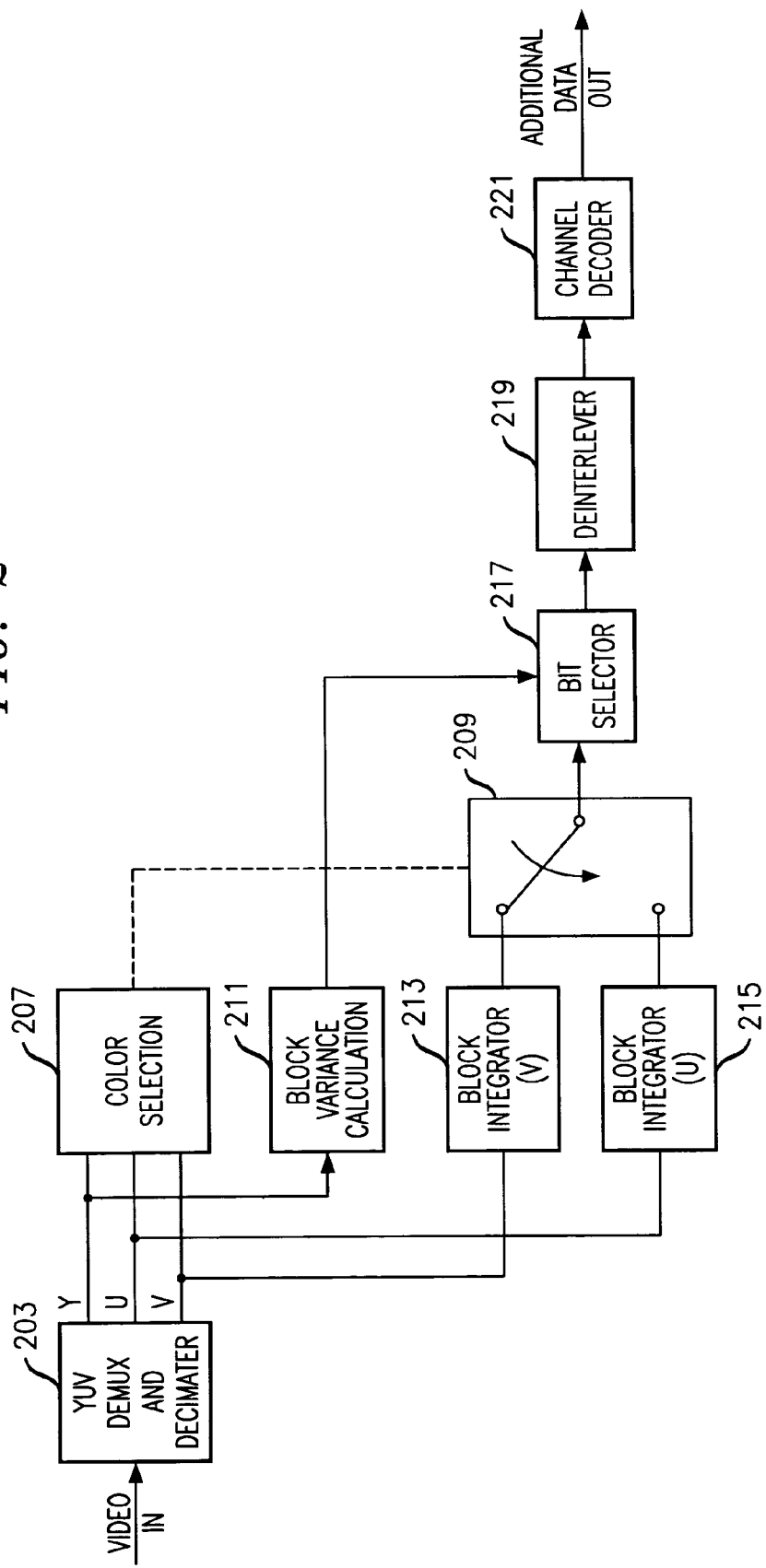

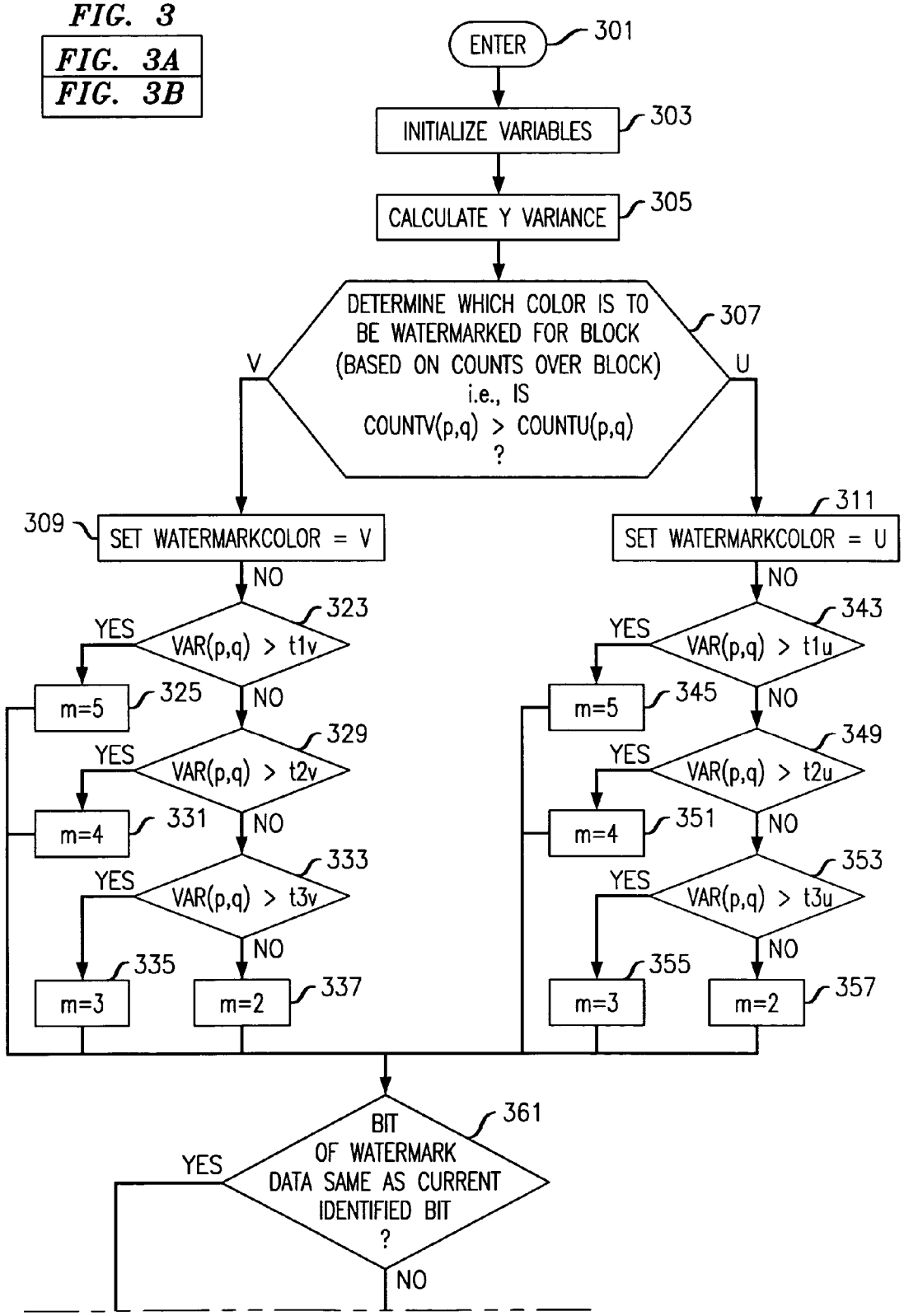

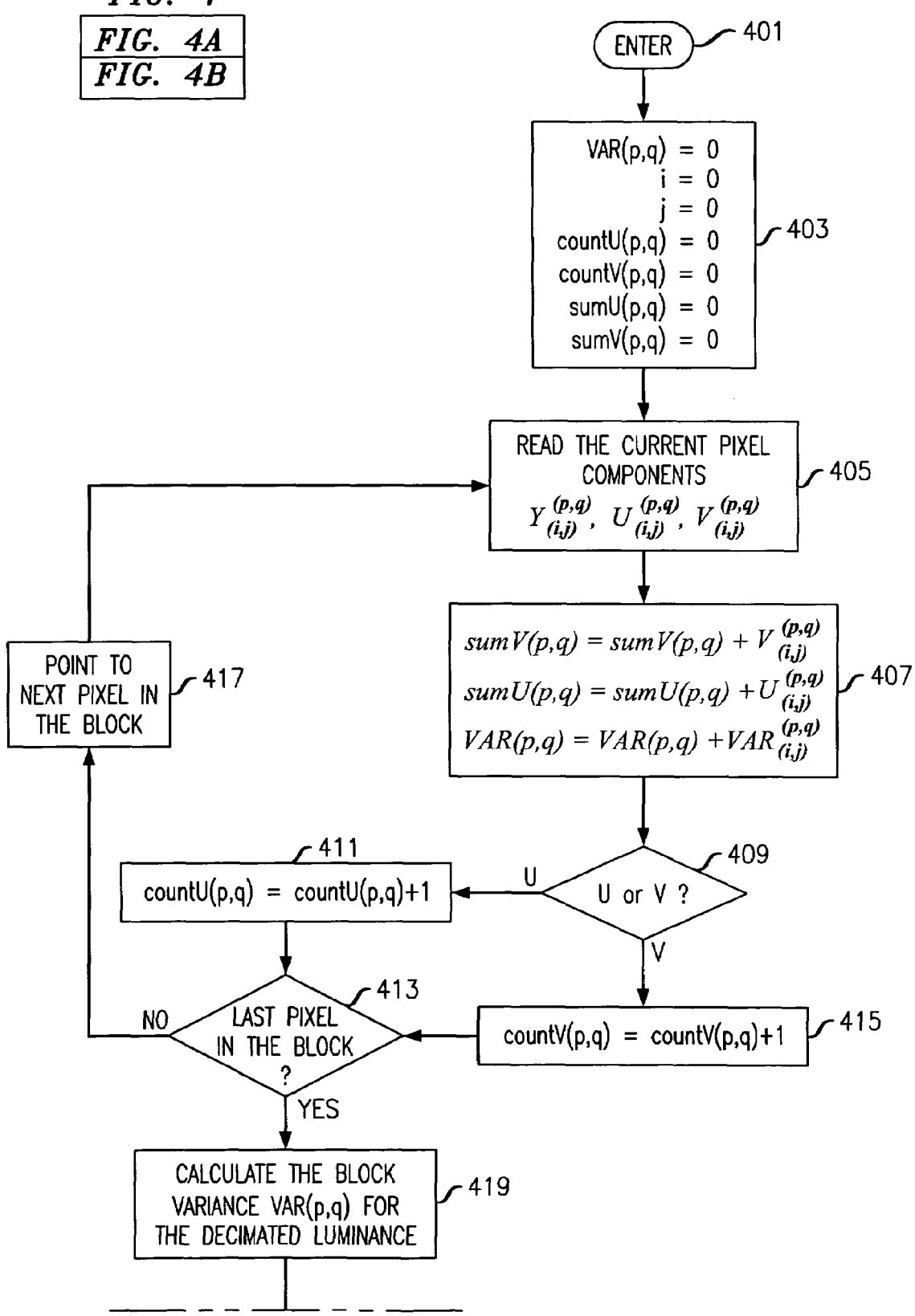

COLOR SELECTION SCHEME FOR DIGITAL VIDEO WATERMARKING

CROSS-REFERENCE TO RELATED APPLICATIONS

U.S. patent applications Ser. No. 10/673,893 and Ser. No. 10/673,894 were filed concurrently herewith.

TECHNICAL FIELD

This invention relates to the art of watermarking digital video, and more particularly, to selecting which chrominance portion should be watermarked.

BACKGROUND OF THE INVENTION

Watermarking of video signals is, generally, the inclusion within the video itself of additional information. This can be useful to provide an embedded identification of the source of a video, to keep track of where and for how long a video is played, and to communicate information via the video to an ancillary device. Prior art techniques for watermarking video signals typically encoded the additional information in an analog format within the video itself using the luminance of the video to carry the additional information. However, the human visual system is very sensitive to the luminance signal, and so a person viewing a watermarked signal easily perceives distortion which is caused by the changes made to the video signal to convey the additional information when there is an attempt to increase the bit rate of the additional information beyond a certain point, e.g., beyond 120 bits per second. Thus, although the prior art's techniques of watermarking of video signals has had some success in certain applications, such success has been limited by the extremely small bit rate that is achievable without perceivable distortion by a person viewing the video signal carrying the additional information.

In previously filed U.S. patent application Ser. No. 10/342704, which is incorporated by reference as if set forth fully herein, I, along with my coinventor, recognized that the human visual system is much less sensitive to chrominance than to luminance. Therefore, we developed a system for digital watermarking a video signal that inserts the additional information of the watermarking signal on the chrominance component of the video signal rather than on its luminance signal. Thus, the additional information is "impressed" upon the chrominance component of the video signal. Advantageously, although there may be significant distortion of the chrominance component, especially when the additional information has higher bit rates than is achievable without perceivable distortion by the prior art, nevertheless such distortion will not be detected by the human visual system, provided it is appropriately managed. Thus, the additional information can have a higher bit rate as compared with that achievable by the prior art, e.g., bit rates greater than 150 bits per second can be achieved. Further advantageously, the additional data can be recovered from the video signal even after the video signal watermarked with the additional data is compressed using the Motion Picture Expert Group (MPEG)-1 and MPEG-2 encoding systems.

The particular chrominance portion selected to carry the watermarking for any pixel is selected in U.S. patent application Ser. No. 10/342704 by a color selection unit. The color selection unit determines the selected chrominance component as a function of the RGB and the YUV representations of the pixel using a prescribed formula. Since digital video is often transmitted only in YUV format, to use the system of U.S. patent application Ser. No. 10/342704 with such YUV formatted video, it is necessary to develop therefrom the corresponding RGB formatted video. Disadvantageously, to do so requires considerable processing power. Furthermore, although it is very good, it was later discovered that the mathematical model underlying the formula employed in the selection process of U.S. patent application Ser. No. 10/3427 does not necessarily always produce flicker-free results.

SUMMARY OF THE INVENTION

In accordance with the principles of the invention, the process of determining the chrominance portion to be watermarked may be improved by employing a perception-based table that indicates for various pixels which of the chrominance portions, if any, should be selected for watermarking. In accordance with an aspect of the invention, only values for Y, U, and V of a pixel may be required to access the table and determine which chrominance portion should be selected. Advantageously, when the digital video is in YUV format, the use of R, G, and B is not required to select the chrominance portion, thereby reducing significantly the necessary processing power. In accordance with another aspect of the invention, the table may be represented such that it may be accessed using only R, G, and B values, so that there is no need to convert a source video in RGB format to YUV format in order to perform color selection.

In one embodiment of the invention, the table is accessed by supplying Y, U, and V values, which may be decimated and/or quantized, and retrieving from the table an indication of whether U or V should be selected. In accordance with yet another aspect of the invention, the table may be modified so that it may indicate which of U or V should be selected, or that neither should be selected, e.g., when the color of the pixel is dark blue and/or dark purple, indicating that this pixel should not be watermarked at all.

In accordance with another aspect of the invention, a mixed-mode of processing may be employed using the table and some processing. Advantageously, the table may be simplified, e.g., reduced by half its size, because a large section of the table may be replaced by a simple test on the pixel values, e.g., U<128, to determine the selected chrominance portion.

Advantageously, the table may be changed on the fly without changing the underlying process, e.g., computer code, employed in the selection process.

BRIEF DESCRIPTION OF THE DRAWING

In the drawing:

FIG. 2 shows an exemplary receiver for recovering the additional data of a video signal containing digital watermarking on the chrominance signal thereof, in accordance with the principles of the invention;

FIGS. 3A and 3B, when connected together as shown in FIG. 3, show an exemplary process for use in watermarking one of the chrominance portions with additional data, in accordance with the principles of the invention;

FIGS. 4A and 4B, when connected together as shown in FIG. 4, show an exemplary process for extracting the additional information from a digitally watermarked video signal in which the additional information that constitutes the watermarking signal within the video signal has been impressed upon the chrominance component, in accordance with the principles of the invention;

DETAILED DESCRIPTION

Figure 1:
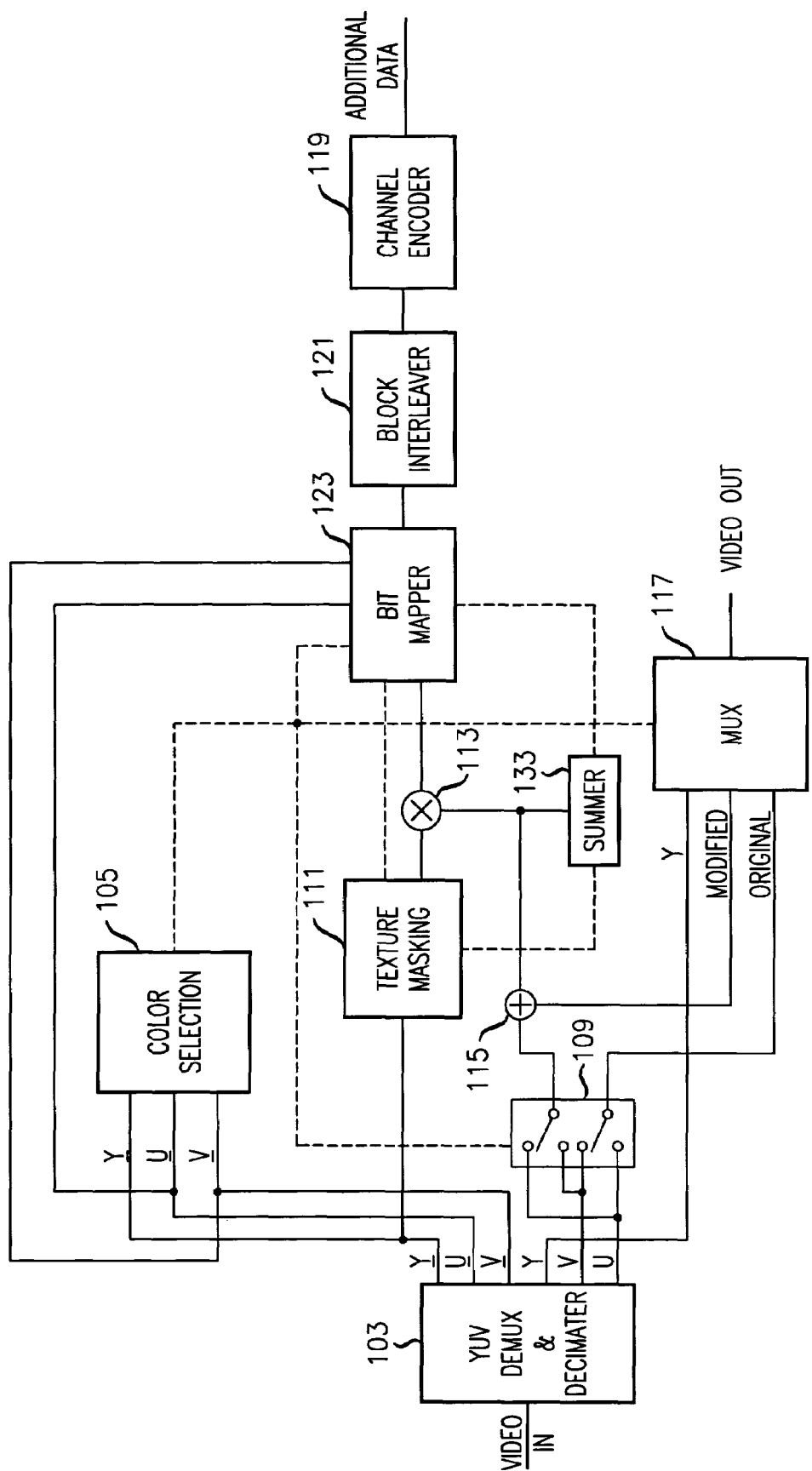
FIG. 1 shows an exemplary transmitter for digital watermarking a video signal, in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware which is expressly or implicitly shown.

Unless otherwise explicitly specified herein, the drawings are not drawn to scale.

In the description, identically numbered components within different ones of the FIGs. refer to the same components.

FIG. 1 shows exemplary transmitter 101 for digital watermarking a video signal in accordance with the principles of the invention, by having one or more bits of watermark data carried via an average value of the chrominance component of each of various blocks of the video signal, on up to a per-frame basis.

Shown in FIG. 1 are a) YUV demultiplexer (demux) and decimator 103, b) color selection 105, c) double-pole, double-throw switch 109, d) texture masking unit 111, e) multiplier 113, f) adder 115, g) multiplexer (mux) 117, h) bit mapper 123, and i) summer 133. Also shown in FIG. 1 are optional j) channel encoder 119, and k) block interleaver 121.

YUV demultiplexer and decimator 103 receives a video signal to be watermarked, i.e., to have additional information added thereto. YUV demultiplexer and decimator 103 may work with digital video, e.g., video formatted according to the Serial Digital Interface (SDI) standard. As will be recognized by those of ordinary skill in the art, any video signal not initially in an appropriate digital format may be converted thereto using conventional techniques.

YUV demultiplexer and decimator 103 demultiplexes the luminance (Y) component of the video and its chrominance component. The chrominance component of the video signal has two portions U and V, where U is the differential blue portion and V is the differential red portion.

Much of the processing to embed the additional data on the chrominance component is, preferably, performed with a special decimated video format in which for each original 2×2 luminance block of video, had the original block been in 4-4-4 representation, there remains only one Y, one U, and one V value. To this end, in the event the input video signal is actually in the so-called 4-4-4 format, the image is appropriately decimated by YUV demultiplexer and decimator 103 so that for each original 2×2 luminance block there is one Y, one U, and one V value. Similarly, in the event the input video signal is in the so-called "4-2-2" format, i.e., the luminance is full resolution while the chrominance portions are a) full resolution vertically only and b) half resolution horizontally, YUV demultiplexer and decimator 103 decimates the luminance component horizontally and vertically as well as decimates each chrominance portion only vertically. Likewise, in the event the input video signal is in the so-called 4-2-0 format, i.e., the luminance component is full resolution while the chrominance portions are each only half resolution both vertically and horizontally, the luminance component of the image is decimated by YUV demultiplexer and decimator 103 so that for each original 2×2 luminance block had the original block been in 4-4-4 representation there remains only one Y, one U, and one V value.

The preferred decimated video format may be supplied as an output to color selection 105. Thus, preferably, regardless of the format of the input video signal, further processing by the system preferably may be based on the decimated video signal such that for every 2×2 block of full resolution luminance pixels of the original input video signal there is one Y, one U, and one V value. Those of ordinary skill in the art will be able to develop their own methods, should they choose to do so, of developing one Y, one U, and one V value for every 2×2 block of luminance pixels.

In order to know the format of the original video, a) an operator may indicate to YUV demultiplexer and decimator 103 the particular format of the video supplied to transmitter 101, b) the format of the video may be detected directly from the video using conventional techniques, or c) the information may be supplied from a higher layer processor which is supplying the input video signal.

YUV demultiplexer and decimator 103 may also supply a second set of YUV outputs in the full format of the original input video signal to double-pole, double-throw switch 109.

Color selection 105 determines, for any particular pixel, on which portion of the chrominance component, i.e., on the U portion or the V portion, a change in value, if necessary, may be better accommodated without introducing a visible artifact. In one embodiment of the invention, color selection 105 is based upon a look-up table as described further hereinbelow. Alternatively, it may be based all or in part, on various computations, such as in prior U.S. patent application Ser. No. 10/342,704.

The output of color selection 105 is also used to control the position of double-pole, double-throw switch 109. More specifically, the output of color selection 105 is set so that double-pole, double-throw switch 109 1) supplies, to adder 115, the portion of the chrominance component that has been selected to carry the watermark data; and 2) supplies, to YUV multiplexer 117, the portion of the chrominance component that was not selected. The output of color selection 105 is also supplied to multiplexer 117 and to bit mapper 123 for use as described hereinbelow.

Texture masking unit 111 analyzes the texture of the luminance area around each pixel in the decimated format supplied as output by YUV demux and decimator 103 to determine the maximum change in value that can be accommodated by that pixel without introducing visible artifacts, and supplies as an output a weight indicative thereof. The weight value may be coded, e.g., taking integral values from 1 to 5. Other values may be used, e.g., experiments have indicated that a value of up to 20 may be used in busy areas without visual degradation. The weight is supplied to multiplier 113. Texture masking unit 111 may put out a smaller value than the maximum distortion that can be introduced into a pixel as will be described hereinbelow.

Note that the particular values used are at least partially dependent on the number of bits used to represent each Y, U, and V value. For example, the foregoing suggested weight values of 1 to 5, and a weight of even up to 20, are for Y, U, and V being 8 bit values. Those of ordinary skill in the art will readily recognize that the values employed for 8 bits may be scaled to 10 bits by multiplying by 4, e.g., shifting the value to the left two times. Likewise, other numbers of bits used for Y, U, and V can be similarly accommodated.

Multiplier 113 multiplies the weight received from texture masking unit 111 by a value related to the information to be transmitted as part of this pixel, which is supplied by bit mapper 123. For example, the value supplied by bit mapper 123 may be −1, 0, or 1. The product produced by multiplier 113 is supplied to adder 115 and summer 133.

Texture masking unit 111 is responsive to summer 133. In this regard, as noted, texture masking unit 111 may put out a smaller weight value than the change in value that can be introduced into a pixel in the event that it receives a signal to that effect from summer 133. More specifically, summer 133 adds the values supplied by texture masking unit 111 for each block. Summer 133 supplies as an output to texture masking unit 111 a maximum value that texture masking unit 111 can use as its output weight for the pixel currently being processed. The maximum value supplied by summer 133 is the lesser of the a) maximum weight value that can be accommodated by a pixel based on the texture surrounding it and b) the difference between a value supplied by bit mapper 123 to summer 133 for the block and the current sum for the block. Thus, once the sum equals the value supplied by bit mapper 123 to summer 133 for the block, texture masking unit 111 outputs a zero for each remaining pixel of the block.

Adder 115 produces a modified chrominance portion by adding the value supplied by multiplier 113 to the value of the portion of the chrominance which was selected by color selection 105 to carry the additional information for the pixel. As indicated, the portion of the chrominance that was selected by color selection 105 to carry the additional information is passed to adder 115 by double-pole, double-throw switch 109. The modified chrominance portion supplied by adder 115 is supplied to multiplexer 117.

Texture masking unit 111, multiplier 113, bit mapper 123 and summer 133 cooperate to effectively upsample the value being added to each pixel of the special processing resolution to match the format of the chrominance of the original video signal. To this end, the resulting upsampled values may be added to the selected chrominance portion of each pixel in the original video signal that corresponds to the location of a pixel in the special reduced resolution format used for processing. For example, if the original video signal is in 4-2-2 format, the values determined to be added to each of the pixels of a block in the special processing format are duplicated on a per-line basis so as to create a block of values to be added that has 8 pixels per line and 16 lines per block. In this block, each of the lines of the nonoverlapping groups of 2 consecutive lines has identical values to be added. Such a block corresponds in size to the original block of the selected chrominance portion of the original video in 4-2-2 format. Each value of the resulting upsampled block is added to the selected chrominance portion of the respective, like positioned pixel in the original video signal by adder 115. Those of ordinary skill in the art will readily be able to perform similar block conversions for different formats. Note that for those pixels of a block that color selection 105 did not determine that the selected chrominance portion could better accommodate a change, the value added will be zero. If the original video signal is in 4-2-0 format, no upsampling is required.

In another embodiment of the invention, only the decimated special processing resolution format is processed. The resulting modified chrominance portion is then upsampled, e.g., in multiplexer 117. However, doing so may result in some degradation of the original video signal, although such degradation need not be visible.

Multiplexer 117 receives the original luminance component (Y) and the unmodified chrominance portion that was supplied from YUV demultiplexer and decimator 103 via double-pole, double-throw switch 109. Multiplexer 117 also receives the modified chrominance portion from adder 115. Multiplexer 117 then multiplexes together the original luminance component (Y), the unmodified chrominance portion, and the modified chrominance portion. Multiplexer 117 knows on which lead it receives the modified portion of the chrominance component and on which lead it receives the unmodified portion of the chrominance component by virtue of receiving the output of color selection 105. In accordance with an aspect of the invention, the resulting video signal is supplied as the watermarked output video signal.

Those of ordinary skill in the art will be able to develop embodiments of the invention in which the additional data is added to the original chrominance signal portion rather than the decimated version thereof, so that upsampling will not be required.

As indicated above, the binary data value, i.e., 1 or 0, of the additional information which is to be transmitted for each block may be supplied directly to bit mapper 123 for use as the watermark data or it may first be processed to facilitate the processing and recovery of the information at the receiver. Such exemplary processing may be performed by optional channel encoder 119 and block interleaver 121.

Channel encoder 119 receives the additional data that is desired to be embedded in the video stream. This data is then encoded, e.g., using a forward error correcting coding scheme. Such forward error correcting scheme may be any conventional forward error correcting scheme, such as convolutional encoding, e.g., Viterbi encoding or turbo encoding, or it may be any newly developed coding scheme. In one exemplary embodiment of the invention, convolutional coding of rate one-half is used. As a result of such coding, two bits are produced for every bit of the original bit stream. The channel encoded bit stream is supplied as an output by channel encoder 119 to block interleaver unit 121.

Block interleaver 121 rearranges the order of the bits of the channel encoded bit stream in order to randomly distribute the data. Doing so helps reduce the chance that adjacent sections of the channel encoded bit stream are lost, e.g., due to bursts of noise or other factors, which would then make it difficult to recover such data at the receiver from the remaining, actually received data. In an exemplary embodiment of the invention, the number of bits that are interleaved as a unit is equal to the number of blocks in a frame. A block interleaver may be implemented by writing data sequentially to the rows of a block left to right, at the end of each row starting again at the leftmost position of the next row down, and then reading the data by starting at the leftmost topmost position of the block and reading down a column until the end of the column is reached at which point reading continues at the top of the next column. A block interleaver of 45 rows by 30 columns has proven effective for a picture size of 720 by 480 pixels. For different resolutions, those of ordinary skill in the art will be readily able to develop comparable block encoders. The interleaved channel encoded bit stream is supplied as an output by bit interleaver 121 to bit mapper 123.

In accordance with an aspect of the invention, the data bit supplied by block interleaver 121 is impressed as the watermark data, under the control of bit mapper 123, upon at least one block of at least one frame of the original video signal. In accordance with the principles of the invention, bit mapper 123 controls the insertion of the watermark data into one of the bit positions of the average value of at least a selected one of the chrominance portions of each block upon which the data is to be impressed, thus effectively replacing the bit at that bit position.

For example, when the watermark data is to be carried in the least significant bit of the integer portion of the average of the selected chrominance portion of the block, the value that needs to be added to the average value is 0 or 1. Zero is added when the least significant bit of the integer portion of the average value is already the same as the watermark data bit to be carried and 1 is added when the least significant bit of the integer portion of the average value is the complement of the watermark data bit to be carried. When the watermark data is to be carried in the second to the least significant bit of the integer portion of the average of the selected chrominance portion of the block, the value of the data to be added to the pixel is −1, 0, or 1. Zero is added when the second least significant bit of the integer portion of the average value is already the same as the watermark data bit to be carried and 1 or −1 is added when the second least significant bit of the integer portion of the average value is the complement of the watermark data bit to be carried. Whether 1 or −1 is added depends on which will cause the smallest change to the average value while changing the second least significant bit of the integer portion of the average value to its complement. Using the second to least significant bit the data to be embedded is more likely to survive encoding by MPEG or a similar process. When the data to be placed in the third to the least significant bit of the integer portion of the average of the selected chrominance portion of the block, the value of the data to be added to the pixel is −2, −1, 0, 1, or 2. Zero is added when the third least significant bit of the integer portion of the average value is already the same as the watermark data bit to be carried and is −2, −1, 1, or 2 is added when the third least significant bit of the integer portion of the average value is the complement of the watermark data bit to be carried. Whether is −2, −1, 1, or 2 is added depends on which will cause the smallest change to the average value while changing the third least significant bit of the integer portion of the average value to its complement. Using the third to least significant bit the data to be embedded is even more likely to survive encoding by MPEG or a similar process to achieve adequate results. From the foregoing, those of ordinary skill in the art will readily be able to determine the values to be added for more significant bit positions which are determined by the user or the system.

To this end, bit mapper 123 develops a value that is distributively added to a selected chrominance portion of the pixels of a block such that doing so changes the average of the value of that chrominance portion for that block so that the bit supplied by block interleaver 121 that is being impressed is placed in a selected bit position of the average value of the selected chrominance portion. This value is the value to be added to the average value of the selected chrominance portion to place the watermark data bit in the appropriate bit position multiplied by the number of pixels in a block. In other words, the value developed by bit mapper 123 that is to be added to the average of the value of that chrominance portion is divided up into smaller values that are added to individual pixels of the block, so that the total of the smaller values added to the block divided by the number of pixels in the block equals the value to be added to the average value of the selected chrominance portion.

The particular bit average of the value of the chrominance portion for that block, e.g., the DC coefficient for that chrominance portion, onto which the data supplied by bit mapper 123 is impressed, is determined by bit mapper 123. In an exemplary embodiment of the invention, the second least significant bit of the DC coefficient for a block is replaced with the particular value that is desired to be impressed on the block. In another embodiment of the invention, which bit of the DC coefficient that is replaced may be a function of the texture variance of the block. It is advantageous to increase the significance of the bit which is replaced as the texture variance increases, because the MPEG coding standards employ greater quantization step sizes for higher texture variances, and the use of such greater quantization step sizes could filter out the watermark data bit if it is positioned in a bit position that is not significant enough. When using more significant bits, the values to be added or subtracted from the DC coefficient in order to change the bit being substituted to its complementary value may be greater than one. To this end, in accordance with an aspect of the invention, bit mapper 123 receives the average variance of the luminance component for the block from texture masking 111, and based on the average variance, determines which bit position is to be replaced. The greater the variance, the more significant the bit position into which the watermark data is placed.

Bit mapper 123 supplies the data bit from the interleaved channel encoded bit stream that is to be communicated for each block of the original video signal at the appropriate time for each pixel of the block of the original video signal when that pixel is to be incorporated into the watermarked output video signal. Thus, bit mapper 123 takes into account the fact that the processing of the video signal is line based, i.e., the processing is left to right on a line, then down to the next line and left to right again, causing the adjacent pixels of a block to not necessarily be located sequentially in the video stream and therefore to not all be processed in time directly one after the other. The particular data bit supplied as an output of bit mapper 123 at any time is supplied as an input to multiplier 113.

Using an encoder, such as shown in FIG. 1, a bit rate of around 6,750 bits per second, substantially error free, has been achieved for the additional information as supplied to channel encoder 119 when the video frame size is 720×480 pixels.

Those of ordinary skill in the art will readily recognize from the above description that various ones of the units in FIG. 1 require storage in order to first determine the values which must be computed using information from an entire block, e.g., the original average value of the block and the average texture variance of the block, and then to employ those values in processing the individual pixels. Consequently, there is typically a one slice delay, where a slice is a strip of blocks horizontally all the way across a frame.

FIG. 2 shows exemplary receiver 201 for recovering the additional data of a video signal containing digital watermarking on the chrominance signal thereof, in accordance with the principles of the invention. Shown in FIG. 2 are a) YUV demultiplexer (demux) and decimator 203, b) color selection unit 207, c) double pole double throw switch 209, d) block variance calculation 211, e) block integrator V 213, f) block integrator U 215, g) bit selection 217, h) deinterleaver 219, and i) channel decoder 221.

YUV demultiplexer and decimator 203, which may be substantially the same as YUV demultiplexer and decimator 103 of transmitter 101 (FIG. 1), receives a video signal that has been digitally watermarked in that additional information has been added thereto on the chrominance component of the signal, in accordance with the principles of the invention. YUV demultiplexer and decimator 203 works with digital video, e.g., formatted according to the serial digital interface (SDI). As will be recognized by those of ordinary skill in the art, any video signal not initially in an appropriate digital format may be converted thereto using conventional techniques.

YUV demultiplexer and decimator 203 demultiplexes the luminance (Y) component of the video and its chrominance component and decimates it to the preferred processing format in which for each original 2×2 luminance block of video, had the original block been in 4-4-4 representation, there remains only one Y, one U, and one V value. In order to know the format of the received video, a) the operator needs to indicate to YUV demultiplexer and decimator 203 the particular format of the input video, b) the format of the video may be detected directly from the video using conventional techniques, or c) the information may be supplied from a higher layer processor which is supplying the input video signal. The demultiplexed luminance and chrominance components are supplied to color selection 207. In addition, the luminance component is supplied to block variance calculation 211, the V chrominance portion is supplied to block integrator V 213, and the U chrominance portion is supplied to block integrator U 215. Unlike YUV demultiplexer and decimator 103, YUV demultiplexer and decimator 203 need not also supply a second set of YUV outputs in the full format of the original input video signal.

Color selection unit 207 determines for each block on which portion of the chrominance component, i.e., on the U portion or the V portion, it was likely that the additional information was embedded. The output of color selection unit 207 is used to control the position of double pole double throw switch 209. More specifically, color selection unit 209 selects the chrominance portion U or V, as a function of Y, U, and V, as will be described in more detail hereinbelow, on which the additional information was likely to have been embedded for this block. In one embodiment of the invention, color selection unit 207 is based on a lookup table. Doing so simplifies the process by avoiding the need for YUV to RGB conversion, which might otherwise be necessary.

Note that the input to color selection unit 207 is individual pixels. Color selection unit 207 keeps track of the pixels in each block and combines the individual U or V selection for each pixel in the block. The particular component that has the highest value, i.e., was most often selected for the pixels within a block, is determined to be the output of color selection 207. The output of color selection unit 207 is then set so that switch 209 supplies to bit selection 217 the integrated version of the portion of the chrominance component to which the additional data was determined to have been added.

Block variance calculation 211 determines the particular bit of the average of the value of the selected chrominance portion for that block, e.g., the DC coefficient for the selected chrominance portion, that likely contains the impressed data. As noted, in an exemplary embodiment of the invention, bit mapper 123 (FIG. 1) received and employed the average of the variances of the luminance component of the pixels of the block, to determine which bit position is to be replaced with the watermark data bit to be impressed. The greater the variance, the more significant the bit position that should be replaced. Block variance calculation 211 (FIG. 2) should base its calculation on the same information used by mapper 123 to replicate its determination. The output of block variance calculation 211 is supplied to bit selection 217.

Block integrator V 213 integrates the values of V over a block, i.e., the values for each pixel in a block are combined, e.g., added together. Block integrator U 215 integrates the values of U over a block, i.e., the values for each pixel in a block are combined, e.g., added together.

Bit selection 217 extracts the bit at the bit position specified by block variance calculation 211 from the integrated chrominance portion value supplied to it by switch 209 as the data for the block.

Deinterleaver 219 reorders the data to undo the effect of block interleaver 121 (FIG. 1) of transmitter 101. The reordered values are then supplied to channel decoder 221 (FIG. 2), which performs appropriate decoding for a signal that was encoded using the type of encoding employed by channel encoder 119 of transmitter 101 (FIG. 1). The resulting decoded values are supplied by channel decoder 221 (FIG. 2) as the reconstructed version of the additional data signal. For further robustness, channel decoder 221 may be a so-called "sequence decoder", e.g., a turbo decoder.

Figure 3B:
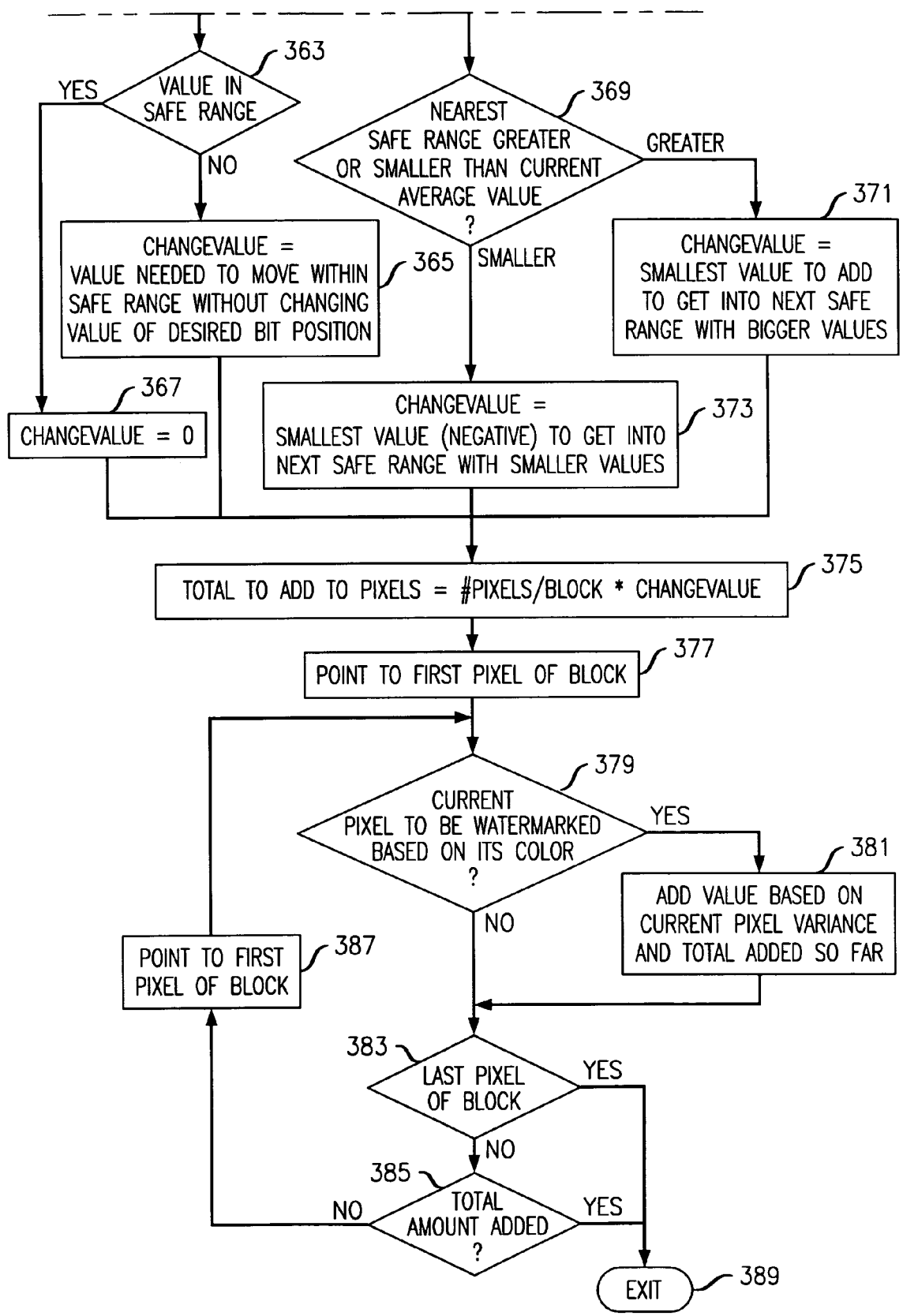

FIGS. 3A and 3B, when connected together as shown in FIG. 3, show an exemplary process for use in watermarking one of the chrominance portions with additional data, in accordance with the principles of the invention. For those blocks where the determined bit position is already the same as the value to be impressed, the block may be transmitted unmodified. The process of FIG. 3 may be performed, in an exemplary embodiment of the invention, in a system such as is shown in FIG. 1.

The process may be entered in step 301 when all the pixels of a block are available. Part of the processing of FIG. 3 takes place on a block-by-block basis, and part on a pixel-by-pixel basis. The blocks of a frame are indexed using a two-dimensional pointer p,q, where p points to the particular horizontal slice of the frame that is being processed and q points to the particular column, or vertical slice, of the frame. For example, for 720×480 resolution p ranges between 1 and 30 and q between 1 and 45. Similarly, the pixels of each block are indexed using a two-dimensional pointer ij, where i points to the particular row within the block that is being processed and j points to the particular column within the block that is being processed. For example, in the special processing mode employed to impress the data, where each macroblock of original video has only a corresponding 8×8 block of Y, U, and V, both i and j range between 0 and 7.

After entering the process in step 301, several variables that are used in the process are initialized in step 303, e.g., countU(p,q)=0, countV(p,q)=0, sumU(p,q)=0, sumV(p,q)=0, and var(p,q)=0. CountU is a running total of how many pixels within the block are selected by the color selection process as being suitable for watermarking on the U chrominance portion while count V is a running total of how many pixels within the block are selected by the color selection process as being suitable for watermarking on the V chrominance portion. SumU and sumV are the running total values of U and V respectively over all the pixels of the block. In embodiments of the invention where watermarking is only performed only on pixels of the chrominance portion selected for the block, there is no use for the one of sumU and sumV that is developed for the chrominance portion that is not selected.

In step 305, var(p,q), the total of the variance of the luminance for each individual pixel within the block, which is, of course, proportional to the average variance of the luminance for the block, is computed. To this end, i and j are initially both set to point to the first pixel of the block to be processed, e.g.,
i=0 and j=0. The value of var(p,q), is computed by cycling through each pixel of the block, changing the values of i and j as appropriate to do so, and adding together the variance of the luminance for each pixel to the current total of var(p,q).

In one embodiment of the invention, the variance of the luminance for any particular pixel may computed by taking the absolute value of the difference in the luminance between the pixel and all of its nearest neighbors. Mathematically, where all of the nearest neighbors are within the same block, this may be written as $$\mathrm{var}(p,q) = \mathrm{var}(p,q) + (|Y_{(i,j)}^{(p,q)} - Y_{(i-1,j-1)}^{(p,q)}| + |Y_{(i,j)}^{(p,q)} - Y_{(i-1,j)}^{(p,q)}| + |Y_{(i,j)}^{(p,q)} - Y_{(i,j-1)}^{(p,q)}| + |Y_{(i,j)}^{(p,q)} - Y_{(i+1,j)}^{(p,q)}| + |Y_{(i,j)}^{(p,q)} - Y_{(i,j+1)}^{(p,q)}| + |Y_{(i,j)}^{(p,q)} - Y_{(i+1,j-1)}^{(p,q)}| + |Y_{(i,j)}^{(p,q)} - Y_{(i-1,j+1)}^{(p,q)}| + |Y_{(i,j)}^{(p,q)} - Y_{(i+1,j+1)}^{(p,q)}|).$$

Those of ordinary skill in the art will readily be able to adapt the foregoing to those pixels whose nearest neighbors are in other blocks. Furthermore, for those blocks that are near the borders of the frame, and hence have no nearest neighbors, or the nearest neighbors are part of those blocks that are not displayed, the value of such neighbors may be considered to be zero.

In accordance with another aspect of the invention, not all of a pixel's nearest neighbors need be considered in the variance computation and yet sufficiently high quality results can be achieved. More specifically, it is advantageous in that computation time for each pixel is reduced by taking only the differences of the 4 pixels in the corners of the rectangle surrounding the pixel and 2 of the other pixels that form a vertical or horizontal line with the pixel, e.g., the 2 pixels on the horizontal line with the pixel. Thereafter, conditional branch point 307 tests to determine which particular chrominance portion, i.e., U or V, is going to contain the watermark information for the block. This is done by evaluating the color selection for each pixel in the block and counting the number of pixels within the block that are selected for each chrominance portion. The chrominance portion that was selected the most for the block is chosen for watermarking. Note that in some embodiments of the invention, it may be determined that a particular pixel is unsuitable for watermarking at all. In such a case, it is not counted towards the total number of pixels for either U or V.

The particular method of determining the color selected to be watermarked for each pixel is at the discretion of the implementer. In one embodiment of the invention, the chrominance portion of the pixel with the smallest value is selected. In another embodiment of the invention, the color selection arrangement described hereinbelow is employed.

Next, the bit position of the average value of the selected chrominance portion that will contain the watermarked bit is determined. The bit position is selected so that the watermarked bit will survive any subsequent quantization, such as takes place in MPEG-like encoding.

To this end, if the test result in step 307 is that the V chrominance portion is selected to be watermarked, control passes to step 309, in which a variable watermarkcolor is set equal to V. Thereafter, conditional branch point 323, which tests to determine whether the average Y variance over the block, var(p,q), is greater than a first prescribed V threshold t1v, which is the largest V threshold. An exemplary value of t1v is 600.

Note that the particular threshold values used in connection with FIGS. 3 and 4 for both U and V are at least partially dependent on the number of bits used to represent each Y value, when the average Y variance is compared with the suggested threshold. For example, the suggested threshold values herein are for Y being an 8 bit value. Those of ordinary skill in the art will readily recognize that the values employed for 8 bits may be scaled to 10 bits by multiplying by 4, e.g., shifting the value to the left two times. Likewise, other numbers of bits used for Y, U, and V can be similarly accommodated.

In other embodiments of the invention, instead of using the average Y variance over the block for the various comparisons, a different average variance, e.g., the average V variance over the block, may be calculated and employed.

If the test result in step 323 is YES, indicating that the variance is large enough that the additional data should be encoded on the $5^{th}$ least significant bit of the average of the V values of the pixels of the block, e.g., the value of int[sumV(p,q)/(number of pixels per block)], e.g., int[sumV(p,q)/64], is greater than t1v, control is passed to step 325, in which a variable m is set equal to 5.

Note that instead of using the integer function int for rounding, as is used herein, any other form of rounding to achieve an integer value may be employed, e.g., always rounding up or always rounding to the nearest integer value.

If the test result in step 323 is NO, indicating that the variance was not large enough that additional the data should be encoded on the $5^{th}$ least significant bit of the average value of the V values of the pixels of the block, control passes to conditional branch point 329, which tests to determine if the average Y variance over the block, var(p,q), is greater than a second prescribed V threshold, t2v, which is the second largest V threshold. An exemplary value of t2v is 15.

If the test result in step 329 is YES, indicating that the additional data should be encoded on the $4^{th}$ least significant bit of the average of the V values of the pixels of the block, control is passed to step 331, in which variable m is set equal to 4.

If the test result in step 329 is NO, indicating that the variance was not large enough that the additional data should be encoded on the $4^{th}$ least significant bit of the average of the V values of the block, control passes to conditional branch point 333, which tests to determine if the average Y variance over the block, var(p, q), is greater than a third prescribed V threshold, t3v, which is the smallest V threshold. An exemplary value of t3v is 7.

If the test result in step 333 is YES, indicating that the variance is large enough that the data should be encoded on the $3^{rd}$ least significant bit of the average of the V values of the pixels of the block, control is passed to step 335, in which variable m is set equal to 3.

If the test result in step 333 is NO, indicating that the variance is only large enough that the data should be encoded on the $2^{nd}$ least significant bit of the average value of the V value of the block control is passed to step 337, in which variable m is set equal to 2.

If the test result in step 307 is that the U is the chrominance portion is selected to be watermarked, control passes to step 311, in which the variable watermarkcolor is set equal to U. Thereafter, conditional branch point 343 tests to determine whether the average Y variance over the block, var(p,q), is greater than a first prescribed threshold t1v, which is the largest threshold. An exemplary value of t1v is 600.

In other embodiments of the invention, instead of using the average Y variance over the block for the various comparisons, the average U variance over the block may be calculated and employed.

If the test result in step 343 is YES, indicating that the variance is large enough that the data needs to be encoded on the $5^{th}$ least significant bit of the average of the U values of the pixels of the block, e.g., the value of int[sumV(p,q)/(number of pixels per block)], e.g., int[sumU(p,q)/64], is greater than t1v, control is passed to step 345, in which variable m is set equal to 5.

Note that instead of using the integer function int for rounding herein, any other form of rounding to achieve an integer value may be employed, e.g., always rounding up or rounding to the nearest integer value.

If the test result in step 343 is NO, indicating that the variance was not large enough that the data needed to be encoded on the $5^{th}$ least significant bit of the average of the U values of the pixels of the block, control passes to conditional branch point 349, which tests to determine if the average Y variance over the block, var(p,q), is greater than a second prescribed threshold t2u , which is the second largest U threshold. An exemplary value of t2u is 15.

If the test result in step 349 is YES, indicating that the data needs to be encoded on the $4^{th}$ least significant bit of the average of the U values of the pixels of the block, control passes to step 351, in which variable m is set equal to 4.

If the test result in step 349 is NO, indicating that the variance was not large enough that the data should be encoded on the $4^{th}$ least significant bit of the average of the U value of the pixels of the block, control passes to conditional branch point 353, which tests to determine if the average Y variance over the block, var(p,q), is greater than a third prescribed threshold t3u, which is the smallest U threshold. An exemplary value of t3u is 7.

If the test result in step 353 is YES, indicating that the variance is large enough that the data should be encoded on the $3^{rd}$ least significant bit of the average of the U values of the pixels of the block, control passes to step 355, in which variable m is set equal to 3.

If the test result in step 353 is NO, indicating that the variance is only large enough that the data should be encoded on the $2^{nd}$ least significant bit of the average of the U values of the pixels of the block, control is passed to step 357, in which variable m is set equal to 2.

Once the particular bit of the average value over the block of the selected chrominance portion to be employed to contain the watermarked data is determined, the process to make certain that that bit position contains the desired bit is undertaken. The goal of the process is to add or subtract the minimum possible value from the current average value of the selected chrominance portion to make certain that the desired bit position has the value of the watermarking bit to be transmitted. Note that, in one embodiment of the invention, the desired bit position is a bit position within the integer portion of the average value. To this end, ideally, if the desired bit position already contains the value of the watermarking bit to be transmitted, nothing may be added to the current average value of the selected chrominance portion. On the other hand, if the desired bit position contains the complement of the value of the watermarking bit to be transmitted, ideally, only the smallest possible value that will flip the desired bit position to its complement by being either added to or subtracted from the desired bit position, and hence causing the least change in the value of the average value of the selected chrominance portion from its current unwatermarked value to its final watermarked value, is added to or subtracted from the desired bit position as appropriate.

In practice, due to quantization noise, rounding as part of the inventive process, and other factors of the MPEG-like encoding process that may impact the final value of the desired bit, a slightly different value may be added or subtracted as explained further herein. More specifically, in one embodiment of the invention, a "safe" range of values having the desired bit value at the desired bit position is selected, and the minimum value is either added or subtracted to the average value of the selected chrominance portion so that the final value has the desired bit value at the desired bit position and it is within the safe range. Thus, typically, whenever a bit of the average value needs to be changed to its complement to carry the watermark data, the resulting value is always at the border of a safe range. When the value at the desired bit position is already the value of the watermark data bit to be transmitted, if the average value of the selected chrominance portion is already within the safe range, then nothing needs to be added to the average value of the selected chrominance portion. However, when the average value of the selected chrominance portion is not already within the safe range, then the minimum value necessary to change the average value of the selected chrominance portion to be a value within the safe range, while keeping the value of the desired bit position at the value of the watermarking bit to be transmitted, is added to, or subtracted, from the average value of the selected chrominance portion.

Conceptually, the foregoing may be thought of as first adding or subtracting the minimum value to achieve the desired watermarking value at the desired bit position, and then adding or subtracting a further amount, e.g., a margin value, to insure that the final value is within the safe range.

Figure 5:
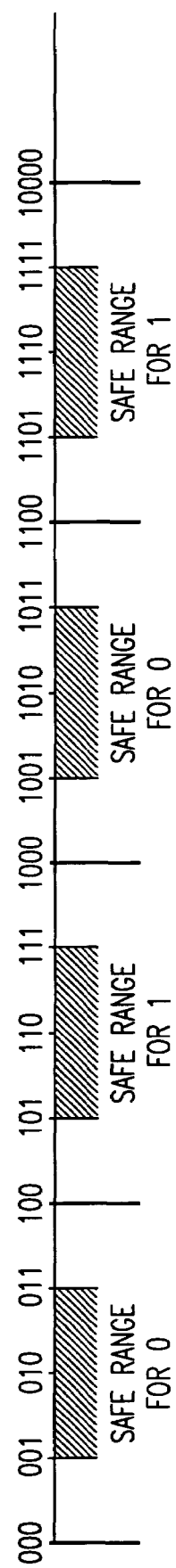
FIG. 5 shows an example of several safe ranges where the desired bit position is the third least significant bit.

FIG. 5 shows an example of several safe ranges where the desired bit position is the third least significant bit. Along the axis are shown the average value of the selected chrominance portion.

Table 1 shows (code) (table of values)

Upon completion of steps 325, 331, 335, 337, 345, 351, 355 and 357, control passes to conditional branch point 361, which tests to determine if the bit of watermarking data to be impressed on the block is the same as the current identified bit position for the average value of the chrominance portion identified by the variable watermarkcolor. If the test result in step 361 is YES, indicating that the bit of watermarking data to be impressed on the block is the same as the current identified bit position for the average value of the chrominance portion identified by the variable watermarkcolor, and that therefore the bit does not need to be changed to its complementary value, control passes to step 363, which tests to determine if the value is within the safe range for the current bit position. If the test result is NO, indicating that an error might be introduced during subsequent processing, control passes to step 365, which sets the variable changevalue to be equal to the value needed to move the current average value for the color indicated by watermarkcolor into the nearest safe range without changing the value of the desired bit position. Note that the value need not be an integer value, and it may also be a negative value. If the test result in step 363 is NO, indicating that the current average value for the color indicated by watermarkcolor is already within a safe range, control passes to step 367, and the value of changevalue is set equal to zero.

If the test result in step 361 is NO, indicating that the bit of watermarking data to be impressed on the block is not the same as the current identified bit position for the average value of the chrominance portion identified by the variable watermarkcolor, and that therefore the value of the bit must be changed to its complementary value so as to properly carry the watermarking data, control passes to step 369, which tests to determine if the nearest safe range for the current bit position is greater or smaller than the current average value of the color indicated by watermarkcolor. If the test result in step 369 is GREATER, indicating that the values of the nearest safe range for the current bit position is greater than the current average value of the color indicated by watermarkcolor, control passes to step 371 in which the value of variable changevalue is set equal to the smallest value to add to the average value so that the resulting value is within the adjacent safe range with bigger values. Note that this value need not be an integer value. If the test result in step 369 is SMALLER, indicating that the values of the nearest safe range for the current bit position is smaller than the current average value of the color indicated by watermarkcolor, control passes to step 373 in which the value of variable changevalue is set equal to the smallest negative value that when added to the average value results in a value that is within the adjacent safe range with smaller values. Again, note that this value need not be an integer value, and it may also be a negative value.

Upon conclusion of step 365, 367, 371, or 373, control passes to step 375 in which the total to add to the pixels is set equal to the product of the number of pixels per block and the value of changevalue. If the resulting product value is not an integer, the value is rounded off. The rounding may be performed in a manner consistent with the steps 365, 371, and 373, in that if a negative value was added, the rounding is down by taking the integer portion of the value, while if a positive value was added the rounding is up toward the next whole integer value.

Processing now changes from a per-block level to a per-pixel level within the block. In step 377, the first pixel of the block is pointed to. Thereafter, conditional branch point 379 tests to determine if the current pixel is to be watermarked, based on its color. This is done by determining if the chrominance component of this pixel that is suitable for watermarking is the same as the color selected in step 307 for the entire block. If the test result in step 379 is YES, indicating that this pixel should be watermarked, control passes to step 381, in which a value is added to the current pixel based on the luminance variance for the pixel and the total values added so far to the pixels of the block.

More specifically, a maximum value that can be added to the pixel without introducing a visible artifact is determined as a function of the variance of the luminance. The greater the variance of the luminance, the greater the value that can be added, up to a prescribed maximum. Note that this value may be positive or negative. This value is then added to pixel if the total to be added to the pixels is a positive value, or the value is subtracted from the pixel if the total to be added to the pixels is a negative value. However, as the per-pixel processing proceeds running total of the values added or subtracted are subtracted from the total to be added to the pixels. If the value to be added to the current pixel will make the difference between the total to be added to the pixels and the running total cross zero, then the value is adjusted so that the running total just equals zero.

If the test result in step 379 is NO, or after completing step 381, control passes to conditional branch point 383, which tests to determine if the current pixel is the last pixel of the block. If the test result in step 383 is NO, control passes to step 385 which tests to determine if the total to be added to the pixels of the block has already been added, i.e., is the running total equal to the total to be added to the pixels of the block. If the test result in step 385 is NO, indicating that there is more that needs to be added to the pixels of the block, control passes to step 387, which points to the next pixel of the block. Control then passes back to step 379, and the process continues as described above.

If the test result in either of steps 383 or 385 is YES, indicating that either all the pixels of the block have been processed or all of the total that need to be added has been added, control passes to step 389 and the process is exited.

Figure 4B:
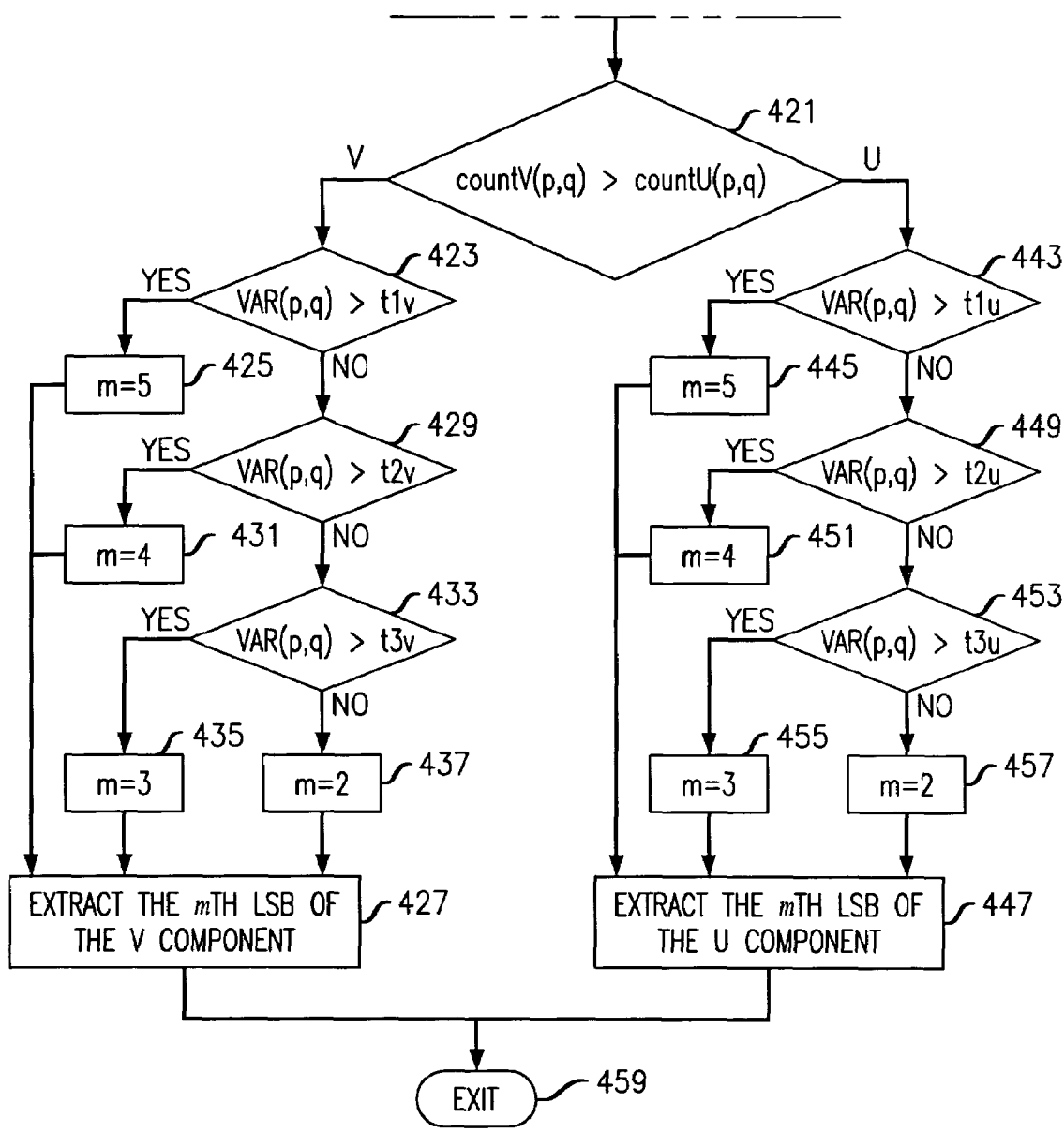

FIGS. 4A and 4B, when connected together as shown in FIG. 4, show an exemplary process for extracting the additional information from a digitally watermarked video signal in which the additional information that constitutes the watermarking signal within the video signal has been impressed upon the chrominance component, in accordance with the principles of the invention. Such a process may be implemented by an exemplary embodiment of the invention, such as the one shown in FIG. 2, across color selection 207, double pole double throw switch 209, block variance calculation 211, block integrator V 213, block integrator U 215 and bit selection 217 (FIG. 2).

The process is entered in step 401 (FIG. 4) when a new block of the received decimated frame is to be processed. Note that for pedagogical purposes it is assumed herein that pixels are supplied for processing by the process of FIG. 4 grouped by block, so that all the pixels of a block are processed prior to any pixels of the next block being processed. However, in designing an actual system, those of ordinary skill in the art will readily recognize that the pixels may be processed in the same order that they are scanned and that appropriate memory locations and control structures may be used so as to effectively separately process the blocks.

Part of the processing of FIG. 4 takes place on a block-by-block basis, and part on a pixel-by-pixel basis. The blocks of a frame are indexed using a two-dimensional pointer p, q, where p points to the particular horizontal slice of the frame that is being processed and q points to the particular column, or vertical slice, of the frame. For example, for 720×480 resolution, p ranges between 1 and 30 and q between 1 and 45. Similarly, the pixels of each block are indexed using a two-dimensional pointer ij, where i points to the particular row within the block that is being processed and j points to the particular column within the block that is being processed. For example, in the special processing mode employed to impress the data, where each macroblock of original video has only a corresponding 8×8 block of Y, U, and V, both i and j range between 0 and 7.

After entering the process in step 401, several variables that are used in the process are initialized in step 403, e.g., countU (p,q)=0, countV(p,q)=0, sumU(p,q)=0, sumV(p,q)=0, and var(p,q)=0. CountU and countV are a running total of how many pixels within the block were selected by the color selection process as being U and V, respectively, while sumU and sumV are the running total values of U and V, respectively, over all the pixels of the block. For the block, i and j are both set to point to the first pixel of the block to be processed, e.g., i=0 and j=0 as well. For each block, var(p,q) represents the total of the variance of the luminance for each individual pixel within the block, which is, of course, proportional to the average variance of the luminance for the block.

Thereafter, in step 405, the Y, U and V values for the currently pointed to pixel of the currently being processed block is obtained, e.g., the values of $Y_{(i,j)}^{(p,q)}$, $U_{(i,j)}^{(p,q)}$, and $V_{(i,j)}^{(p,q)}$ are obtained. The current values of U and V are added to the respective current values of sumU and sumV in step 407. Also in step 407 the variance of the luminance, var(p,q), is updated by adding the variance of the luminance for the current pixel to the current total of vartpq). In one embodiment of the invention, the variance of the luminance for the current pixel may computed by taking the absolute value of the difference in the luminance between the current pixel and all of its nearest neighbors. Mathematically, where all of the nearest neighbors are within the same block this may be written as $$\text{var}(p,q) = \text{var}(p,q) + (|Y_{(i,j)}^{(p,q)} - Y_{(i-1,j-1)}^{(p,q)}| + |Y_{(i,j)}^{(p,q)} - Y_{(i-1,j)}^{(p,q)}| + |Y_{(i,j)}^{(p,q)} - Y_{(i,j-1)}^{(p,q)}| + |Y_{(i,j)}^{(p,q)} - Y_{(i,j)}^{(p,q)}| + |Y_{(i,j)}^{(p,q)} - Y_{(i+1,j+1)}^{(p,q)}| + |Y_{(i,j)}^{(p,q)} - Y_{(i+1,j)}^{(p,q)}| + |Y_{(i,j)}^{(p,q)} - Y_{(i,j+1)}^{(p,q)}| + |Y_{(i,j)}^{(p,q)} - Y_{(i-1,j+1)}^{(p,q)}| + |Y_{(i,j)}^{(p,q)} - Y_{(i+1,j-1)}^{(p,q)}|).$$

Those of ordinary skill in the art will readily be able to adapt the foregoing to those pixels whose nearest neighbors are in other blocks. Furthermore, for those blocks that are near the borders of the frame, and hence have no nearest neighbors, or the nearest neighbors are part of those blocks that are not displayed, the value of such neighbors may be considered to be zero.

In accordance with another aspect of the invention, not all of the nearest neighbors need be considered and yet sufficiently high quality results can be achieved. More specifically, it is advantageous in that computation time is reduced to take the differences of the 4 pixels in the corners of the rectangle surrounding the current pixel and 2 of the other pixels that form a vertical or horizontal line with the current pixel, e.g., the 2 pixels on the horizontal line with the current pixel. However, the decoder should match the same process that was employed in the encoder.

Control passes to conditional branch point 409, which tests to determine on which of U or V it was likely that the additional data was impressed. The details of this determination will be described further hereinbelow. If the test result in step 409 is U, indicating that the additional data was most likely impressed on U for the current pixel, control passes to step 411, in which countU is incremented. Control then passes to step 413. If the test result in step 409 is V, indicating that the additional data was most likely impressed on V for the current pixel, control passes to step 415, in which countV is incremented. Control then passes to step 413.

In some embodiments of the invention, conditional branch point 409 may be a three-way test, with an additional result indicating that it is likely that data was not impressed on the pixel at all, i.e., not on the U or the V. If such is the result, control simply passes directly to step 413.

Conditional branch point 413 tests to determine if the current pixel is the last pixel of the current block. If the test result in step 413 is NO, indicating that there remains additional pixels in the current block that have yet to be processed, control passes to step 417, in which the values of i and j are adjusted to point to the next as-of-yet-not-processed pixel. Control then passes back to step 405 and the process continues as described above. If the test result in step 413 is YES, indicating that all the pixels of the current block have been processed, control passes to step 419, in which the variance of the decimated luminance for the block is calculated, i.e., the variance of the 8×8 Y block is calculated.

Control then passes to conditional branch point 421, which tests to determine if countV>countU for the current block. If the test result in step 421 is that countV is indeed greater than countU, control passes to conditional branch point 423, which tests to determine whether the average Y variance over the block, vary(p,q), is greater than a first prescribed threshold t1v, which is the largest V threshold. An exemplary value of t1v is 600.

In other embodiments of the invention, instead of using the average Y variance over the block for the various comparisons, the average U or the average V variance over the block may be calculated and employed, e.g., whichever has the greater count value.

If the test result in step 423 is YES, indicating that the variance is large enough that the data was likely to have been encoded on the 5$^{th}$ least significant bit of the integer portion of the average of the V values of the pixels of the block, e.g., the value of int[sumV(p,q)/(number of pixels per block)], e.g., int[sumV(p,q)/64], control is passed to step 425, in which a variable m is set equal to 5. Control then passes to step 427, in which the value of the m$^{th}$ least significant bit of the average of the V values of the pixels of the block is extracted as the value impressed upon this block. The process is then exited in step 459.

Note that instead of using the integer function int for rounding herein, any other form of rounding to achieve an integer value may be employed, e.g., always rounding up or rounding to the nearest integer value.

If the test result in step 423 is NO, indicating that the variance was not large enough that the data was likely to have been encoded on the $5^{th}$ least significant bit of the integer portion of the average of the V values of the pixels of the block, control passes to conditional branch point 429, which tests to determine if the average Y variance over the block, var(p,q), is greater than a second prescribed threshold t2v, which is the second largest V threshold. An exemplary value of t2v is 15.

If the test result in step 429 is YES, indicating that the variance is large enough that the data was likely to have been encoded on the $4^{th}$ least significant bit of the integer portion of the average of the V values of the pixels of the block, control is passed to step 431, in which variable m is set equal to 4. Control then passes to step 427, in which the value of the $m^{th}$ least significant bit of the average of the V values of the pixels of the block is extracted as the value impressed upon this block. The process is then exited in step 459.

If the test result in step 429 is NO, indicating that the variance was not large enough that the data was likely to have been encoded on the $4^{th}$ least significant bit of the integer portion of the average of the V values of the pixels of the block, control passes to conditional branch point 433, which tests to determine if the average Y variance over the block, var(p,q), is greater than a third prescribed threshold t3v, which is the smallest V threshold. An exemplary value of t3v is 7.

If the test result in step 433 is YES, indicating that the variance is large enough that the data was likely to have been encoded on the $3^{rd}$ least significant bit of the integer portion of the average of the V values of the pixels of the block, control is passed to step 435, in which variable m is set equal to 3. Control then passes to step 427, in which the value of the $m^{th}$ least significant bit of the average of the V values over the pixels of the block is extracted as the value impressed upon this block. The process is then exited in step 459.

If the test result in step 433 is NO, indicating that the variance is only large enough that the data was likely to have been encoded on the $2^{nd}$ least significant bit of the integer portion of the average of the V values of the pixels of the block, control is passed to step 437, in which variable m is set equal to 2. Control then passes to step 427, in which the value of the $m^{th}$ least significant bit of the average of the V values of the pixels of the block is extracted as the value impressed upon this block. The process is then exited in step 459.

If the test result in step 421 is that countU is greater than countV, control passes to conditional branch point 445, which tests to determine whether the average Y variance over the block, var(p,q), is greater than a first prescribed threshold t1u, which is the largest U threshold. An exemplary value of t1u is 600.

If the test result in step 445 is YES, indicating that the variance is large enough that the data was likely to have been encoded on the $5^{th}$ least significant bit of the integer portion of the average of the U values of the block, e.g., the value of int[sumU(p,q)/(number of pixels per block)], e.g., int[sumU (p,q)/64], control is passed to step 445, in which variable m is set equal to 5. Control then passes to step 447, in which the value of the $m^{th}$ least significant bit of the average of the U values over the pixels of the block is extracted as the value impressed upon this block. The process is then exited in step 459.

If the test result in step 445 is NO, indicating that the variance was not large enough that the data was likely to have been encoded on the $5^{th}$ least significant bit of the integer portion of the average of the U values of the pixels of the block, control passes to conditional branch point 449, which tests to determine if the average Y variance over the block, var(p,q), is greater than a second prescribed threshold t2u, which is the second largest U threshold. An exemplary value of t2u is 15.

If the test result in step 449 is YES, indicating that the variance is large enough that the data was likely to have been encoded on the $4^{th}$ least significant bit of the integer portion of the average of the U values of the block, control is passed to step 451, in which a variable m is set equal to 4. Control then passes to step 447, in which the value of the $m^{th}$ least significant bit of the average of the U values of the pixels of the block is extracted as the value impressed upon this block. The process is then exited in step 459.

If the test result in step 449 is NO, indicating that the variance was not large enough that the data was likely to have been encoded on the $4^{th}$ least significant bit of the integer portion of the average of the U values of the pixels of the block, control passes to conditional branch point 453, which tests to determine if the average Y variance over the block, var(p,q), is greater than a third prescribed threshold t3u, which is the smallest U threshold. An exemplary value of t3u is 7.

If the test result in step 452 is YES, indicating that the variance is large enough that the data was likely to have been encoded on the $3^{rd}$ least significant bit of the integer portion of the average of the U values of the pixels of the block, control is passed to step 455, in which variable m is set equal to 3. Control then passes to step 447, in which the value of the $m^{th}$ least significant bit of the average of the U values of the pixels of the block is extracted as the value impressed upon this block. The process is then exited in step 459.

If the test result in step 452 is NO, indicating that the variance is only large enough that the data was likely to have been encoded on the $2^{nd}$ least significant bit of the integer portion of the average of the U values of the pixels of the block, control is passed to step 457, in which variable m is set equal to 2. Control then passes to step 447, in which the value of the $m^{th}$ least significant bit of the average value of the U values of the pixels of the block is extracted as the value impressed upon this block. The process is then exited in step 459.

Note that although the use of 3 thresholds and 4 bit positions has been shown in FIGS. 3 and 4, those of ordinary skill in the art will readily be able to adapt the indicated method to other numbers of thresholds and encoded values.

Similarly, not all blocks of each frame or field of the video signal need be impressed with additional information.

Figure 6:
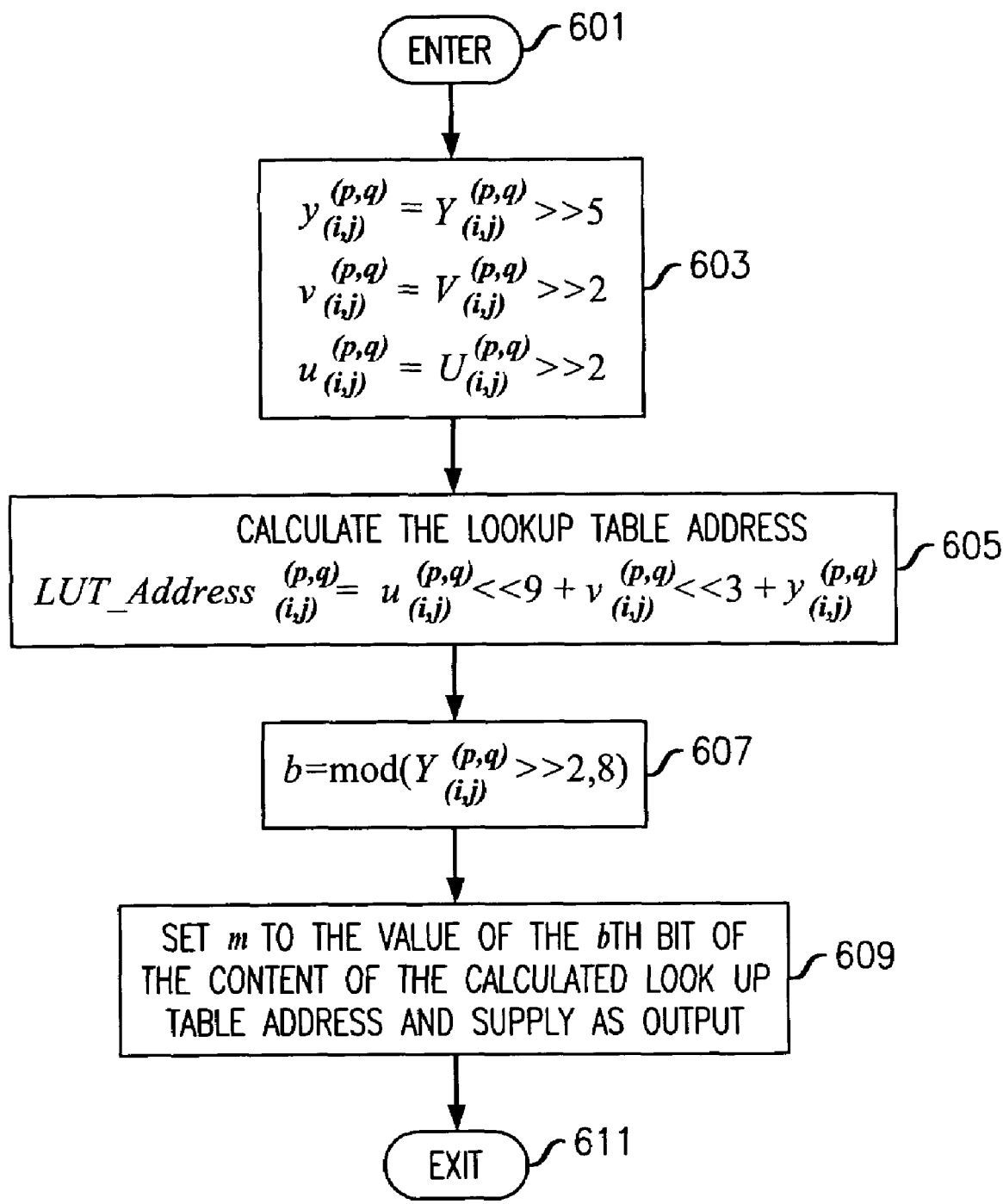
FIG. 6 shows an exemplary process for determining which particular chrominance portion is more suitable, and so should be selected, to contain the watermarking information for a pixel, in accordance with the principles of the invention.

FIG. 6 shows an exemplary process for determining which particular chrominance portion is more suitable, and so should be selected, to contain the watermarking information for a pixel, in accordance with the principles of the invention. The process is entered in step 601 when it is necessary to select a chrominance portion to contain watermarking information. For purposes of discussion of FIG. 6, it is assumed that the pixel is represented in YUV format. Furthermore, it is noted that, preferably, for each original 2×2 luminance block of original video, had the original video been in 4-4-4 representation, there should only one Y value for each chrominance component, i.e., each pair of respective corresponding U and V values. To this end, the Y values of the original block may be downsampled so as to have the same resolution as the U and V. Alternatively, the average, or some other combination, of the Y values associated with a particular U and V values may be computed and used as the Y value for the process of FIG. 6.

Conceptually, in accordance with the principles of the invention, each position in a three-dimensional YUV colorspace corresponding to a possible pixel position, given the full range that a pixel's Y, U, and V values can take, is assigned a chrominance portion, e.g., based on experimental observations, that is more suitable, and so should be selected, for a pixel having such Y, U, and V values. If a version of the entire table for each possible set of Y, U, and V values was to be employed, where each of Y, U, and V has a full range of 8 bits, at least 16M bit of information would need to be stored, assuming that only one bit was stored for each position to indicate the selected chrominance portion. Note that use of a single bit only permits selection of U or V, but not a designation that neither U nor V should be employed. If it were desired to be able to select neither U nor V, 32 Mbits of information would be necessary.

Figure 7:
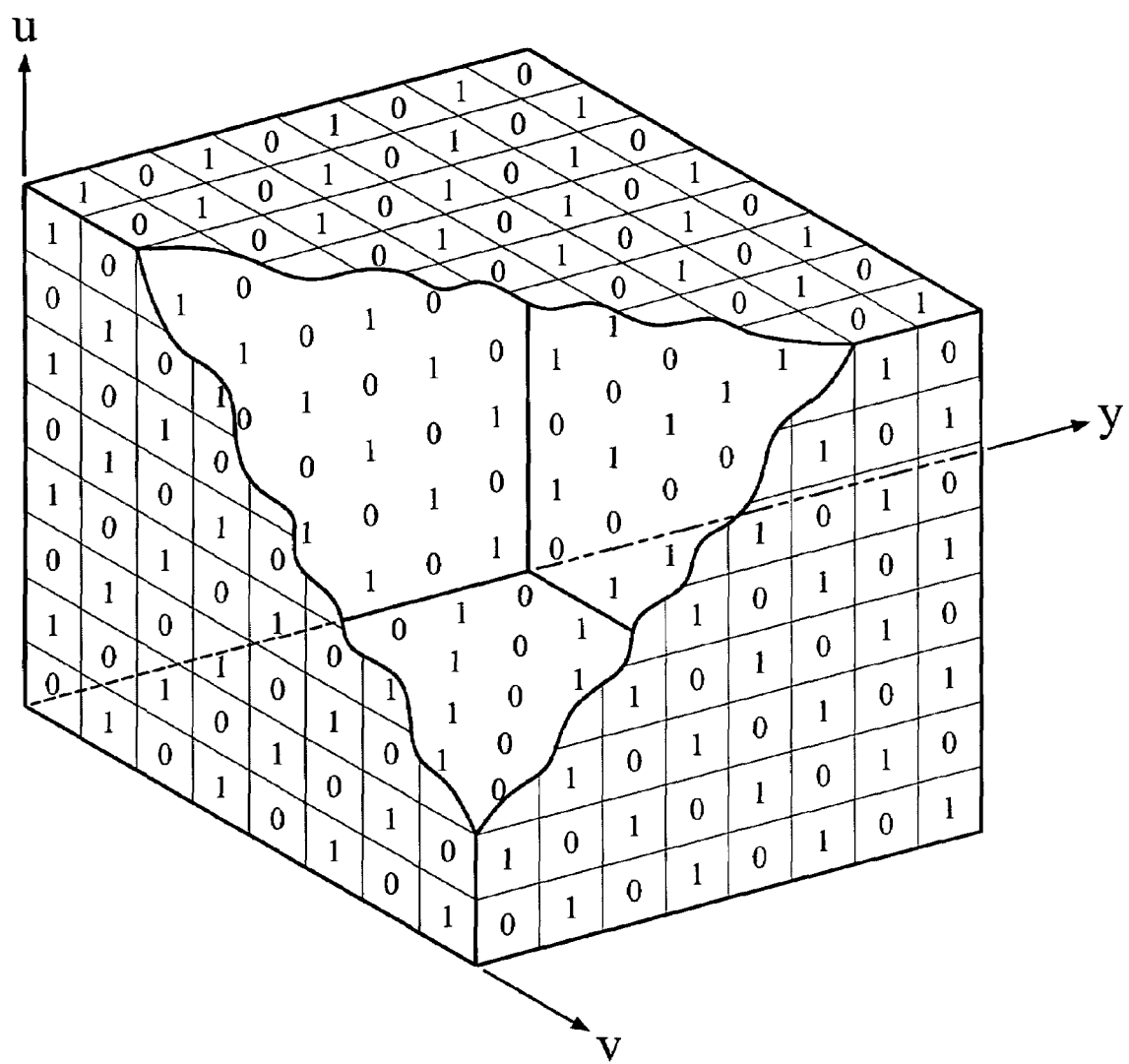
FIG. 7 shows a cutaway view of a portion of an exemplary divided colorspace.

A cutaway view of a portion of exemplary assignments of a chrominance portion that is to be selected for each possible pixel within a three-dimensional YUV colorspace is shown in FIG. 7. Note that FIG. 7 is provided for pedagogical purposes only, as a conceptualization visual aid, and does not represent actual data.

In order to reduce the storage requirements, the YUV colorspace may be considered to be a group of regions, each region being defined to include the positions corresponding to at least one set, and typically multiple sets, of Y, U, and V values, i.e., the positions in the colorspace corresponding to at least one pixel, and possibly many pixels, and each region, and hence each pixel which maps to that region, is assigned a chrominance portion, e.g., based on experimental observations, that is to be selected for any pixel whose set of Y, U, and V values fall within the region. One way to look at such grouping into regions is a quantization, which may be linear or nonlinear.

Table 1 is a listing for an exemplary colorspace selection table, where each region corresponds to 4 Y values, 4 U values, and 4 V values, and hence to 64 possible combinations of 8 bit values for any pixel. Using such a table reduces the required information to be stored down to 256 Kbits, assuming that only one bit was stored for each position, or 512 Kbits, assuming it were desired to be able to select Y, V, and neither U nor V. Table 1 may be stored in any computer readable medium, e.g., ROM, RAM, magnetic storage such as a hard disk or tape drive, optical storage such as a CD-ROM or DVD-ROM, or the like.

Those of ordinary skill in the art will readily recognize that the values employed in Table 1, which are for each of Y, U, and V having a full range of 8 bits, may be scaled for use with 10 bit Y, U, and V values by dividing by 4, e.g., shifting each 10 bit value to the right two times. Likewise, other numbers of bits used for Y, U, and V can be similarly accommodated.

In order to effectively arrange and access the data of Table 1, it is arranged so that the specified U or V selection, where 1 indicates select U and 0 indicates select V, for 8 adjacent regions having the same U and V quantized values but different sequential quantized Y values, are grouped together to form a byte. Thus, for each U and V value there are 8 bytes, each corresponding to a region having the same U and V quantized values but different quantized Y values.

Table 1 is arranged to be addressed using an address that has the most significant bits corresponding to the U values, the next least significant values corresponding to the V values, and the least significant values corresponding to the Y values. In other words, the address of the bytes may be formed as follows:

U7|U6|U5|U4|U3|U2|V7|V6|V5|V4|V3|V2|Y7|Y6|Y5 where U7,U6,U5,U4,U3, and U2 are the values of the $8^{th}$ to $3^{rd}$ least significant bits of the pixels U value, V7,V6,V5,V4, V3, and V2 are the values of the $8^{th}$ to $3^{rd}$ least significant bits of the pixels V value, and Y7,Y6, and Y5, are the values of the $8^{th}$ to $6^{th}$ least significant bits of the pixels Y value. Then, the particular bit within the byte is specified by using the $5^{th}$ to $2^{nd}$ least significant bits of the Y component, e.g., Y4,Y3, and Y2.

A table such as Table 1 is reflective of the facts that the human visual system is a) less sensitive to the blue color and b) more sensitive to lower luminance values. Such a table may be developed by trial and error, generally as follows.

The colorspace is examined in sections, each section being defined by a luminance value and ranging in a first dimension corresponding to a first chrominance portion changing from its minimum value to its maximum value and in the second dimension corresponding to the second chrominance portion changing from its minimum value to its maximum value. Any or all of the luminance and the chrominance portions may be quantized, e.g., using the 6 most significant bits of 8 bit values. Doing so creates a set of planes having a checkerboard of chrominance portion values, which appears when displayed as blocks of different colors, one plane for each luminance value. For example, quantizing so as to use the 6 most significant bits of 8 bit values for the luminance and both chrominance portions yields 64 planes that correspond to each possible quantized luminance value, and each plane has a checkerboard pattern of colored boxes, with 64 boxes vertically and 64 boxes horizontally for a total of 4096 boxes per plane.

Each plane is examined separately. Random data is developed for a number of frames sufficient to be confident that the random data will have different values in like positioned blocks of the frame over time and for an observer to detect flicker should it appear. Thirty seconds or longer have proven to be of value. The random data is impressed upon frames that contain the plane, but only on a first one of the chrominance portions, e.g., using the system of FIG. 1 and the process of FIG. 3 to accomplish the watermarking but forcing the color selection to be the first chrominance portion. The resulting watermarked version of the frames is displayed and observed.

Any block for which no flicker is observed is indicated in the table that its combination of luminance and chrominance portions should employ the chrominance portion currently carrying the watermark data as the selected chrominance portion for that combination. Any block for which flicker is observed is indicated in the table that its combination of luminance and chrominance portions should employ the chrominance portion that is not currently carrying the watermark data as the selected chrominance portion for that combination. The process is repeated for the plane but changing the chrominance portion that is watermarked.

For any block of a plane that flicker occurs for both chrominance portions, as can happen, the implementer may choose which chrominance portion should be selected. For example, U may be chosen because the human visual system is generally less sensitive to blue. Alternatively, the chrominance portion that would provide for better data compression of the resulting table may be employed. Similarly, where flicker does not appear on either block, the choice of the chrominance portion to employ is at the discretion of the implementer.

The process is repeated for each plane until the entire table is populated.

TABLE 1

| Address | | | | | | | | Content | | | | | | | | | |
|---|---|---|---|---|---|---|---|---|---|---|---|---|---|---|---|---|---|
| 1 to 16 | | 255 | 255 | 255 | 255 | 255 | 255 | 255 | 255 | 255 | 255 | 255 | 255 | 255 | 255 | 255 | 255 |
| 17 to 32 | | 255 | 255 | 255 | 255 | 255 | 255 | 255 | 255 | 255 | 255 | 255 | 255 | 255 | 255 | 255 | 255 |
| 33 to 48 | | 255 | 255 | 255 | 255 | 255 | 255 | 255 | 255 | 255 | 255 | 255 | 255 | 255 | 255 | 255 | 255 |
| 49 to 64 | | 255 | 255 | 255 | 255 | 255 | 255 | 255 | 255 | 255 | 255 | 255 | 255 | 255 | 255 | 255 | 255 |
| 65 to 80 | | 255 | 255 | 255 | 255 | 255 | 255 | 255 | 255 | 255 | 255 | 255 | 255 | 255 | 255 | 255 | 255 |
| 81 to 96 | | 255 | 255 | 255 | 255 | 255 | 255 | 255 | 255 | 255 | 255 | 255 | 255 | 255 | 255 | 255 | 255 |
| 97 to 112 | | 255 | 255 | 255 | 255 | 255 | 255 | 255 | 255 | 255 | 255 | 255 | 255 | 255 | 255 | 255 | 255 |
| 113 to 128 | | 255 | 255 | 255 | 255 | 255 | 255 | 255 | 255 | 255 | 255 | 255 | 255 | 255 | 255 | 255 | 255 |
| 129 to 144 | | 255 | 255 | 255 | 255 | 255 | 255 | 255 | 255 | 255 | 255 | 255 | 255 | 255 | 255 | 255 | 255 |
| 145 to 160 | | 255 | 255 | 255 | 255 | 255 | 255 | 255 | 255 | 255 | 255 | 255 | 255 | 255 | 255 | 255 | 255 |
| 161 to 176 | | 255 | 255 | 255 | 255 | 255 | 255 | 255 | 255 | 255 | 255 | 255 | 255 | 255 | 255 | 255 | 255 |
| 177 to 192 | | 255 | 255 | 255 | 255 | 255 | 255 | 255 | 255 | 255 | 255 | 255 | 255 | 255 | 255 | 255 | 255 |
| 193 to 208 | | 255 | 255 | 255 | 255 | 255 | 255 | 255 | 255 | 255 | 255 | 255 | 255 | 255 | 255 | 255 | 255 |
| 209 to 224 | | 255 | 255 | 255 | 255 | 255 | 255 | 255 | 255 | 255 | 255 | 255 | 255 | 255 | 255 | 255 | 255 |
| 225 to 240 | | 255 | 255 | 255 | 255 | 255 | 255 | 255 | 255 | 255 | 255 | 255 | 255 | 255 | 255 | 255 | 255 |
| 241 to 256 | | 255 | 255 | 255 | 255 | 255 | 255 | 255 | 255 | 0 | 0 | 0 | 0 | 0 | 0 | 0 | 0 |
| 257 to 272 | | 255 | 255 | 127 | 0 | 0 | 0 | 0 | 0 | 255 | 255 | 255 | 255 | 255 | 255 | 255 | 255 |
| 273 to 288 | | 255 | 255 | 255 | 255 | 255 | 255 | 255 | 255 | 255 | 255 | 255 | 255 | 255 | 255 | 255 | 255 |
| 289 to 304 | | 255 | 255 | 255 | 255 | 255 | 255 | 255 | 255 | 255 | 255 | 255 | 255 | 255 | 255 | 255 | 255 |
| 305 to 320 | | 255 | 255 | 255 | 255 | 255 | 255 | 255 | 255 | 255 | 255 | 255 | 255 | 255 | 255 | 255 | 255 |
| 321 to 336 | | 255 | 255 | 255 | 255 | 255 | 255 | 255 | 255 | 255 | 255 | 255 | 255 | 255 | 255 | 255 | 255 |
| 337 to 352 | | 255 | 255 | 255 | 255 | 255 | 255 | 255 | 255 | 255 | 255 | 255 | 255 | 255 | 255 | 255 | 255 |
| 353 to 368 | | 255 | 255 | 255 | 255 | 255 | 255 | 255 | 255 | 255 | 255 | 255 | 255 | 255 | 255 | 255 | 255 |
| 369 to 384 | | 255 | 255 | 255 | 255 | 255 | 255 | 255 | 255 | 255 | 255 | 255 | 255 | 255 | 255 | 255 | 255 |
| 385 to 400 | | 255 | 255 | 255 | 255 | 255 | 255 | 255 | 255 | 255 | 255 | 255 | 255 | 255 | 255 | 255 | 255 |
| 401 to 416 | | 255 | 255 | 255 | 255 | 255 | 255 | 255 | 255 | 255 | 255 | 255 | 255 | 255 | 255 | 255 | 255 |
| 417 to 432 | | 255 | 255 | 255 | 255 | 255 | 255 | 255 | 255 | 255 | 255 | 255 | 255 | 255 | 255 | 255 | 255 |
| 433 to 448 | | 255 | 255 | 255 | 255 | 255 | 255 | 255 | 255 | 255 | 255 | 255 | 255 | 255 | 255 | 255 | 255 |
| 449 to 464 | | 255 | 255 | 255 | 255 | 255 | 255 | 255 | 255 | 255 | 255 | 255 | 255 | 255 | 255 | 255 | 255 |
| 465 to 480 | | 255 | 255 | 255 | 255 | 255 | 255 | 255 | 255 | 255 | 255 | 255 | 255 | 255 | 255 | 255 | 255 |
| 481 to 496 | | 255 | 255 | 255 | 255 | 255 | 255 | 255 | 255 | 255 | 255 | 255 | 255 | 255 | 255 | 255 | 255 |
| 497 to 512 | | 255 | 255 | 255 | 255 | 255 | 255 | 255 | 255 | 255 | 255 | 255 | 255 | 255 | 255 | 255 | 255 |
| 513 to 528 | | 255 | 255 | 255 | 255 | 255 | 255 | 255 | 255 | 255 | 255 | 255 | 255 | 255 | 255 | 255 | 255 |
| 529 to 544 | | 255 | 255 | 255 | 255 | 255 | 255 | 255 | 255 | 255 | 255 | 255 | 255 | 255 | 255 | 255 | 255 |
| 545 to 560 | | 255 | 255 | 255 | 255 | 255 | 255 | 255 | 255 | 255 | 255 | 255 | 255 | 255 | 255 | 255 | 255 |
| 561 to 576 | | 255 | 255 | 255 | 255 | 255 | 255 | 255 | 255 | 255 | 255 | 255 | 255 | 255 | 255 | 255 | 255 |
| 577 to 592 | | 255 | 255 | 255 | 255 | 255 | 255 | 255 | 255 | 255 | 255 | 255 | 255 | 255 | 255 | 255 | 255 |
| 593 to 608 | | 255 | 255 | 255 | 255 | 255 | 255 | 255 | 255 | 255 | 255 | 255 | 255 | 255 | 255 | 255 | 255 |
| 609 to 624 | | 255 | 255 | 255 | 255 | 255 | 255 | 255 | 255 | 255 | 255 | 255 | 255 | 255 | 255 | 255 | 255 |
| 625 to 640 | | 255 | 255 | 255 | 255 | 255 | 255 | 255 | 255 | 255 | 255 | 255 | 255 | 255 | 255 | 255 | 255 |
| 641 to 656 | | 255 | 255 | 255 | 255 | 255 | 255 | 255 | 255 | 255 | 255 | 255 | 255 | 255 | 255 | 255 | 255 |
| 657 to 672 | | 255 | 255 | 255 | 255 | 255 | 255 | 255 | 255 | 255 | 255 | 255 | 255 | 255 | 255 | 255 | 255 |
| 673 to 688 | | 255 | 255 | 255 | 255 | 255 | 255 | 255 | 255 | 255 | 255 | 255 | 255 | 255 | 255 | 255 | 255 |
| 689 to 704 | | 255 | 255 | 255 | 255 | 255 | 255 | 255 | 255 | 255 | 255 | 255 | 255 | 255 | 255 | 255 | 255 |
| 705 to 720 | | 255 | 255 | 255 | 255 | 255 | 255 | 255 | 255 | 255 | 255 | 255 | 255 | 255 | 255 | 255 | 255 |
| 721 to 736 | | 255 | 255 | 255 | 255 | 255 | 255 | 255 | 255 | 255 | 255 | 255 | 255 | 255 | 255 | 255 | 255 |
| 737 to 752 | | 0 | 0 | 0 | 0 | 0 | 0 | 0 | 0 | 0 | 0 | 0 | 0 | 0 | 0 | 0 | 0 |
| 753 to 768 | | 0 | 0 | 0 | 0 | 0 | 0 | 0 | 0 | 0 | 0 | 0 | 0 | 0 | 0 | 0 | 0 |
| 769 to 784 | | 254 | 255 | 127 | 0 | 0 | 0 | 0 | 0 | 255 | 255 | 255 | 0 | 0 | 0 | 0 | 0 |
| 785 to 800 | | 255 | 255 | 255 | 255 | 255 | 255 | 255 | 255 | 255 | 255 | 255 | 255 | 255 | 255 | 255 | 255 |
| 801 to 816 | | 255 | 255 | 255 | 255 | 255 | 255 | 255 | 255 | 255 | 255 | 255 | 255 | 255 | 255 | 255 | 255 |
| 817 to 832 | | 255 | 255 | 255 | 255 | 255 | 255 | 255 | 255 | 255 | 255 | 255 | 255 | 255 | 255 | 255 | 255 |
| 833 to 848 | | 255 | 255 | 255 | 255 | 255 | 255 | 255 | 255 | 255 | 255 | 255 | 255 | 255 | 255 | 255 | 255 |
| 849 to 864 | | 255 | 255 | 255 | 255 | 255 | 255 | 255 | 255 | 255 | 255 | 255 | 255 | 255 | 255 | 255 | 255 |
| 865 to 880 | | 255 | 255 | 255 | 255 | 255 | 255 | 255 | 255 | 255 | 255 | 255 | 255 | 255 | 255 | 255 | 255 |
| 881 to 896 | | 255 | 255 | 255 | 255 | 255 | 255 | 255 | 255 | 255 | 255 | 255 | 255 | 255 | 255 | 255 | 255 |
| 897 to 912 | | 255 | 255 | 255 | 255 | 255 | 255 | 255 | 255 | 255 | 255 | 255 | 255 | 255 | 255 | 255 | 255 |
| 913 to 928 | | 255 | 255 | 255 | 255 | 255 | 255 | 255 | 255 | 255 | 255 | 255 | 255 | 255 | 255 | 255 | 255 |
| 929 to 944 | | 255 | 255 | 255 | 255 | 255 | 255 | 255 | 255 | 255 | 255 | 255 | 255 | 255 | 255 | 255 | 255 |
| 945 to 960 | | 255 | 255 | 255 | 255 | 255 | 255 | 255 | 255 | 255 | 255 | 255 | 255 | 255 | 255 | 255 | 255 |
| 961 to 976 | | 255 | 255 | 255 | 255 | 255 | 255 | 255 | 255 | 255 | 255 | 255 | 255 | 255 | 255 | 255 | 255 |
| 977 to 992 | | 255 | 255 | 255 | 255 | 255 | 255 | 255 | 255 | 255 | 255 | 255 | 255 | 255 | 255 | 255 | 255 |
| 993 to 1008 | | 255 | 255 | 255 | 255 | 255 | 255 | 255 | 255 | 255 | 255 | 255 | 255 | 255 | 255 | 255 | 255 |
| 1009 to 1024 | | 255 | 255 | 255 | 255 | 255 | 255 | 255 | 255 | 255 | 255 | 255 | 255 | 255 | 255 | 255 | 255 |
| 1025 to 1040 | | 255 | 255 | 255 | 255 | 255 | 255 | 255 | 255 | 255 | 255 | 255 | 255 | 255 | 255 | 255 | 255 |
| 1041 to 1056 | | 255 | 255 | 255 | 255 | 255 | 255 | 255 | 255 | 255 | 255 | 255 | 255 | 255 | 255 | 255 | 255 |
| 1057 to 1072 | | 255 | 255 | 255 | 255 | 255 | 255 | 255 | 255 | 255 | 255 | 255 | 255 | 255 | 255 | 255 | 255 |
| 1073 to 1088 | | 255 | 255 | 255 | 255 | 255 | 255 | 255 | 255 | 255 | 255 | 255 | 255 | 255 | 255 | 255 | 255 |
| 1089 to 1104 | | 255 | 255 | 255 | 255 | 255 | 255 | 255 | 255 | 255 | 255 | 255 | 255 | 255 | 255 | 255 | 255 |
| 1105 to 1120 | | 255 | 255 | 255 | 255 | 255 | 255 | 255 | 255 | 255 | 255 | 255 | 255 | 255 | 255 | 255 | 255 |
| 1121 to 1136 | | 255 | 255 | 255 | 255 | 255 | 255 | 255 | 255 | 255 | 255 | 255 | 255 | 255 | 255 | 255 | 255 |
| 1137 to 1152 | | 255 | 255 | 255 | 255 | 255 | 255 | 255 | 255 | 255 | 255 | 255 | 255 | 255 | 255 | 255 | 255 |
| 1153 to 1168 | | 255 | 255 | 255 | 255 | 255 | 255 | 255 | 255 | 255 | 255 | 255 | 255 | 255 | 255 | 255 | 255 |
| 1169 to 1184 | | 255 | 255 | 255 | 255 | 255 | 255 | 255 | 255 | 255 | 255 | 255 | 255 | 255 | 255 | 255 | 255 |
| 1185 to 1200 | | 255 | 255 | 255 | 255 | 255 | 255 | 255 | 255 | 255 | 255 | 255 | 255 | 255 | 255 | 255 | 255 |
| 1201 to 1216 | | 255 | 255 | 255 | 255 | 255 | 255 | 255 | 255 | 255 | 255 | 255 | 255 | 255 | 255 | 255 | 255 |
| 1217 to 1232 | | 255 | 255 | 255 | 255 | 255 | 255 | 255 | 255 | 0 | 0 | 0 | 0 | 0 | 0 | 0 | 0 |

TABLE 1-continued

| Address | Content | | | | | | | | | | | | | | | | |
|---|---|---|---|---|---|---|---|---|---|---|---|---|---|---|---|---|---|
| 1233 to 1248 | | 0 | 0 | 0 | 0 | 0 | 0 | 0 | 0 | 0 | 0 | 0 | 0 | 0 | 0 | 0 | 0 |
| 1249 to 1264 | | 0 | 0 | 0 | 0 | 0 | 0 | 0 | 0 | 0 | 0 | 0 | 0 | 0 | 0 | 0 | 0 |
| 1265 to 1280 | | 0 | 0 | 0 | 0 | 0 | 0 | 0 | 0 | 0 | 0 | 0 | 0 | 0 | 0 | 0 | 0 |
| 1281 to 1296 | | 248 | 255 | 255 | 0 | 0 | 0 | 0 | 0 | 255 | 255 | 255 | 0 | 0 | 0 | 0 | 0 |
| 1297 to 1312 | | 255 | 255 | 255 | 1 | 0 | 0 | 0 | 0 | 255 | 255 | 255 | 255 | 255 | 255 | 255 | 255 |
| 1313 to 1328 | | 255 | 255 | 255 | 255 | 255 | 255 | 255 | 255 | 255 | 255 | 255 | 255 | 255 | 255 | 255 | 255 |
| 1329 to 1344 | | 255 | 255 | 255 | 255 | 255 | 255 | 255 | 255 | 255 | 255 | 255 | 255 | 255 | 255 | 255 | 255 |
| 1345 to 1360 | | 255 | 255 | 255 | 255 | 255 | 255 | 255 | 255 | 255 | 255 | 255 | 255 | 255 | 255 | 255 | 255 |
| 1361 to 1376 | | 255 | 255 | 255 | 255 | 255 | 255 | 255 | 255 | 255 | 255 | 255 | 255 | 255 | 255 | 255 | 255 |
| 1377 to 1392 | | 255 | 255 | 255 | 255 | 255 | 255 | 255 | 255 | 255 | 255 | 255 | 255 | 255 | 255 | 255 | 255 |
| 1393 to 1408 | | 255 | 255 | 255 | 255 | 255 | 255 | 255 | 255 | 255 | 255 | 255 | 255 | 255 | 255 | 255 | 255 |
| 1409 to 1424 | | 255 | 255 | 255 | 255 | 255 | 255 | 255 | 255 | 255 | 255 | 255 | 255 | 255 | 255 | 255 | 255 |
| 1425 to 1440 | | 255 | 255 | 255 | 255 | 255 | 255 | 255 | 255 | 255 | 255 | 255 | 255 | 255 | 255 | 255 | 255 |
| 1441 to 1456 | | 255 | 255 | 255 | 255 | 255 | 255 | 255 | 255 | 255 | 255 | 255 | 255 | 255 | 255 | 255 | 255 |
| 1457 to 1472 | | 255 | 255 | 255 | 255 | 255 | 255 | 255 | 255 | 255 | 255 | 255 | 255 | 255 | 255 | 255 | 255 |
| 1473 to 1488 | | 255 | 255 | 255 | 255 | 255 | 255 | 255 | 255 | 255 | 255 | 255 | 255 | 255 | 255 | 255 | 255 |
| 1489 to 1504 | | 255 | 255 | 255 | 255 | 255 | 255 | 255 | 255 | 255 | 255 | 255 | 255 | 255 | 255 | 255 | 255 |
| 1505 to 1520 | | 255 | 255 | 255 | 255 | 255 | 255 | 255 | 255 | 255 | 255 | 255 | 255 | 255 | 255 | 255 | 255 |
| 1521 to 1536 | | 255 | 255 | 255 | 255 | 255 | 255 | 255 | 255 | 255 | 255 | 255 | 255 | 255 | 255 | 255 | 255 |
| 1537 to 1552 | | 255 | 255 | 255 | 255 | 255 | 255 | 255 | 255 | 255 | 255 | 255 | 255 | 255 | 255 | 255 | 255 |
| 1553 to 1568 | | 255 | 255 | 255 | 255 | 255 | 255 | 255 | 255 | 255 | 255 | 255 | 255 | 255 | 255 | 255 | 255 |
| 1569 to 1584 | | 255 | 255 | 255 | 255 | 255 | 255 | 255 | 255 | 255 | 255 | 255 | 255 | 255 | 255 | 255 | 255 |
| 1585 to 1600 | | 255 | 255 | 255 | 255 | 255 | 255 | 255 | 255 | 255 | 255 | 255 | 255 | 255 | 255 | 255 | 255 |
| 1601 to 1616 | | 255 | 255 | 255 | 255 | 255 | 255 | 255 | 255 | 255 | 255 | 255 | 255 | 255 | 255 | 255 | 255 |
| 1617 to 1632 | | 255 | 255 | 255 | 255 | 255 | 255 | 255 | 255 | 255 | 255 | 255 | 255 | 255 | 255 | 255 | 255 |
| 1633 to 1648 | | 255 | 255 | 255 | 255 | 255 | 255 | 255 | 255 | 255 | 255 | 255 | 255 | 255 | 255 | 255 | 255 |
| 1649 to 1664 | | 255 | 255 | 255 | 255 | 255 | 255 | 255 | 255 | 255 | 255 | 255 | 255 | 255 | 255 | 255 | 255 |
| 1665 to 1680 | | 255 | 255 | 255 | 255 | 255 | 255 | 255 | 255 | 255 | 255 | 255 | 255 | 255 | 255 | 255 | 255 |
| 1681 to 1696 | | 255 | 255 | 255 | 255 | 255 | 255 | 255 | 255 | 255 | 255 | 255 | 255 | 255 | 255 | 255 | 255 |
| 1697 to 1712 | | 255 | 255 | 255 | 255 | 255 | 255 | 255 | 255 | 255 | 255 | 255 | 255 | 255 | 255 | 255 | 255 |
| 1713 to 1728 | | 0 | 64 | 0 | 0 | 0 | 0 | 0 | 0 | 0 | 0 | 0 | 0 | 0 | 0 | 0 | 0 |
| 1729 to 1744 | | 0 | 0 | 0 | 0 | 0 | 0 | 0 | 0 | 0 | 0 | 0 | 0 | 0 | 0 | 0 | 0 |
| 1745 to 1760 | | 0 | 0 | 0 | 0 | 0 | 0 | 0 | 0 | 0 | 0 | 0 | 0 | 0 | 0 | 0 | 0 |
| 1761 to 1776 | | 0 | 0 | 0 | 0 | 0 | 0 | 0 | 0 | 0 | 0 | 0 | 0 | 0 | 0 | 0 | 0 |
| 1777 to 1792 | | 0 | 0 | 0 | 0 | 0 | 0 | 0 | 0 | 0 | 255 | 127 | 0 | 0 | 0 | 0 | 0 |
| 1793 to 1808 | | 224 | 255 | 255 | 0 | 0 | 0 | 0 | 0 | 252 | 255 | 255 | 1 | 0 | 0 | 0 | 0 |
| 1809 to 1824 | | 255 | 255 | 255 | 3 | 0 | 0 | 0 | 0 | 255 | 255 | 255 | 3 | 0 | 0 | 0 | 0 |
| 1825 to 1840 | | 255 | 255 | 255 | 255 | 255 | 255 | 255 | 255 | 255 | 255 | 255 | 255 | 255 | 255 | 255 | 255 |
| 1841 to 1856 | | 255 | 255 | 255 | 255 | 255 | 255 | 255 | 255 | 255 | 255 | 255 | 255 | 255 | 255 | 255 | 255 |
| 1857 to 1872 | | 255 | 255 | 255 | 255 | 255 | 255 | 255 | 255 | 255 | 255 | 255 | 255 | 255 | 255 | 255 | 255 |
| 1873 to 1888 | | 255 | 255 | 255 | 255 | 255 | 255 | 255 | 255 | 255 | 255 | 255 | 255 | 255 | 255 | 255 | 255 |
| 1889 to 1904 | | 255 | 255 | 255 | 255 | 255 | 255 | 255 | 255 | 255 | 255 | 255 | 255 | 255 | 255 | 255 | 255 |
| 1905 to 1920 | | 255 | 255 | 255 | 255 | 255 | 255 | 255 | 255 | 255 | 255 | 255 | 255 | 255 | 255 | 255 | 255 |
| 1921 to 1936 | | 255 | 255 | 255 | 255 | 255 | 255 | 255 | 255 | 255 | 255 | 255 | 255 | 255 | 255 | 255 | 255 |
| 1937 to 1952 | | 255 | 255 | 255 | 255 | 255 | 255 | 255 | 255 | 255 | 255 | 255 | 255 | 255 | 255 | 255 | 255 |
| 1953 to 1968 | | 255 | 255 | 255 | 255 | 255 | 255 | 255 | 255 | 255 | 255 | 255 | 255 | 255 | 255 | 255 | 255 |
| 1969 to 1984 | | 255 | 255 | 255 | 255 | 255 | 255 | 255 | 255 | 255 | 255 | 255 | 255 | 255 | 255 | 255 | 255 |
| 1985 to 2000 | | 255 | 255 | 255 | 255 | 255 | 255 | 255 | 255 | 255 | 255 | 255 | 255 | 255 | 255 | 255 | 255 |
| 2001 to 2016 | | 255 | 255 | 255 | 255 | 255 | 255 | 255 | 255 | 255 | 255 | 255 | 255 | 255 | 255 | 255 | 255 |
| 2017 to 2032 | | 255 | 255 | 255 | 255 | 255 | 255 | 255 | 255 | 255 | 255 | 255 | 255 | 255 | 255 | 255 | 255 |
| 2033 to 2048 | | 255 | 255 | 255 | 255 | 255 | 255 | 255 | 255 | 255 | 255 | 255 | 255 | 255 | 255 | 255 | 255 |
| 2049 to 2064 | | 255 | 255 | 255 | 255 | 255 | 255 | 255 | 255 | 255 | 255 | 255 | 255 | 255 | 255 | 255 | 255 |
| 2065 to 2080 | | 255 | 255 | 255 | 255 | 255 | 255 | 255 | 255 | 255 | 255 | 255 | 255 | 255 | 255 | 255 | 255 |
| 2081 to 2096 | | 255 | 255 | 255 | 255 | 255 | 255 | 255 | 255 | 255 | 255 | 255 | 255 | 255 | 255 | 255 | 255 |
| 2097 to 2112 | | 255 | 255 | 255 | 255 | 255 | 255 | 255 | 255 | 255 | 255 | 255 | 255 | 255 | 255 | 255 | 255 |
| 2113 to 2128 | | 255 | 255 | 255 | 255 | 255 | 255 | 255 | 255 | 255 | 255 | 255 | 255 | 255 | 255 | 255 | 255 |
| 2129 to 2144 | | 255 | 255 | 255 | 255 | 255 | 255 | 255 | 255 | 255 | 255 | 255 | 255 | 255 | 255 | 255 | 255 |
| 2145 to 2160 | | 255 | 255 | 255 | 255 | 255 | 255 | 255 | 255 | 255 | 255 | 255 | 255 | 255 | 255 | 255 | 255 |
| 2161 to 2176 | | 255 | 255 | 255 | 255 | 255 | 255 | 255 | 255 | 255 | 255 | 255 | 255 | 255 | 255 | 255 | 255 |
| 2177 to 2192 | | 255 | 255 | 255 | 255 | 255 | 255 | 255 | 255 | 255 | 255 | 255 | 255 | 255 | 255 | 255 | 255 |
| 2193 to 2208 | | 255 | 255 | 255 | 255 | 255 | 255 | 255 | 255 | 0 | 0 | 0 | 0 | 0 | 0 | 0 | 0 |
| 2209 to 2224 | | 0 | 0 | 0 | 0 | 0 | 0 | 0 | 0 | 0 | 0 | 0 | 0 | 0 | 0 | 0 | 0 |
| 2225 to 2240 | | 0 | 0 | 0 | 0 | 0 | 0 | 0 | 0 | 0 | 0 | 0 | 0 | 0 | 0 | 0 | 0 |
| 2241 to 2256 | | 0 | 0 | 0 | 0 | 0 | 0 | 0 | 0 | 0 | 0 | 0 | 0 | 0 | 0 | 0 | 0 |
| 2257 to 2272 | | 0 | 0 | 0 | 0 | 0 | 0 | 0 | 0 | 0 | 0 | 0 | 0 | 0 | 0 | 0 | 0 |
| 2273 to 2288 | | 0 | 0 | 0 | 0 | 0 | 0 | 0 | 0 | 0 | 0 | 0 | 0 | 0 | 0 | 0 | 0 |
| 2289 to 2304 | | 0 | 0 | 0 | 0 | 0 | 0 | 0 | 0 | 0 | 254 | 255 | 0 | 0 | 0 | 0 | 0 |
| 2305 to 2320 | | 128 | 255 | 255 | 0 | 0 | 0 | 0 | 0 | 240 | 255 | 255 | 1 | 0 | 0 | 0 | 0 |
| 2321 to 2336 | | 254 | 255 | 255 | 3 | 0 | 0 | 0 | 0 | 255 | 255 | 255 | 7 | 0 | 0 | 0 | 0 |
| 2337 to 2352 | | 255 | 255 | 255 | 7 | 0 | 0 | 0 | 0 | 255 | 255 | 255 | 15 | 0 | 0 | 0 | 0 |
| 2353 to 2368 | | 255 | 255 | 255 | 255 | 255 | 255 | 255 | 255 | 255 | 255 | 255 | 255 | 255 | 255 | 255 | 255 |
| 2369 to 2384 | | 255 | 255 | 255 | 255 | 255 | 255 | 255 | 255 | 255 | 255 | 255 | 255 | 255 | 255 | 255 | 255 |
| 2385 to 2400 | | 255 | 255 | 255 | 255 | 255 | 255 | 255 | 255 | 255 | 255 | 255 | 255 | 255 | 255 | 255 | 255 |
| 2401 to 2416 | | 255 | 255 | 255 | 255 | 255 | 255 | 255 | 255 | 255 | 255 | 255 | 255 | 255 | 255 | 255 | 255 |
| 2417 to 2432 | | 255 | 255 | 255 | 255 | 255 | 255 | 255 | 255 | 255 | 255 | 255 | 255 | 255 | 255 | 255 | 255 |
| 2433 to 2448 | | 255 | 255 | 255 | 255 | 255 | 255 | 255 | 255 | 255 | 255 | 255 | 255 | 255 | 255 | 255 | 255 |
| 2449 to 2464 | | 255 | 255 | 255 | 255 | 255 | 255 | 255 | 255 | 255 | 255 | 255 | 255 | 255 | 255 | 255 | 255 |

TABLE 1-continued

| Address | Content | | | | | | | | | | | | | | | |
|---|---|---|---|---|---|---|---|---|---|---|---|---|---|---|---|---|
| 2465 to 2480 | 255 | 255 | 255 | 255 | 255 | 255 | 255 | 255 | 255 | 255 | 255 | 255 | 255 | 255 | 255 | 255 |
| 2481 to 2496 | 255 | 255 | 255 | 255 | 255 | 255 | 255 | 255 | 255 | 255 | 255 | 255 | 255 | 255 | 255 | 255 |
| 2497 to 2512 | 255 | 255 | 255 | 255 | 255 | 255 | 255 | 255 | 255 | 255 | 255 | 255 | 255 | 255 | 255 | 255 |
| 2513 to 2528 | 255 | 255 | 255 | 255 | 255 | 255 | 255 | 255 | 255 | 255 | 255 | 255 | 255 | 255 | 255 | 255 |
| 2529 to 2544 | 255 | 255 | 255 | 255 | 255 | 255 | 255 | 255 | 255 | 255 | 255 | 255 | 255 | 255 | 255 | 255 |
| 2545 to 2560 | 255 | 255 | 255 | 255 | 255 | 255 | 255 | 255 | 255 | 255 | 255 | 255 | 255 | 255 | 255 | 255 |
| 2561 to 2576 | 255 | 255 | 255 | 255 | 255 | 255 | 255 | 255 | 255 | 255 | 255 | 255 | 255 | 255 | 255 | 255 |
| 2577 to 2592 | 255 | 255 | 255 | 255 | 255 | 255 | 255 | 255 | 255 | 255 | 255 | 255 | 255 | 255 | 255 | 255 |
| 2593 to 2608 | 255 | 255 | 255 | 255 | 255 | 255 | 255 | 255 | 255 | 255 | 255 | 255 | 255 | 255 | 255 | 255 |
| 2609 to 2624 | 255 | 255 | 255 | 255 | 255 | 255 | 255 | 255 | 255 | 255 | 255 | 255 | 255 | 255 | 255 | 255 |
| 2625 to 2640 | 255 | 255 | 255 | 255 | 255 | 255 | 255 | 255 | 255 | 255 | 255 | 255 | 255 | 255 | 255 | 255 |
| 2641 to 2656 | 255 | 255 | 255 | 255 | 255 | 255 | 255 | 255 | 255 | 255 | 255 | 255 | 255 | 255 | 255 | 255 |
| 2657 to 2672 | 255 | 255 | 255 | 255 | 255 | 255 | 255 | 255 | 255 | 255 | 255 | 255 | 255 | 255 | 255 | 255 |
| 2673 to 2688 | 255 | 255 | 255 | 255 | 255 | 255 | 255 | 255 | 255 | 255 | 255 | 255 | 255 | 255 | 255 | 255 |
| 2689 to 2704 | 0 | 0 | 0 | 0 | 0 | 0 | 0 | 0 | 0 | 0 | 0 | 0 | 0 | 0 | 0 | 0 |
| 2705 to 2720 | 0 | 0 | 0 | 0 | 0 | 0 | 0 | 0 | 0 | 0 | 0 | 0 | 0 | 0 | 0 | 0 |
| 2721 to 2736 | 0 | 0 | 0 | 0 | 0 | 0 | 0 | 0 | 0 | 0 | 0 | 0 | 0 | 0 | 0 | 0 |
| 2737 to 2752 | 0 | 0 | 4 | 0 | 0 | 0 | 0 | 0 | 0 | 0 | 2 | 0 | 0 | 0 | 0 | 0 |
| 2753 to 2768 | 0 | 0 | 0 | 0 | 0 | 0 | 0 | 0 | 0 | 0 | 0 | 0 | 0 | 0 | 0 | 0 |
| 2769 to 2784 | 0 | 0 | 0 | 0 | 0 | 0 | 0 | 0 | 0 | 0 | 0 | 0 | 0 | 0 | 0 | 0 |
| 2785 to 2800 | 0 | 0 | 0 | 0 | 0 | 0 | 0 | 0 | 0 | 0 | 0 | 0 | 0 | 0 | 0 | 0 |
| 2801 to 2816 | 0 | 0 | 0 | 0 | 0 | 0 | 0 | 0 | 0 | 248 | 255 | 0 | 0 | 0 | 0 | 0 |
| 2817 to 2832 | 0 | 255 | 255 | 1 | 0 | 0 | 0 | 0 | 192 | 255 | 255 | 1 | 0 | 0 | 0 | 0 |
| 2833 to 2848 | 248 | 255 | 255 | 3 | 0 | 0 | 0 | 0 | 255 | 255 | 255 | 7 | 0 | 0 | 0 | 0 |
| 2849 to 2864 | 255 | 255 | 255 | 15 | 0 | 0 | 0 | 0 | 255 | 255 | 255 | 15 | 0 | 0 | 0 | 0 |
| 2865 to 2880 | 255 | 255 | 255 | 31 | 0 | 0 | 0 | 0 | 255 | 255 | 255 | 255 | 255 | 255 | 255 | 255 |
| 2881 to 2896 | 255 | 255 | 255 | 255 | 255 | 255 | 255 | 255 | 255 | 255 | 255 | 255 | 255 | 255 | 255 | 255 |
| 2897 to 2912 | 255 | 255 | 255 | 255 | 255 | 255 | 255 | 255 | 255 | 255 | 255 | 255 | 255 | 255 | 255 | 255 |
| 2913 to 2928 | 255 | 255 | 255 | 255 | 255 | 255 | 255 | 255 | 255 | 255 | 255 | 255 | 255 | 255 | 255 | 255 |
| 2929 to 2944 | 255 | 255 | 255 | 255 | 255 | 255 | 255 | 255 | 255 | 255 | 255 | 255 | 255 | 255 | 255 | 255 |
| 2945 to 2960 | 255 | 255 | 255 | 255 | 255 | 255 | 255 | 255 | 255 | 255 | 255 | 255 | 255 | 255 | 255 | 255 |
| 2961 to 2976 | 255 | 255 | 255 | 255 | 255 | 255 | 255 | 255 | 255 | 255 | 255 | 255 | 255 | 255 | 255 | 255 |
| 2977 to 2992 | 255 | 255 | 255 | 255 | 255 | 255 | 255 | 255 | 255 | 255 | 255 | 255 | 255 | 255 | 255 | 255 |
| 2993 to 3008 | 255 | 255 | 255 | 255 | 255 | 255 | 255 | 255 | 255 | 255 | 255 | 255 | 255 | 255 | 255 | 255 |
| 3009 to 3024 | 255 | 255 | 255 | 255 | 255 | 255 | 255 | 255 | 255 | 255 | 255 | 255 | 255 | 255 | 255 | 255 |
| 3025 to 3040 | 255 | 255 | 255 | 255 | 255 | 255 | 255 | 255 | 255 | 255 | 255 | 255 | 255 | 255 | 255 | 255 |
| 3041 to 3056 | 255 | 255 | 255 | 255 | 255 | 255 | 255 | 255 | 255 | 255 | 255 | 255 | 255 | 255 | 255 | 255 |
| 3057 to 3072 | 255 | 255 | 255 | 255 | 255 | 255 | 255 | 255 | 255 | 255 | 255 | 255 | 255 | 255 | 255 | 255 |
| 3073 to 3088 | 255 | 255 | 255 | 255 | 255 | 255 | 255 | 255 | 255 | 255 | 255 | 255 | 255 | 255 | 255 | 255 |
| 3089 to 3104 | 255 | 255 | 255 | 255 | 255 | 255 | 255 | 255 | 255 | 255 | 255 | 255 | 255 | 255 | 255 | 255 |
| 3105 to 3120 | 255 | 255 | 255 | 255 | 255 | 255 | 255 | 255 | 255 | 255 | 255 | 255 | 255 | 255 | 255 | 255 |
| 3121 to 3136 | 255 | 255 | 255 | 255 | 255 | 255 | 255 | 255 | 255 | 255 | 255 | 255 | 255 | 255 | 255 | 255 |
| 3137 to 3152 | 255 | 255 | 255 | 255 | 255 | 255 | 255 | 255 | 255 | 255 | 255 | 255 | 255 | 255 | 255 | 255 |
| 3153 to 3168 | 255 | 255 | 255 | 255 | 255 | 255 | 255 | 255 | 255 | 255 | 255 | 255 | 255 | 255 | 255 | 255 |
| 3169 to 3184 | 255 | 255 | 255 | 255 | 255 | 255 | 255 | 255 | 0 | 0 | 0 | 0 | 0 | 0 | 0 | 0 |
| 3185 to 3200 | 0 | 0 | 0 | 0 | 0 | 0 | 0 | 0 | 0 | 0 | 0 | 0 | 0 | 0 | 0 | 0 |
| 3201 to 3216 | 0 | 0 | 0 | 0 | 0 | 0 | 0 | 0 | 0 | 0 | 0 | 0 | 0 | 0 | 0 | 0 |
| 3217 to 3232 | 0 | 0 | 0 | 0 | 0 | 0 | 0 | 0 | 0 | 0 | 0 | 0 | 0 | 0 | 0 | 0 |
| 3233 to 3248 | 0 | 0 | 0 | 0 | 0 | 0 | 0 | 0 | 0 | 0 | 0 | 0 | 0 | 0 | 0 | 0 |
| 3249 to 3264 | 0 | 0 | 8 | 0 | 0 | 0 | 0 | 0 | 0 | 0 | 0 | 0 | 0 | 0 | 0 | 0 |
| 3265 to 3280 | 0 | 0 | 0 | 0 | 0 | 0 | 0 | 0 | 0 | 0 | 0 | 0 | 0 | 0 | 0 | 0 |
| 3281 to 3296 | 0 | 0 | 0 | 0 | 0 | 0 | 0 | 0 | 0 | 0 | 0 | 0 | 0 | 0 | 0 | 0 |
| 3297 to 3312 | 0 | 0 | 0 | 0 | 0 | 0 | 0 | 0 | 0 | 0 | 0 | 0 | 0 | 0 | 0 | 0 |
| 3313 to 3328 | 0 | 0 | 0 | 0 | 0 | 0 | 0 | 0 | 0 | 224 | 255 | 0 | 0 | 0 | 0 | 0 |
| 3329 to 3344 | 128 | 252 | 255 | 1 | 0 | 0 | 0 | 0 | 128 | 255 | 255 | 3 | 0 | 0 | 0 | 0 |
| 3345 to 3360 | 224 | 255 | 255 | 7 | 0 | 0 | 0 | 0 | 252 | 255 | 255 | 7 | 0 | 0 | 0 | 0 |
| 3361 to 3376 | 255 | 255 | 255 | 15 | 0 | 0 | 0 | 0 | 255 | 255 | 255 | 31 | 0 | 0 | 0 | 0 |
| 3377 to 3392 | 255 | 255 | 255 | 31 | 0 | 0 | 0 | 0 | 255 | 255 | 255 | 63 | 0 | 0 | 0 | 0 |
| 3393 to 3408 | 255 | 255 | 255 | 255 | 255 | 255 | 255 | 255 | 255 | 255 | 255 | 255 | 255 | 255 | 255 | 255 |
| 3409 to 3424 | 255 | 255 | 255 | 255 | 255 | 255 | 255 | 255 | 255 | 255 | 255 | 255 | 255 | 255 | 255 | 255 |
| 3425 to 3440 | 255 | 255 | 255 | 255 | 255 | 255 | 255 | 255 | 255 | 255 | 255 | 255 | 255 | 255 | 255 | 255 |
| 3441 to 3456 | 255 | 255 | 255 | 255 | 255 | 255 | 255 | 255 | 255 | 255 | 255 | 255 | 255 | 255 | 255 | 255 |
| 3457 to 3472 | 255 | 255 | 255 | 255 | 255 | 255 | 255 | 255 | 255 | 255 | 255 | 255 | 255 | 255 | 255 | 255 |
| 3473 to 3488 | 255 | 255 | 255 | 255 | 255 | 255 | 255 | 255 | 255 | 255 | 255 | 255 | 255 | 255 | 255 | 255 |
| 3489 to 3504 | 255 | 255 | 255 | 255 | 255 | 255 | 255 | 255 | 255 | 255 | 255 | 255 | 255 | 255 | 255 | 255 |
| 3505 to 3520 | 255 | 255 | 255 | 255 | 255 | 255 | 255 | 255 | 255 | 255 | 255 | 255 | 255 | 255 | 255 | 255 |
| 3521 to 3536 | 255 | 255 | 255 | 255 | 255 | 255 | 255 | 255 | 255 | 255 | 255 | 255 | 255 | 255 | 255 | 255 |
| 3537 to 3552 | 255 | 255 | 255 | 255 | 255 | 255 | 255 | 255 | 255 | 255 | 255 | 255 | 255 | 255 | 255 | 255 |
| 3553 to 3568 | 255 | 255 | 255 | 255 | 255 | 255 | 255 | 255 | 255 | 255 | 255 | 255 | 255 | 255 | 255 | 255 |
| 3569 to 3584 | 255 | 255 | 255 | 255 | 255 | 255 | 255 | 255 | 255 | 255 | 255 | 255 | 255 | 255 | 255 | 255 |
| 3585 to 3600 | 255 | 255 | 255 | 255 | 255 | 255 | 255 | 255 | 255 | 255 | 255 | 255 | 255 | 255 | 255 | 255 |
| 3601 to 3616 | 255 | 255 | 255 | 255 | 255 | 255 | 255 | 255 | 255 | 255 | 255 | 255 | 255 | 255 | 255 | 255 |
| 3617 to 3632 | 255 | 255 | 255 | 255 | 255 | 255 | 255 | 255 | 255 | 255 | 255 | 255 | 255 | 255 | 255 | 255 |
| 3633 to 3648 | 255 | 255 | 255 | 255 | 255 | 255 | 255 | 255 | 255 | 255 | 255 | 255 | 255 | 255 | 255 | 255 |
| 3649 to 3664 | 255 | 255 | 255 | 255 | 255 | 255 | 255 | 255 | 255 | 255 | 255 | 255 | 255 | 255 | 255 | 255 |
| 3665 to 3680 | 0 | 0 | 0 | 0 | 0 | 0 | 0 | 0 | 0 | 0 | 0 | 0 | 0 | 0 | 0 | 0 |
| 3681 to 3696 | 0 | 0 | 0 | 0 | 0 | 0 | 0 | 0 | 0 | 0 | 0 | 0 | 0 | 0 | 0 | 0 |

TABLE 1-continued

| Address | Content | | | | | | | | | | | | | | | |
|---|---|---|---|---|---|---|---|---|---|---|---|---|---|---|---|---|
| 3697 to 3712 | 0 | 0 | 0 | 0 | 0 | 0 | 0 | 0 | 0 | 0 | 0 | 0 | 0 | 0 | 0 | 0 |
| 3713 to 3728 | 0 | 0 | 0 | 0 | 0 | 0 | 0 | 0 | 0 | 0 | 0 | 0 | 0 | 0 | 0 | 0 |
| 3729 to 3744 | 0 | 0 | 0 | 0 | 0 | 0 | 0 | 0 | 0 | 0 | 0 | 0 | 0 | 0 | 0 | 0 |
| 3745 to 3760 | 0 | 0 | 0 | 0 | 0 | 0 | 0 | 0 | 0 | 0 | 96 | 0 | 0 | 0 | 0 | 0 |
| 3761 to 3776 | 0 | 0 | 0 | 0 | 0 | 0 | 0 | 0 | 0 | 0 | 0 | 0 | 0 | 0 | 0 | 0 |
| 3777 to 3792 | 0 | 0 | 0 | 0 | 0 | 0 | 0 | 0 | 0 | 0 | 8 | 0 | 0 | 0 | 0 | 0 |
| 3793 to 3808 | 0 | 0 | 0 | 0 | 0 | 0 | 0 | 0 | 0 | 0 | 0 | 0 | 0 | 0 | 0 | 0 |
| 3809 to 3824 | 0 | 0 | 0 | 0 | 0 | 0 | 0 | 0 | 0 | 0 | 0 | 0 | 0 | 0 | 0 | 0 |
| 3825 to 3840 | 0 | 0 | 0 | 0 | 0 | 0 | 0 | 0 | 0 | 152 | 255 | 1 | 0 | 0 | 0 | 0 |
| 3841 to 3856 | 0 | 241 | 255 | 1 | 0 | 0 | 0 | 0 | 0 | 254 | 255 | 3 | 0 | 0 | 0 | 0 |
| 3857 to 3872 | 192 | 255 | 255 | 7 | 0 | 0 | 0 | 0 | 248 | 255 | 255 | 15 | 0 | 0 | 0 | 0 |
| 3873 to 3888 | 254 | 255 | 255 | 15 | 0 | 0 | 0 | 0 | 255 | 255 | 255 | 31 | 0 | 0 | 0 | 0 |
| 3889 to 3904 | 255 | 255 | 255 | 63 | 0 | 0 | 0 | 0 | 255 | 255 | 255 | 63 | 0 | 0 | 0 | 0 |
| 3905 to 3920 | 255 | 255 | 255 | 127 | 0 | 0 | 0 | 0 | 255 | 255 | 255 | 255 | 255 | 255 | 255 | 255 |
| 3921 to 3936 | 255 | 255 | 255 | 255 | 255 | 255 | 255 | 255 | 255 | 255 | 255 | 255 | 255 | 255 | 255 | 255 |
| 3937 to 3952 | 255 | 255 | 255 | 255 | 255 | 255 | 255 | 255 | 255 | 255 | 255 | 255 | 255 | 255 | 255 | 255 |
| 3953 to 3968 | 255 | 255 | 255 | 255 | 255 | 255 | 255 | 255 | 255 | 255 | 255 | 255 | 255 | 255 | 255 | 255 |
| 3969 to 3984 | 255 | 255 | 255 | 255 | 255 | 255 | 255 | 255 | 255 | 255 | 255 | 255 | 255 | 255 | 255 | 255 |
| 3985 to 4000 | 255 | 255 | 255 | 255 | 255 | 255 | 255 | 255 | 255 | 255 | 255 | 255 | 255 | 255 | 255 | 255 |
| 4001 to 4016 | 255 | 255 | 255 | 255 | 255 | 255 | 255 | 255 | 255 | 255 | 255 | 255 | 255 | 255 | 255 | 255 |
| 4017 to 4032 | 255 | 255 | 255 | 255 | 255 | 255 | 255 | 255 | 255 | 255 | 255 | 255 | 255 | 255 | 255 | 255 |
| 4033 to 4048 | 255 | 255 | 255 | 255 | 255 | 255 | 255 | 255 | 255 | 255 | 255 | 255 | 255 | 255 | 255 | 255 |
| 4049 to 4064 | 255 | 255 | 255 | 255 | 255 | 255 | 255 | 255 | 255 | 255 | 255 | 255 | 255 | 255 | 255 | 255 |
| 4065 to 4080 | 255 | 255 | 255 | 255 | 255 | 255 | 255 | 255 | 255 | 255 | 255 | 255 | 255 | 255 | 255 | 255 |
| 4081 to 4096 | 255 | 255 | 255 | 255 | 255 | 255 | 255 | 255 | 255 | 255 | 255 | 255 | 255 | 255 | 255 | 255 |
| 4097 to 4112 | 255 | 255 | 255 | 255 | 255 | 255 | 255 | 255 | 255 | 255 | 255 | 255 | 255 | 255 | 255 | 255 |
| 4113 to 4128 | 255 | 255 | 255 | 255 | 255 | 255 | 255 | 255 | 255 | 255 | 255 | 255 | 255 | 255 | 255 | 255 |
| 4129 to 4144 | 255 | 255 | 255 | 255 | 255 | 255 | 255 | 255 | 255 | 255 | 255 | 255 | 255 | 255 | 255 | 255 |
| 4145 to 4160 | 255 | 255 | 255 | 255 | 255 | 255 | 255 | 255 | 0 | 0 | 0 | 0 | 0 | 0 | 0 | 0 |
| 4161 to 4176 | 0 | 0 | 0 | 0 | 0 | 0 | 0 | 0 | 0 | 0 | 0 | 0 | 0 | 0 | 0 | 0 |
| 4177 to 4192 | 0 | 0 | 0 | 0 | 0 | 0 | 0 | 0 | 0 | 0 | 0 | 0 | 0 | 0 | 0 | 0 |
| 4193 to 4208 | 0 | 0 | 0 | 0 | 0 | 0 | 0 | 0 | 0 | 0 | 0 | 0 | 0 | 0 | 0 | 0 |
| 4209 to 4224 | 0 | 0 | 0 | 0 | 0 | 0 | 0 | 0 | 0 | 0 | 0 | 0 | 0 | 0 | 0 | 0 |
| 4225 to 4240 | 0 | 0 | 0 | 0 | 0 | 0 | 0 | 0 | 0 | 0 | 0 | 0 | 0 | 0 | 0 | 0 |
| 4241 to 4256 | 0 | 0 | 0 | 0 | 0 | 0 | 0 | 0 | 0 | 0 | 0 | 0 | 0 | 0 | 0 | 0 |
| 4257 to 4272 | 0 | 0 | 0 | 0 | 0 | 0 | 0 | 0 | 0 | 0 | 0 | 0 | 0 | 0 | 0 | 0 |
| 4273 to 4288 | 0 | 0 | 4 | 0 | 0 | 0 | 0 | 0 | 0 | 0 | 0 | 0 | 0 | 0 | 0 | 0 |
| 4289 to 4304 | 0 | 0 | 0 | 0 | 0 | 0 | 0 | 0 | 0 | 0 | 0 | 0 | 0 | 0 | 0 | 0 |
| 4305 to 4320 | 0 | 0 | 0 | 0 | 0 | 0 | 0 | 0 | 0 | 0 | 0 | 0 | 0 | 0 | 0 | 0 |
| 4321 to 4336 | 0 | 0 | 0 | 0 | 0 | 0 | 0 | 0 | 0 | 0 | 0 | 0 | 0 | 0 | 0 | 0 |
| 4337 to 4352 | 0 | 0 | 0 | 0 | 0 | 0 | 0 | 0 | 0 | 96 | 255 | 1 | 0 | 0 | 0 | 0 |
| 4353 to 4368 | 0 | 192 | 255 | 3 | 0 | 0 | 0 | 0 | 0 | 248 | 255 | 7 | 0 | 0 | 0 | 0 |
| 4369 to 4384 | 0 | 255 | 255 | 7 | 0 | 0 | 0 | 0 | 224 | 255 | 255 | 15 | 0 | 0 | 0 | 0 |
| 4385 to 4400 | 252 | 255 | 255 | 31 | 0 | 0 | 0 | 0 | 255 | 255 | 255 | 31 | 0 | 0 | 0 | 0 |
| 4401 to 4416 | 255 | 255 | 255 | 63 | 0 | 0 | 0 | 0 | 255 | 255 | 255 | 127 | 0 | 0 | 0 | 0 |
| 4417 to 4432 | 255 | 255 | 255 | 255 | 0 | 0 | 0 | 0 | 255 | 255 | 255 | 255 | 0 | 0 | 0 | 0 |
| 4433 to 4448 | 255 | 255 | 255 | 255 | 1 | 0 | 0 | 0 | 255 | 255 | 255 | 255 | 255 | 255 | 255 | 255 |
| 4449 to 4464 | 255 | 255 | 255 | 255 | 255 | 255 | 255 | 255 | 255 | 255 | 255 | 255 | 255 | 255 | 255 | 255 |
| 4465 to 4480 | 255 | 255 | 255 | 255 | 255 | 255 | 255 | 255 | 255 | 255 | 255 | 255 | 255 | 255 | 255 | 255 |
| 4481 to 4496 | 255 | 255 | 255 | 255 | 255 | 255 | 255 | 255 | 255 | 255 | 255 | 255 | 255 | 255 | 255 | 255 |
| 4497 to 4512 | 255 | 255 | 255 | 255 | 255 | 255 | 255 | 255 | 255 | 255 | 255 | 255 | 255 | 255 | 255 | 255 |
| 4513 to 4528 | 255 | 255 | 255 | 255 | 255 | 255 | 255 | 255 | 255 | 255 | 255 | 255 | 255 | 255 | 255 | 255 |
| 4529 to 4544 | 255 | 255 | 255 | 255 | 255 | 255 | 255 | 255 | 255 | 255 | 255 | 255 | 255 | 255 | 255 | 255 |
| 4545 to 4560 | 255 | 255 | 255 | 255 | 255 | 255 | 255 | 255 | 255 | 255 | 255 | 255 | 255 | 255 | 255 | 255 |
| 4561 to 4576 | 255 | 255 | 255 | 255 | 255 | 255 | 255 | 255 | 255 | 255 | 255 | 255 | 255 | 255 | 255 | 255 |
| 4577 to 4592 | 255 | 255 | 255 | 255 | 255 | 255 | 255 | 255 | 255 | 255 | 255 | 255 | 255 | 255 | 255 | 255 |
| 4593 to 4608 | 255 | 255 | 255 | 255 | 255 | 255 | 255 | 255 | 255 | 255 | 255 | 255 | 255 | 255 | 255 | 255 |
| 4609 to 4624 | 255 | 255 | 255 | 255 | 255 | 255 | 255 | 255 | 255 | 255 | 255 | 255 | 255 | 255 | 255 | 255 |
| 4625 to 4640 | 255 | 255 | 255 | 255 | 255 | 255 | 255 | 255 | 255 | 255 | 255 | 255 | 255 | 255 | 255 | 255 |
| 4641 to 4656 | 0 | 0 | 0 | 0 | 0 | 0 | 0 | 0 | 0 | 0 | 0 | 0 | 0 | 0 | 0 | 0 |
| 4657 to 4672 | 0 | 0 | 0 | 0 | 0 | 0 | 0 | 0 | 0 | 0 | 0 | 0 | 0 | 0 | 0 | 0 |
| 4673 to 4688 | 0 | 0 | 0 | 0 | 0 | 0 | 0 | 0 | 0 | 0 | 0 | 0 | 0 | 0 | 0 | 0 |
| 4689 to 4704 | 0 | 0 | 0 | 0 | 0 | 0 | 0 | 0 | 0 | 0 | 0 | 0 | 0 | 0 | 0 | 0 |
| 4705 to 4720 | 0 | 0 | 0 | 0 | 0 | 0 | 0 | 0 | 0 | 0 | 0 | 0 | 0 | 0 | 0 | 0 |
| 4721 to 4736 | 0 | 0 | 0 | 0 | 0 | 0 | 0 | 0 | 0 | 0 | 0 | 0 | 0 | 0 | 0 | 0 |
| 4737 to 4752 | 0 | 0 | 0 | 0 | 0 | 0 | 0 | 0 | 0 | 0 | 0 | 0 | 0 | 0 | 0 | 0 |
| 4753 to 4768 | 0 | 0 | 0 | 0 | 0 | 0 | 0 | 0 | 0 | 0 | 0 | 12 | 0 | 0 | 0 | 0 |
| 4769 to 4784 | 0 | 0 | 0 | 0 | 0 | 0 | 0 | 0 | 0 | 0 | 0 | 0 | 0 | 0 | 0 | 0 |
| 4785 to 4800 | 0 | 0 | 0 | 0 | 0 | 0 | 0 | 0 | 0 | 0 | 0 | 0 | 0 | 0 | 0 | 0 |
| 4801 to 4816 | 0 | 0 | 0 | 0 | 0 | 0 | 0 | 0 | 0 | 0 | 0 | 0 | 0 | 0 | 0 | 0 |
| 4817 to 4832 | 0 | 0 | 0 | 0 | 0 | 0 | 0 | 0 | 0 | 0 | 0 | 0 | 0 | 0 | 0 | 0 |
| 4833 to 4848 | 0 | 0 | 0 | 0 | 0 | 0 | 0 | 0 | 0 | 0 | 0 | 0 | 0 | 0 | 0 | 0 |
| 4849 to 4864 | 0 | 0 | 224 | 1 | 0 | 0 | 0 | 0 | 0 | 194 | 253 | 1 | 0 | 0 | 0 | 0 |
| 4865 to 4880 | 0 | 130 | 255 | 3 | 0 | 0 | 0 | 0 | 0 | 224 | 255 | 7 | 0 | 0 | 0 | 0 |
| 4881 to 4896 | 0 | 252 | 255 | 15 | 0 | 0 | 0 | 0 | 128 | 255 | 255 | 15 | 0 | 0 | 0 | 0 |
| 4897 to 4912 | 240 | 255 | 255 | 31 | 0 | 0 | 0 | 0 | 254 | 255 | 255 | 63 | 0 | 0 | 0 | 0 |
| 4913 to 4928 | 255 | 255 | 255 | 63 | 0 | 0 | 0 | 0 | 255 | 255 | 255 | 127 | 0 | 0 | 0 | 0 |

TABLE 1-continued

| Address | Content | | | | | | | | | | | | | | | |
|---|---|---|---|---|---|---|---|---|---|---|---|---|---|---|---|---|
| 4929 to 4944 | 255 | 255 | 255 | 255 | 0 | 0 | 0 | 0 | 255 | 255 | 255 | 255 | 1 | 0 | 0 | 0 |
| 4945 to 4960 | 255 | 255 | 255 | 255 | 1 | 0 | 0 | 0 | 255 | 255 | 255 | 255 | 3 | 0 | 0 | 0 |
| 4961 to 4976 | 255 | 255 | 255 | 255 | 255 | 255 | 255 | 255 | 255 | 255 | 255 | 255 | 255 | 255 | 255 | 255 |
| 4977 to 4992 | 255 | 255 | 255 | 255 | 255 | 255 | 255 | 255 | 255 | 255 | 255 | 255 | 255 | 255 | 255 | 255 |
| 4993 to 5008 | 255 | 255 | 255 | 255 | 255 | 255 | 255 | 255 | 255 | 255 | 255 | 255 | 255 | 255 | 255 | 255 |
| 5009 to 5024 | 255 | 255 | 255 | 255 | 255 | 255 | 255 | 255 | 255 | 255 | 255 | 255 | 255 | 255 | 255 | 255 |
| 5025 to 5040 | 255 | 255 | 255 | 255 | 255 | 255 | 255 | 255 | 255 | 255 | 255 | 255 | 255 | 255 | 255 | 255 |
| 5041 to 5056 | 255 | 255 | 255 | 255 | 255 | 255 | 255 | 255 | 255 | 255 | 255 | 255 | 255 | 255 | 255 | 255 |
| 5057 to 5072 | 255 | 255 | 255 | 255 | 255 | 255 | 255 | 255 | 255 | 255 | 255 | 255 | 255 | 255 | 255 | 255 |
| 5073 to 5088 | 255 | 255 | 255 | 255 | 255 | 255 | 255 | 255 | 255 | 255 | 255 | 255 | 255 | 255 | 255 | 255 |
| 5089 to 5104 | 255 | 255 | 255 | 255 | 255 | 255 | 255 | 255 | 255 | 255 | 255 | 255 | 255 | 255 | 255 | 255 |
| 5105 to 5120 | 255 | 255 | 255 | 255 | 255 | 255 | 255 | 255 | 255 | 255 | 255 | 255 | 255 | 255 | 255 | 255 |
| 5121 to 5136 | 255 | 255 | 255 | 255 | 255 | 255 | 255 | 255 | 0 | 0 | 0 | 0 | 0 | 0 | 0 | 0 |
| 5137 to 5152 | 0 | 0 | 0 | 0 | 0 | 0 | 0 | 0 | 0 | 0 | 0 | 0 | 0 | 0 | 0 | 0 |
| 5153 to 5168 | 0 | 0 | 0 | 0 | 0 | 0 | 0 | 0 | 0 | 0 | 0 | 0 | 0 | 0 | 0 | 0 |
| 5169 to 5184 | 0 | 0 | 0 | 0 | 0 | 0 | 0 | 0 | 0 | 0 | 0 | 0 | 0 | 0 | 0 | 0 |
| 5185 to 5200 | 0 | 0 | 0 | 0 | 0 | 0 | 0 | 0 | 0 | 0 | 0 | 0 | 0 | 0 | 0 | 0 |
| 5201 to 5216 | 0 | 0 | 0 | 0 | 0 | 0 | 0 | 0 | 0 | 0 | 0 | 0 | 0 | 0 | 0 | 0 |
| 5217 to 5232 | 0 | 0 | 0 | 0 | 0 | 0 | 0 | 0 | 0 | 0 | 0 | 0 | 0 | 0 | 0 | 0 |
| 5233 to 5248 | 0 | 0 | 0 | 0 | 0 | 0 | 0 | 0 | 0 | 0 | 0 | 0 | 0 | 0 | 0 | 0 |
| 5249 to 5264 | 0 | 0 | 0 | 0 | 0 | 0 | 0 | 0 | 0 | 0 | 0 | 0 | 0 | 0 | 0 | 0 |
| 5265 to 5280 | 0 | 0 | 0 | 0 | 0 | 0 | 0 | 0 | 0 | 0 | 0 | 0 | 0 | 0 | 0 | 0 |
| 5281 to 5296 | 0 | 0 | 0 | 0 | 0 | 0 | 0 | 0 | 0 | 0 | 0 | 0 | 0 | 0 | 0 | 0 |
| 5297 to 5312 | 0 | 0 | 0 | 0 | 0 | 0 | 0 | 0 | 0 | 0 | 0 | 0 | 0 | 0 | 0 | 0 |
| 5313 to 5328 | 0 | 0 | 0 | 0 | 0 | 0 | 0 | 0 | 0 | 0 | 0 | 0 | 0 | 0 | 0 | 0 |
| 5329 to 5344 | 0 | 0 | 0 | 0 | 0 | 0 | 0 | 0 | 0 | 0 | 0 | 0 | 0 | 0 | 0 | 0 |
| 5345 to 5360 | 0 | 0 | 0 | 0 | 0 | 0 | 0 | 0 | 0 | 0 | 0 | 0 | 0 | 0 | 0 | 0 |
| 5361 to 5376 | 0 | 0 | 128 | 1 | 0 | 0 | 0 | 0 | 0 | 0 | 227 | 3 | 0 | 0 | 0 | 0 |
| 5377 to 5392 | 0 | 0 | 254 | 3 | 0 | 0 | 0 | 0 | 0 | 192 | 255 | 7 | 0 | 0 | 0 | 0 |
| 5393 to 5408 | 0 | 240 | 255 | 15 | 0 | 0 | 0 | 0 | 0 | 254 | 255 | 31 | 0 | 0 | 0 | 0 |
| 5409 to 5424 | 192 | 255 | 255 | 31 | 0 | 0 | 0 | 0 | 248 | 255 | 255 | 63 | 0 | 0 | 0 | 0 |
| 5425 to 5440 | 255 | 255 | 255 | 127 | 0 | 0 | 0 | 0 | 255 | 255 | 255 | 255 | 0 | 0 | 0 | 0 |
| 5441 to 5456 | 255 | 255 | 255 | 255 | 0 | 0 | 0 | 0 | 255 | 255 | 255 | 255 | 1 | 0 | 0 | 0 |
| 5457 to 5472 | 255 | 255 | 255 | 255 | 3 | 0 | 0 | 0 | 255 | 255 | 255 | 255 | 3 | 0 | 0 | 0 |
| 5473 to 5488 | 255 | 255 | 255 | 255 | 7 | 0 | 0 | 0 | 255 | 255 | 255 | 255 | 255 | 255 | 255 | 255 |
| 5489 to 5504 | 255 | 255 | 255 | 255 | 255 | 255 | 255 | 255 | 255 | 255 | 255 | 255 | 255 | 255 | 255 | 255 |
| 5505 to 5520 | 255 | 255 | 255 | 255 | 255 | 255 | 255 | 255 | 255 | 255 | 255 | 255 | 255 | 255 | 255 | 255 |
| 5521 to 5536 | 255 | 255 | 255 | 255 | 255 | 255 | 255 | 255 | 255 | 255 | 255 | 255 | 255 | 255 | 255 | 255 |
| 5537 to 5552 | 255 | 255 | 255 | 255 | 255 | 255 | 255 | 255 | 255 | 255 | 255 | 255 | 255 | 255 | 255 | 255 |
| 5553 to 5568 | 255 | 255 | 255 | 255 | 255 | 255 | 255 | 255 | 255 | 255 | 255 | 255 | 255 | 255 | 255 | 255 |
| 5569 to 5584 | 255 | 255 | 255 | 255 | 255 | 255 | 255 | 255 | 255 | 255 | 255 | 255 | 255 | 255 | 255 | 255 |
| 5585 to 5600 | 255 | 255 | 255 | 255 | 255 | 255 | 255 | 255 | 255 | 255 | 255 | 255 | 255 | 255 | 255 | 255 |
| 5601 to 5616 | 255 | 255 | 255 | 255 | 255 | 255 | 255 | 255 | 255 | 255 | 255 | 255 | 255 | 255 | 255 | 255 |
| 5617 to 5632 | 255 | 255 | 255 | 255 | 255 | 255 | 255 | 255 | 255 | 255 | 255 | 255 | 255 | 255 | 255 | 255 |
| 5633 to 5648 | 0 | 0 | 0 | 0 | 0 | 0 | 0 | 0 | 0 | 0 | 0 | 0 | 0 | 0 | 0 | 0 |
| 5649 to 5664 | 0 | 0 | 0 | 0 | 0 | 0 | 0 | 0 | 0 | 0 | 0 | 0 | 0 | 0 | 0 | 0 |
| 5665 to 5680 | 0 | 0 | 0 | 0 | 0 | 0 | 0 | 0 | 0 | 0 | 0 | 0 | 0 | 0 | 0 | 0 |
| 5681 to 5696 | 0 | 0 | 0 | 0 | 0 | 0 | 0 | 0 | 0 | 0 | 0 | 0 | 0 | 0 | 0 | 0 |
| 5697 to 5712 | 0 | 0 | 0 | 0 | 0 | 0 | 0 | 0 | 0 | 0 | 0 | 0 | 0 | 0 | 0 | 0 |
| 5713 to 5728 | 0 | 0 | 0 | 0 | 0 | 0 | 0 | 0 | 0 | 0 | 0 | 0 | 0 | 0 | 0 | 0 |
| 5729 to 5744 | 0 | 0 | 0 | 0 | 0 | 0 | 0 | 0 | 0 | 0 | 0 | 0 | 0 | 0 | 0 | 0 |
| 5745 to 5760 | 0 | 0 | 0 | 0 | 0 | 0 | 0 | 0 | 0 | 0 | 0 | 0 | 0 | 0 | 0 | 0 |
| 5761 to 5776 | 0 | 0 | 0 | 0 | 0 | 0 | 0 | 0 | 0 | 0 | 0 | 0 | 0 | 0 | 0 | 0 |
| 5777 to 5792 | 0 | 0 | 0 | 0 | 0 | 0 | 0 | 0 | 0 | 0 | 0 | 0 | 0 | 0 | 0 | 0 |
| 5793 to 5808 | 0 | 0 | 0 | 0 | 0 | 0 | 0 | 0 | 0 | 0 | 0 | 0 | 0 | 0 | 0 | 0 |
| 5809 to 5824 | 0 | 0 | 0 | 0 | 0 | 0 | 0 | 0 | 0 | 0 | 0 | 0 | 0 | 0 | 0 | 0 |
| 5825 to 5840 | 0 | 0 | 0 | 0 | 0 | 0 | 0 | 0 | 0 | 0 | 0 | 0 | 0 | 0 | 0 | 0 |
| 5841 to 5856 | 0 | 0 | 0 | 0 | 0 | 0 | 0 | 0 | 0 | 0 | 0 | 0 | 0 | 0 | 0 | 0 |
| 5857 to 5872 | 0 | 0 | 0 | 0 | 0 | 0 | 0 | 0 | 0 | 0 | 0 | 0 | 0 | 0 | 0 | 0 |
| 5873 to 5888 | 0 | 0 | 0 | 0 | 0 | 0 | 0 | 0 | 0 | 0 | 16 | 196 | 3 | 0 | 0 | 0 |
| 5889 to 5904 | 0 | 56 | 248 | 7 | 0 | 0 | 0 | 0 | 0 | 0 | 255 | 15 | 0 | 0 | 0 | 0 |
| 5905 to 5920 | 0 | 224 | 255 | 15 | 0 | 0 | 0 | 0 | 0 | 248 | 255 | 31 | 0 | 0 | 0 | 0 |
| 5921 to 5936 | 0 | 255 | 255 | 63 | 0 | 0 | 0 | 0 | 224 | 255 | 255 | 63 | 0 | 0 | 0 | 0 |
| 5937 to 5952 | 252 | 255 | 255 | 127 | 0 | 0 | 0 | 0 | 255 | 255 | 255 | 255 | 0 | 0 | 0 | 0 |
| 5953 to 5968 | 255 | 255 | 255 | 255 | 1 | 0 | 0 | 0 | 255 | 255 | 255 | 255 | 1 | 0 | 0 | 0 |
| 5969 to 5984 | 255 | 255 | 255 | 255 | 3 | 0 | 0 | 0 | 255 | 255 | 255 | 255 | 7 | 0 | 0 | 0 |
| 5985 to 6000 | 255 | 255 | 255 | 255 | 7 | 0 | 0 | 0 | 255 | 255 | 255 | 255 | 15 | 0 | 0 | 0 |
| 6001 to 6016 | 255 | 255 | 255 | 255 | 31 | 0 | 0 | 0 | 255 | 255 | 255 | 255 | 255 | 255 | 255 | 255 |
| 6017 to 6032 | 255 | 255 | 255 | 255 | 255 | 255 | 255 | 255 | 255 | 255 | 255 | 255 | 255 | 255 | 255 | 255 |
| 6033 to 6048 | 255 | 255 | 255 | 255 | 255 | 255 | 255 | 255 | 255 | 255 | 255 | 255 | 255 | 255 | 255 | 255 |
| 6049 to 6064 | 255 | 255 | 255 | 255 | 255 | 255 | 255 | 255 | 255 | 255 | 255 | 255 | 255 | 255 | 255 | 255 |
| 6065 to 6080 | 255 | 255 | 255 | 255 | 255 | 255 | 255 | 255 | 255 | 255 | 255 | 255 | 255 | 255 | 255 | 255 |
| 6081 to 6096 | 255 | 255 | 255 | 255 | 255 | 255 | 255 | 255 | 255 | 255 | 255 | 255 | 255 | 255 | 255 | 255 |
| 6097 to 6112 | 255 | 255 | 255 | 255 | 255 | 255 | 255 | 255 | 255 | 255 | 255 | 255 | 255 | 255 | 255 | 255 |
| 6113 to 6128 | 255 | 255 | 255 | 255 | 255 | 255 | 255 | 255 | 255 | 255 | 255 | 255 | 255 | 255 | 255 | 255 |
| 6129 to 6144 | 255 | 255 | 255 | 255 | 255 | 255 | 255 | 255 | 255 | 255 | 255 | 255 | 255 | 255 | 255 | 255 |
| 6145 to 6160 | 0 | 0 | 0 | 0 | 0 | 0 | 0 | 0 | 0 | 0 | 0 | 0 | 0 | 0 | 0 | 0 |

TABLE 1-continued

| Address | Content | | | | | | | | | | | | | | | |
|---|---|---|---|---|---|---|---|---|---|---|---|---|---|---|---|---|
| 6161 to 6176 | 0 | 0 | 0 | 0 | 0 | 0 | 0 | 0 | 0 | 0 | 0 | 0 | 0 | 0 | 0 | 0 |
| 6177 to 6192 | 0 | 0 | 0 | 0 | 0 | 0 | 0 | 0 | 0 | 0 | 0 | 0 | 0 | 0 | 0 | 0 |
| 6193 to 6208 | 0 | 0 | 0 | 0 | 0 | 0 | 0 | 0 | 0 | 0 | 0 | 0 | 0 | 0 | 0 | 0 |
| 6209 to 6224 | 0 | 0 | 0 | 0 | 0 | 0 | 0 | 0 | 0 | 0 | 0 | 0 | 0 | 0 | 0 | 0 |
| 6225 to 6240 | 0 | 0 | 0 | 0 | 0 | 0 | 0 | 0 | 0 | 0 | 0 | 0 | 0 | 0 | 0 | 0 |
| 6241 to 6256 | 0 | 0 | 0 | 0 | 0 | 0 | 0 | 0 | 0 | 0 | 0 | 0 | 0 | 0 | 0 | 0 |
| 6257 to 6272 | 0 | 0 | 0 | 0 | 0 | 0 | 0 | 0 | 0 | 0 | 0 | 0 | 0 | 0 | 0 | 0 |
| 6273 to 6288 | 0 | 0 | 0 | 0 | 0 | 0 | 0 | 0 | 0 | 0 | 0 | 0 | 0 | 0 | 0 | 0 |
| 6289 to 6304 | 0 | 0 | 0 | 0 | 0 | 0 | 0 | 0 | 0 | 0 | 0 | 0 | 0 | 0 | 0 | 0 |
| 6305 to 6320 | 0 | 0 | 0 | 0 | 0 | 0 | 0 | 0 | 0 | 0 | 0 | 0 | 0 | 0 | 0 | 0 |
| 6321 to 6336 | 0 | 0 | 0 | 0 | 0 | 0 | 0 | 0 | 0 | 0 | 0 | 0 | 0 | 0 | 0 | 0 |
| 6337 to 6352 | 0 | 0 | 0 | 0 | 0 | 0 | 0 | 0 | 0 | 0 | 0 | 0 | 0 | 0 | 0 | 0 |
| 6353 to 6368 | 0 | 0 | 0 | 0 | 0 | 0 | 0 | 0 | 0 | 0 | 0 | 0 | 0 | 0 | 0 | 0 |
| 6369 to 6384 | 0 | 0 | 0 | 0 | 0 | 0 | 0 | 0 | 0 | 0 | 0 | 0 | 0 | 0 | 0 | 0 |
| 6385 to 6400 | 0 | 0 | 0 | 0 | 0 | 0 | 0 | 0 | 0 | 0 | 8 | 3 | 0 | 0 | 0 | 0 |
| 6401 to 6416 | 0 | 48 | 224 | 7 | 0 | 0 | 0 | 0 | 0 | 0 | 252 | 15 | 0 | 0 | 0 | 0 |
| 6417 to 6432 | 0 | 128 | 255 | 31 | 0 | 0 | 0 | 0 | 0 | 240 | 255 | 31 | 0 | 0 | 0 | 0 |
| 6433 to 6448 | 0 | 252 | 255 | 63 | 0 | 0 | 0 | 0 | 128 | 255 | 255 | 127 | 0 | 0 | 0 | 0 |
| 6449 to 6464 | 240 | 255 | 255 | 127 | 0 | 0 | 0 | 0 | 254 | 255 | 255 | 255 | 0 | 0 | 0 | 0 |
| 6465 to 6480 | 255 | 255 | 255 | 255 | 1 | 0 | 0 | 0 | 255 | 255 | 255 | 255 | 3 | 0 | 0 | 0 |
| 6481 to 6496 | 255 | 255 | 255 | 255 | 3 | 0 | 0 | 0 | 255 | 255 | 255 | 255 | 7 | 0 | 0 | 0 |
| 6497 to 6512 | 255 | 255 | 255 | 255 | 15 | 0 | 0 | 0 | 255 | 255 | 255 | 255 | 15 | 0 | 0 | 0 |
| 6513 to 6528 | 255 | 255 | 255 | 255 | 31 | 0 | 0 | 0 | 255 | 255 | 255 | 255 | 63 | 0 | 0 | 0 |
| 6529 to 6544 | 255 | 255 | 255 | 255 | 255 | 255 | 255 | 255 | 255 | 255 | 255 | 255 | 255 | 255 | 255 | 255 |
| 6545 to 6560 | 255 | 255 | 255 | 255 | 255 | 255 | 255 | 255 | 255 | 255 | 255 | 255 | 255 | 255 | 255 | 255 |
| 6561 to 6576 | 255 | 255 | 255 | 255 | 255 | 255 | 255 | 255 | 255 | 255 | 255 | 255 | 255 | 255 | 255 | 255 |
| 6577 to 6592 | 255 | 255 | 255 | 255 | 255 | 255 | 255 | 255 | 255 | 255 | 255 | 255 | 255 | 255 | 255 | 255 |
| 6593 to 6608 | 255 | 255 | 255 | 255 | 255 | 255 | 255 | 255 | 255 | 255 | 255 | 255 | 255 | 255 | 255 | 255 |
| 6609 to 6624 | 255 | 255 | 255 | 255 | 255 | 255 | 255 | 255 | 255 | 255 | 255 | 255 | 255 | 255 | 255 | 255 |
| 6625 to 6640 | 255 | 255 | 255 | 255 | 255 | 255 | 255 | 255 | 255 | 255 | 255 | 255 | 255 | 255 | 255 | 255 |
| 6641 to 6656 | 255 | 255 | 255 | 255 | 255 | 255 | 255 | 255 | 255 | 255 | 255 | 255 | 255 | 255 | 255 | 255 |
| 6657 to 6672 | 0 | 0 | 0 | 0 | 0 | 0 | 0 | 0 | 0 | 0 | 0 | 0 | 0 | 0 | 0 | 0 |
| 6673 to 6688 | 0 | 0 | 0 | 0 | 0 | 0 | 0 | 0 | 0 | 0 | 0 | 0 | 0 | 0 | 0 | 0 |
| 6689 to 6704 | 0 | 0 | 0 | 0 | 0 | 0 | 0 | 0 | 0 | 0 | 0 | 0 | 0 | 0 | 0 | 0 |
| 6705 to 6720 | 0 | 0 | 0 | 0 | 0 | 0 | 0 | 0 | 0 | 0 | 0 | 0 | 0 | 0 | 0 | 0 |
| 6721 to 6736 | 0 | 0 | 0 | 0 | 0 | 0 | 0 | 0 | 0 | 0 | 0 | 0 | 0 | 0 | 0 | 0 |
| 6737 to 6752 | 0 | 0 | 0 | 0 | 0 | 0 | 0 | 0 | 0 | 0 | 0 | 0 | 0 | 0 | 0 | 0 |
| 6753 to 6768 | 0 | 0 | 0 | 0 | 0 | 0 | 0 | 0 | 0 | 0 | 0 | 0 | 0 | 0 | 0 | 0 |
| 6769 to 6784 | 0 | 0 | 0 | 0 | 0 | 0 | 0 | 0 | 0 | 0 | 0 | 0 | 0 | 0 | 0 | 0 |
| 6785 to 6800 | 0 | 0 | 0 | 0 | 0 | 0 | 0 | 0 | 0 | 0 | 0 | 0 | 0 | 0 | 0 | 0 |
| 6801 to 6816 | 0 | 0 | 0 | 0 | 0 | 0 | 0 | 0 | 0 | 0 | 0 | 0 | 0 | 0 | 0 | 0 |
| 6817 to 6832 | 0 | 0 | 0 | 0 | 0 | 0 | 0 | 0 | 0 | 128 | 0 | 0 | 0 | 0 | 0 | 0 |
| 6833 to 6848 | 0 | 0 | 0 | 0 | 0 | 0 | 0 | 0 | 0 | 0 | 0 | 0 | 0 | 0 | 0 | 0 |
| 6849 to 6864 | 0 | 0 | 0 | 0 | 0 | 0 | 0 | 0 | 0 | 0 | 0 | 0 | 0 | 0 | 0 | 0 |
| 6865 to 6880 | 0 | 0 | 0 | 0 | 0 | 0 | 0 | 0 | 0 | 0 | 0 | 0 | 0 | 0 | 0 | 0 |
| 6881 to 6896 | 0 | 0 | 0 | 0 | 0 | 0 | 0 | 0 | 0 | 0 | 0 | 0 | 0 | 0 | 0 | 0 |
| 6897 to 6912 | 0 | 0 | 0 | 0 | 0 | 0 | 0 | 0 | 0 | 8 | 0 | 6 | 0 | 0 | 0 | 0 |
| 6913 to 6928 | 0 | 96 | 128 | 15 | 0 | 0 | 0 | 0 | 0 | 0 | 240 | 15 | 0 | 0 | 0 | 0 |
| 6929 to 6944 | 0 | 0 | 254 | 31 | 0 | 0 | 0 | 0 | 128 | 192 | 255 | 63 | 0 | 0 | 0 | 0 |
| 6945 to 6960 | 0 | 248 | 255 | 63 | 0 | 0 | 0 | 0 | 0 | 254 | 255 | 127 | 0 | 0 | 0 | 0 |
| 6961 to 6976 | 192 | 255 | 255 | 255 | 0 | 0 | 0 | 0 | 248 | 255 | 255 | 255 | 1 | 0 | 0 | 0 |
| 6977 to 6992 | 255 | 255 | 255 | 255 | 1 | 0 | 0 | 0 | 255 | 255 | 255 | 255 | 3 | 0 | 0 | 0 |
| 6993 to 7008 | 255 | 255 | 255 | 255 | 7 | 0 | 0 | 0 | 255 | 255 | 255 | 255 | 7 | 0 | 0 | 0 |
| 7009 to 7024 | 255 | 255 | 255 | 255 | 15 | 0 | 0 | 0 | 255 | 255 | 255 | 255 | 31 | 0 | 0 | 0 |
| 7025 to 7040 | 255 | 255 | 255 | 255 | 63 | 0 | 0 | 0 | 255 | 255 | 255 | 255 | 63 | 0 | 0 | 0 |
| 7041 to 7056 | 255 | 255 | 255 | 255 | 127 | 0 | 0 | 0 | 255 | 255 | 255 | 255 | 255 | 255 | 255 | 255 |
| 7057 to 7072 | 255 | 255 | 255 | 255 | 255 | 255 | 255 | 255 | 255 | 255 | 255 | 255 | 255 | 255 | 255 | 255 |
| 7073 to 7088 | 255 | 255 | 255 | 255 | 255 | 255 | 255 | 255 | 255 | 255 | 255 | 255 | 255 | 255 | 255 | 255 |
| 7089 to 7104 | 255 | 255 | 255 | 255 | 255 | 255 | 255 | 255 | 255 | 255 | 255 | 255 | 255 | 255 | 255 | 255 |
| 7105 to 7120 | 255 | 255 | 255 | 255 | 255 | 255 | 255 | 255 | 255 | 255 | 255 | 255 | 255 | 255 | 255 | 255 |
| 7121 to 7136 | 255 | 255 | 255 | 255 | 255 | 255 | 255 | 255 | 255 | 255 | 255 | 255 | 255 | 255 | 255 | 255 |
| 7137 to 7152 | 255 | 255 | 255 | 255 | 255 | 255 | 255 | 255 | 255 | 255 | 255 | 255 | 255 | 255 | 255 | 255 |
| 7153 to 7168 | 255 | 255 | 255 | 255 | 255 | 255 | 255 | 255 | 255 | 255 | 255 | 255 | 255 | 255 | 255 | 255 |
| 7169 to 7184 | 0 | 0 | 0 | 0 | 0 | 0 | 0 | 0 | 0 | 0 | 0 | 0 | 0 | 0 | 0 | 0 |
| 7185 to 7200 | 0 | 0 | 0 | 0 | 0 | 0 | 0 | 0 | 0 | 0 | 0 | 0 | 0 | 0 | 0 | 0 |
| 7201 to 7216 | 0 | 0 | 0 | 0 | 0 | 0 | 0 | 0 | 0 | 0 | 0 | 0 | 0 | 0 | 0 | 0 |
| 7217 to 7232 | 0 | 0 | 0 | 0 | 0 | 0 | 0 | 0 | 0 | 0 | 0 | 0 | 0 | 0 | 0 | 0 |
| 7233 to 7248 | 0 | 0 | 0 | 0 | 0 | 0 | 0 | 0 | 0 | 0 | 0 | 0 | 0 | 0 | 0 | 0 |
| 7249 to 7264 | 0 | 0 | 0 | 0 | 0 | 0 | 0 | 0 | 0 | 0 | 0 | 0 | 0 | 0 | 0 | 0 |
| 7265 to 7280 | 0 | 0 | 0 | 0 | 0 | 0 | 0 | 0 | 0 | 0 | 0 | 0 | 0 | 0 | 0 | 0 |
| 7281 to 7296 | 0 | 0 | 0 | 0 | 0 | 0 | 0 | 0 | 0 | 0 | 0 | 0 | 0 | 0 | 0 | 0 |
| 7297 to 7312 | 0 | 0 | 0 | 0 | 0 | 0 | 0 | 0 | 0 | 0 | 0 | 0 | 0 | 0 | 0 | 0 |
| 7313 to 7328 | 0 | 0 | 0 | 0 | 0 | 0 | 0 | 0 | 0 | 0 | 0 | 0 | 0 | 0 | 0 | 0 |
| 7329 to 7344 | 0 | 0 | 0 | 0 | 0 | 0 | 0 | 0 | 0 | 0 | 0 | 0 | 0 | 0 | 0 | 0 |
| 7345 to 7360 | 0 | 0 | 0 | 0 | 0 | 0 | 0 | 0 | 0 | 0 | 0 | 0 | 0 | 0 | 0 | 0 |
| 7361 to 7376 | 0 | 0 | 0 | 0 | 0 | 0 | 0 | 0 | 0 | 0 | 0 | 0 | 0 | 0 | 0 | 0 |
| 7377 to 7392 | 0 | 0 | 0 | 0 | 0 | 0 | 0 | 0 | 0 | 0 | 0 | 0 | 0 | 0 | 0 | 0 |

TABLE 1-continued

| Address | | | | | | | | | Content | | | | | | | | |
|---|---|---|---|---|---|---|---|---|---|---|---|---|---|---|---|---|---|
| 7393 to 7408 | | 0 | 0 | 0 | 0 | 0 | 0 | 0 | 0 | 0 | 0 | 0 | 0 | 0 | 0 | 0 | 0 |
| 7409 to 7424 | | 0 | 0 | 0 | 0 | 0 | 0 | 0 | 0 | 0 | 0 | 0 | 0 | 0 | 0 | 0 | 0 |
| 7425 to 7440 | | 0 | 192 | 0 | 15 | 0 | 0 | 0 | 0 | 64 | 0 | 192 | 31 | 0 | 0 | 0 | 0 |
| 7441 to 7456 | | 0 | 0 | 248 | 31 | 0 | 0 | 0 | 0 | 0 | 0 | 255 | 63 | 0 | 0 | 0 | 0 |
| 7457 to 7472 | | 0 | 224 | 255 | 127 | 0 | 0 | 0 | 0 | 0 | 252 | 255 | 127 | 0 | 0 | 0 | 0 |
| 7473 to 7488 | | 128 | 255 | 255 | 255 | 0 | 0 | 0 | 0 | 224 | 255 | 255 | 255 | 1 | 0 | 0 | 0 |
| 7489 to 7504 | | 252 | 255 | 255 | 255 | 3 | 0 | 0 | 0 | 255 | 255 | 255 | 255 | 3 | 0 | 0 | 0 |
| 7505 to 7520 | | 255 | 255 | 255 | 255 | 7 | 0 | 0 | 0 | 255 | 255 | 255 | 255 | 15 | 0 | 0 | 0 |
| 7521 to 7536 | | 255 | 255 | 255 | 255 | 15 | 0 | 0 | 0 | 255 | 255 | 255 | 255 | 31 | 0 | 0 | 0 |
| 7537 to 7552 | | 255 | 255 | 255 | 255 | 63 | 0 | 0 | 0 | 255 | 255 | 255 | 255 | 127 | 0 | 0 | 0 |
| 7553 to 7568 | | 255 | 255 | 255 | 255 | 127 | 0 | 0 | 0 | 255 | 255 | 255 | 255 | 255 | 0 | 0 | 0 |
| 7569 to 7584 | | 255 | 255 | 255 | 255 | 255 | 255 | 255 | 255 | 255 | 255 | 255 | 255 | 255 | 255 | 255 | 255 |
| 7585 to 7600 | | 255 | 255 | 255 | 255 | 255 | 255 | 255 | 255 | 255 | 255 | 255 | 255 | 255 | 255 | 255 | 255 |
| 7601 to 7616 | | 255 | 255 | 255 | 255 | 255 | 255 | 255 | 255 | 255 | 255 | 255 | 255 | 255 | 255 | 255 | 255 |
| 7617 to 7632 | | 255 | 255 | 255 | 255 | 255 | 255 | 255 | 255 | 255 | 255 | 255 | 255 | 255 | 255 | 255 | 255 |
| 7633 to 7648 | | 255 | 255 | 255 | 255 | 255 | 255 | 255 | 255 | 255 | 255 | 255 | 255 | 255 | 255 | 255 | 255 |
| 7649 to 7664 | | 255 | 255 | 255 | 255 | 255 | 255 | 255 | 255 | 255 | 255 | 255 | 255 | 255 | 255 | 255 | 255 |
| 7665 to 7680 | | 255 | 255 | 255 | 255 | 255 | 255 | 255 | 255 | 255 | 255 | 255 | 255 | 255 | 255 | 255 | 255 |
| 7681 to 7696 | | 0 | 0 | 0 | 0 | 0 | 0 | 0 | 0 | 0 | 0 | 0 | 0 | 0 | 0 | 0 | 0 |
| 7697 to 7712 | | 0 | 0 | 0 | 0 | 0 | 0 | 0 | 0 | 0 | 0 | 0 | 0 | 0 | 0 | 0 | 0 |
| 7713 to 7728 | | 0 | 0 | 0 | 0 | 0 | 0 | 0 | 0 | 0 | 0 | 0 | 0 | 0 | 0 | 0 | 0 |
| 7729 to 7744 | | 0 | 0 | 0 | 0 | 0 | 0 | 0 | 0 | 0 | 0 | 0 | 0 | 0 | 0 | 0 | 0 |
| 7745 to 7760 | | 0 | 0 | 0 | 0 | 0 | 0 | 0 | 0 | 0 | 0 | 0 | 0 | 0 | 0 | 0 | 0 |
| 7761 to 7776 | | 0 | 0 | 0 | 0 | 0 | 0 | 0 | 0 | 0 | 0 | 0 | 0 | 0 | 0 | 0 | 0 |
| 7777 to 7792 | | 0 | 0 | 0 | 0 | 0 | 0 | 0 | 0 | 0 | 0 | 0 | 0 | 0 | 0 | 0 | 0 |
| 7793 to 7808 | | 0 | 0 | 0 | 0 | 0 | 0 | 0 | 0 | 0 | 0 | 0 | 0 | 0 | 0 | 0 | 0 |
| 7809 to 7824 | | 0 | 0 | 0 | 0 | 0 | 0 | 0 | 0 | 0 | 0 | 0 | 0 | 0 | 0 | 0 | 0 |
| 7825 to 7840 | | 0 | 0 | 0 | 0 | 0 | 0 | 0 | 0 | 0 | 0 | 0 | 0 | 0 | 0 | 0 | 0 |
| 7841 to 7856 | | 0 | 0 | 0 | 0 | 0 | 0 | 0 | 0 | 0 | 0 | 0 | 0 | 0 | 0 | 0 | 0 |
| 7857 to 7872 | | 0 | 0 | 0 | 0 | 0 | 0 | 0 | 0 | 0 | 0 | 0 | 0 | 0 | 0 | 0 | 0 |
| 7873 to 7888 | | 0 | 0 | 0 | 0 | 0 | 0 | 0 | 0 | 0 | 0 | 0 | 0 | 0 | 0 | 0 | 0 |
| 7889 to 7904 | | 0 | 0 | 0 | 0 | 0 | 0 | 0 | 0 | 0 | 0 | 0 | 0 | 0 | 0 | 0 | 0 |
| 7905 to 7920 | | 0 | 0 | 0 | 0 | 0 | 0 | 0 | 0 | 0 | 0 | 0 | 0 | 0 | 0 | 0 | 0 |
| 7921 to 7936 | | 0 | 0 | 0 | 0 | 0 | 0 | 0 | 0 | 0 | 4 | 0 | 0 | 0 | 0 | 0 | 0 |
| 7937 to 7952 | | 0 | 192 | 0 | 12 | 0 | 0 | 0 | 0 | 0 | 0 | 129 | 31 | 0 | 0 | 0 | 0 |
| 7953 to 7968 | | 0 | 4 | 224 | 63 | 0 | 0 | 0 | 0 | 0 | 0 | 252 | 63 | 0 | 0 | 0 | 0 |
| 7969 to 7984 | | 0 | 128 | 255 | 127 | 0 | 0 | 0 | 0 | 0 | 240 | 255 | 255 | 0 | 0 | 0 | 0 |
| 7985 to 8000 | | 0 | 254 | 255 | 255 | 1 | 0 | 0 | 0 | 192 | 255 | 255 | 255 | 1 | 0 | 0 | 0 |
| 8001 to 8016 | | 240 | 255 | 255 | 255 | 3 | 0 | 0 | 0 | 254 | 255 | 255 | 255 | 7 | 0 | 0 | 0 |
| 8017 to 8032 | | 255 | 255 | 255 | 255 | 7 | 0 | 0 | 0 | 255 | 255 | 255 | 255 | 15 | 0 | 0 | 0 |
| 8033 to 8048 | | 255 | 255 | 255 | 255 | 31 | 0 | 0 | 0 | 255 | 255 | 255 | 255 | 63 | 0 | 0 | 0 |
| 8049 to 8064 | | 255 | 255 | 255 | 255 | 63 | 0 | 0 | 0 | 255 | 255 | 255 | 255 | 127 | 0 | 0 | 0 |
| 8065 to 8080 | | 255 | 255 | 255 | 255 | 255 | 0 | 0 | 0 | 255 | 255 | 255 | 255 | 255 | 0 | 0 | 0 |
| 8081 to 8096 | | 255 | 255 | 255 | 255 | 255 | 1 | 0 | 0 | 255 | 255 | 255 | 255 | 255 | 3 | 0 | 0 |
| 8097 to 8112 | | 255 | 255 | 255 | 255 | 255 | 255 | 255 | 255 | 255 | 255 | 255 | 255 | 255 | 255 | 255 | 255 |
| 8113 to 8128 | | 255 | 255 | 255 | 255 | 255 | 255 | 255 | 255 | 255 | 255 | 255 | 255 | 255 | 255 | 255 | 255 |
| 8129 to 8144 | | 255 | 255 | 255 | 255 | 255 | 255 | 255 | 255 | 255 | 255 | 255 | 255 | 255 | 255 | 255 | 255 |
| 8145 to 8160 | | 255 | 255 | 255 | 255 | 255 | 255 | 255 | 255 | 255 | 255 | 255 | 255 | 255 | 255 | 255 | 255 |
| 8161 to 8176 | | 255 | 255 | 255 | 255 | 255 | 255 | 255 | 255 | 255 | 255 | 255 | 255 | 255 | 255 | 255 | 255 |
| 8177 to 8192 | | 255 | 255 | 255 | 255 | 255 | 255 | 255 | 255 | 255 | 255 | 255 | 255 | 255 | 255 | 255 | 255 |
| 8193 to 8208 | | 0 | 0 | 0 | 0 | 0 | 0 | 0 | 0 | 0 | 0 | 0 | 0 | 0 | 0 | 0 | 0 |
| 8209 to 8224 | | 0 | 0 | 0 | 0 | 0 | 0 | 0 | 0 | 0 | 0 | 0 | 0 | 0 | 0 | 0 | 0 |
| 8225 to 8240 | | 0 | 0 | 0 | 0 | 0 | 0 | 0 | 0 | 0 | 0 | 0 | 0 | 0 | 0 | 0 | 0 |
| 8241 to 8256 | | 0 | 0 | 0 | 0 | 0 | 0 | 0 | 0 | 0 | 0 | 0 | 0 | 0 | 0 | 0 | 0 |
| 8257 to 8272 | | 0 | 0 | 0 | 0 | 0 | 0 | 0 | 0 | 0 | 0 | 0 | 0 | 0 | 0 | 0 | 0 |
| 8273 to 8288 | | 0 | 0 | 0 | 0 | 0 | 0 | 0 | 0 | 0 | 0 | 0 | 0 | 0 | 0 | 0 | 0 |
| 8289 to 8304 | | 0 | 0 | 0 | 0 | 0 | 0 | 0 | 0 | 0 | 0 | 0 | 0 | 0 | 0 | 0 | 0 |
| 8305 to 8320 | | 0 | 0 | 0 | 0 | 0 | 0 | 0 | 0 | 0 | 0 | 0 | 0 | 0 | 0 | 0 | 0 |
| 8321 to 8336 | | 0 | 0 | 0 | 0 | 0 | 0 | 0 | 0 | 0 | 0 | 0 | 0 | 0 | 0 | 0 | 0 |
| 8337 to 8352 | | 0 | 0 | 0 | 0 | 0 | 0 | 0 | 0 | 0 | 0 | 0 | 0 | 0 | 0 | 0 | 0 |
| 8353 to 8368 | | 0 | 0 | 0 | 0 | 0 | 0 | 0 | 0 | 0 | 0 | 0 | 0 | 0 | 0 | 0 | 0 |
| 8369 to 8384 | | 0 | 0 | 0 | 0 | 0 | 0 | 0 | 0 | 0 | 0 | 0 | 0 | 0 | 0 | 0 | 0 |
| 8385 to 8400 | | 0 | 0 | 0 | 0 | 0 | 0 | 0 | 0 | 0 | 0 | 0 | 0 | 0 | 0 | 0 | 0 |
| 8401 to 8416 | | 0 | 0 | 0 | 0 | 0 | 0 | 0 | 0 | 0 | 0 | 0 | 0 | 0 | 0 | 0 | 0 |
| 8417 to 8432 | | 0 | 0 | 0 | 0 | 0 | 0 | 0 | 0 | 0 | 0 | 0 | 0 | 0 | 0 | 0 | 0 |
| 8433 to 8448 | | 0 | 0 | 0 | 0 | 0 | 0 | 0 | 0 | 0 | 0 | 0 | 0 | 0 | 0 | 0 | 0 |
| 8449 to 8464 | | 0 | 128 | 1 | 16 | 0 | 0 | 0 | 0 | 0 | 0 | 0 | 30 | 0 | 0 | 0 | 0 |
| 8465 to 8480 | | 0 | 0 | 192 | 63 | 0 | 0 | 0 | 0 | 0 | 0 | 240 | 127 | 0 | 0 | 0 | 0 |
| 8481 to 8496 | | 0 | 0 | 254 | 127 | 0 | 0 | 0 | 0 | 0 | 192 | 255 | 255 | 0 | 0 | 0 | 0 |
| 8497 to 8512 | | 0 | 248 | 255 | 255 | 1 | 0 | 0 | 0 | 0 | 255 | 255 | 255 | 3 | 0 | 0 | 0 |
| 8513 to 8528 | | 224 | 255 | 255 | 255 | 3 | 0 | 0 | 0 | 248 | 255 | 255 | 255 | 7 | 0 | 0 | 0 |
| 8529 to 8544 | | 255 | 255 | 255 | 255 | 15 | 0 | 0 | 0 | 255 | 255 | 255 | 255 | 15 | 0 | 0 | 0 |
| 8545 to 8560 | | 255 | 255 | 255 | 255 | 31 | 0 | 0 | 0 | 255 | 255 | 255 | 255 | 63 | 0 | 0 | 0 |
| 8561 to 8576 | | 255 | 255 | 255 | 255 | 127 | 0 | 0 | 0 | 255 | 255 | 255 | 255 | 127 | 0 | 0 | 0 |
| 8577 to 8592 | | 255 | 255 | 255 | 255 | 255 | 0 | 0 | 0 | 255 | 255 | 255 | 255 | 255 | 1 | 0 | 0 |
| 8593 to 8608 | | 255 | 255 | 255 | 255 | 255 | 1 | 0 | 0 | 255 | 255 | 255 | 255 | 255 | 3 | 0 | 0 |
| 8609 to 8624 | | 255 | 255 | 255 | 255 | 255 | 7 | 0 | 0 | 255 | 255 | 255 | 255 | 255 | 255 | 255 | 255 |

TABLE 1-continued

| Address | Content | | | | | | | | | | | | | | | |
|---|---|---|---|---|---|---|---|---|---|---|---|---|---|---|---|---|
| 8625 to 8640 | 255 | 255 | 255 | 255 | 255 | 255 | 255 | 255 | 255 | 255 | 255 | 255 | 255 | 255 | 255 | 255 |
| 8641 to 8656 | 255 | 255 | 255 | 255 | 255 | 255 | 255 | 255 | 255 | 255 | 255 | 255 | 255 | 255 | 255 | 255 |
| 8657 to 8672 | 255 | 255 | 255 | 255 | 255 | 255 | 255 | 255 | 255 | 255 | 255 | 255 | 255 | 255 | 255 | 255 |
| 8673 to 8688 | 255 | 255 | 255 | 255 | 255 | 255 | 255 | 255 | 255 | 255 | 255 | 255 | 255 | 255 | 255 | 255 |
| 8689 to 8704 | 255 | 255 | 255 | 255 | 255 | 255 | 255 | 255 | 255 | 255 | 255 | 255 | 255 | 255 | 255 | 255 |
| 8705 to 8720 | 0 | 0 | 0 | 0 | 0 | 0 | 0 | 0 | 0 | 0 | 0 | 0 | 0 | 0 | 0 | 0 |
| 8721 to 8736 | 0 | 0 | 0 | 0 | 0 | 0 | 0 | 0 | 0 | 0 | 0 | 0 | 0 | 0 | 0 | 0 |
| 8737 to 8752 | 0 | 0 | 0 | 0 | 0 | 0 | 0 | 0 | 0 | 0 | 0 | 0 | 0 | 0 | 0 | 0 |
| 8753 to 8768 | 0 | 0 | 0 | 0 | 0 | 0 | 0 | 0 | 0 | 0 | 0 | 0 | 0 | 0 | 0 | 0 |
| 8769 to 8784 | 0 | 0 | 0 | 0 | 0 | 0 | 0 | 0 | 0 | 0 | 0 | 0 | 0 | 0 | 0 | 0 |
| 8785 to 8800 | 0 | 0 | 0 | 0 | 0 | 0 | 0 | 0 | 0 | 0 | 0 | 0 | 0 | 0 | 0 | 0 |
| 8801 to 8816 | 0 | 0 | 0 | 0 | 0 | 0 | 0 | 0 | 0 | 0 | 0 | 0 | 0 | 0 | 0 | 0 |
| 8817 to 8832 | 0 | 0 | 0 | 0 | 0 | 0 | 0 | 0 | 0 | 0 | 0 | 0 | 0 | 0 | 0 | 0 |
| 8833 to 8848 | 0 | 0 | 0 | 0 | 0 | 0 | 0 | 0 | 0 | 0 | 0 | 0 | 0 | 0 | 0 | 0 |
| 8849 to 8864 | 0 | 0 | 0 | 0 | 0 | 0 | 0 | 0 | 0 | 0 | 0 | 0 | 0 | 0 | 0 | 0 |
| 8865 to 8880 | 0 | 0 | 0 | 0 | 0 | 0 | 0 | 0 | 0 | 0 | 0 | 0 | 0 | 0 | 0 | 0 |
| 8881 to 8896 | 0 | 0 | 0 | 0 | 0 | 0 | 0 | 0 | 0 | 0 | 0 | 0 | 0 | 0 | 0 | 0 |
| 8897 to 8912 | 0 | 0 | 0 | 0 | 0 | 0 | 0 | 0 | 0 | 0 | 0 | 0 | 0 | 0 | 0 | 0 |
| 8913 to 8928 | 0 | 0 | 0 | 0 | 0 | 0 | 0 | 0 | 0 | 0 | 0 | 0 | 0 | 0 | 0 | 0 |
| 8929 to 8944 | 0 | 0 | 0 | 0 | 0 | 0 | 0 | 0 | 0 | 0 | 0 | 0 | 0 | 0 | 0 | 0 |
| 8945 to 8960 | 0 | 0 | 0 | 0 | 0 | 0 | 0 | 0 | 0 | 0 | 0 | 0 | 0 | 0 | 0 | 0 |
| 8961 to 8976 | 0 | 0 | 1 | 0 | 0 | 0 | 0 | 0 | 0 | 0 | 0 | 56 | 0 | 0 | 0 | 0 |
| 8977 to 8992 | 0 | 0 | 0 | 63 | 0 | 0 | 0 | 0 | 0 | 0 | 224 | 127 | 0 | 0 | 0 | 0 |
| 8993 to 9008 | 0 | 0 | 252 | 255 | 0 | 0 | 0 | 0 | 0 | 0 | 255 | 255 | 0 | 0 | 0 | 0 |
| 9009 to 9024 | 0 | 224 | 255 | 255 | 1 | 0 | 0 | 0 | 0 | 252 | 255 | 255 | 3 | 0 | 0 | 0 |
| 9025 to 9040 | 128 | 255 | 255 | 255 | 7 | 0 | 0 | 0 | 240 | 255 | 255 | 255 | 7 | 0 | 0 | 0 |
| 9041 to 9056 | 252 | 255 | 255 | 255 | 15 | 0 | 0 | 0 | 255 | 255 | 255 | 255 | 31 | 0 | 0 | 0 |
| 9057 to 9072 | 255 | 255 | 255 | 255 | 63 | 0 | 0 | 0 | 255 | 255 | 255 | 255 | 63 | 0 | 0 | 0 |
| 9073 to 9088 | 255 | 255 | 255 | 255 | 127 | 0 | 0 | 0 | 255 | 255 | 255 | 255 | 255 | 0 | 0 | 0 |
| 9089 to 9104 | 255 | 255 | 255 | 255 | 255 | 0 | 0 | 0 | 255 | 255 | 255 | 255 | 255 | 1 | 0 | 0 |
| 9105 to 9120 | 255 | 255 | 255 | 255 | 255 | 3 | 0 | 0 | 255 | 255 | 255 | 255 | 255 | 7 | 0 | 0 |
| 9121 to 9136 | 255 | 255 | 255 | 255 | 255 | 7 | 0 | 0 | 255 | 255 | 255 | 255 | 255 | 15 | 0 | 0 |
| 9137 to 9152 | 255 | 255 | 255 | 255 | 255 | 255 | 255 | 255 | 255 | 255 | 255 | 255 | 255 | 255 | 255 | 255 |
| 9153 to 9168 | 255 | 255 | 255 | 255 | 255 | 255 | 255 | 255 | 255 | 255 | 255 | 255 | 255 | 255 | 255 | 255 |
| 9169 to 9184 | 255 | 255 | 255 | 255 | 255 | 255 | 255 | 255 | 255 | 255 | 255 | 255 | 255 | 255 | 255 | 255 |
| 9185 to 9200 | 255 | 255 | 255 | 255 | 255 | 255 | 255 | 255 | 255 | 255 | 255 | 255 | 255 | 255 | 255 | 255 |
| 9201 to 9216 | 255 | 255 | 255 | 255 | 255 | 255 | 255 | 255 | 255 | 255 | 255 | 255 | 255 | 255 | 255 | 255 |
| 9217 to 9232 | 0 | 0 | 0 | 0 | 0 | 0 | 0 | 0 | 0 | 0 | 0 | 0 | 0 | 0 | 0 | 0 |
| 9233 to 9248 | 0 | 0 | 0 | 0 | 0 | 0 | 0 | 0 | 0 | 0 | 0 | 0 | 0 | 0 | 0 | 0 |
| 9249 to 9264 | 0 | 0 | 0 | 0 | 0 | 0 | 0 | 0 | 0 | 0 | 0 | 0 | 0 | 0 | 0 | 0 |
| 9265 to 9280 | 0 | 0 | 0 | 0 | 0 | 0 | 0 | 0 | 0 | 0 | 0 | 0 | 0 | 0 | 0 | 0 |
| 9281 to 9296 | 0 | 0 | 0 | 0 | 0 | 0 | 0 | 0 | 0 | 0 | 0 | 0 | 0 | 0 | 0 | 0 |
| 9297 to 9312 | 0 | 0 | 0 | 0 | 0 | 0 | 0 | 0 | 0 | 0 | 0 | 0 | 0 | 0 | 0 | 0 |
| 9313 to 9328 | 0 | 0 | 0 | 0 | 0 | 0 | 0 | 0 | 0 | 0 | 0 | 0 | 0 | 0 | 0 | 0 |
| 9329 to 9344 | 0 | 0 | 0 | 0 | 0 | 0 | 0 | 0 | 0 | 0 | 0 | 0 | 0 | 0 | 0 | 0 |
| 9345 to 9360 | 0 | 0 | 0 | 0 | 0 | 0 | 0 | 0 | 0 | 0 | 0 | 0 | 0 | 0 | 0 | 0 |
| 9361 to 9376 | 0 | 0 | 0 | 0 | 0 | 0 | 0 | 0 | 0 | 0 | 0 | 0 | 0 | 0 | 0 | 0 |
| 9377 to 9392 | 0 | 0 | 0 | 0 | 0 | 0 | 0 | 0 | 0 | 0 | 0 | 0 | 0 | 0 | 0 | 0 |
| 9393 to 9408 | 0 | 0 | 0 | 0 | 0 | 0 | 0 | 0 | 0 | 0 | 0 | 0 | 0 | 0 | 0 | 0 |
| 9409 to 9424 | 0 | 0 | 0 | 0 | 0 | 0 | 0 | 0 | 0 | 0 | 0 | 0 | 0 | 0 | 0 | 0 |
| 9425 to 9440 | 0 | 0 | 0 | 0 | 0 | 0 | 0 | 0 | 0 | 0 | 0 | 0 | 0 | 0 | 0 | 0 |
| 9441 to 9456 | 0 | 0 | 0 | 0 | 0 | 0 | 0 | 0 | 0 | 0 | 0 | 0 | 0 | 0 | 0 | 0 |
| 9457 to 9472 | 0 | 0 | 0 | 0 | 0 | 0 | 0 | 0 | 0 | 0 | 0 | 0 | 0 | 0 | 0 | 0 |
| 9473 to 9488 | 0 | 0 | 6 | 0 | 0 | 0 | 0 | 0 | 0 | 0 | 0 | 32 | 0 | 0 | 0 | 0 |
| 9489 to 9504 | 0 | 0 | 0 | 124 | 0 | 0 | 0 | 0 | 0 | 0 | 128 | 127 | 0 | 0 | 0 | 0 |
| 9505 to 9520 | 0 | 0 | 240 | 255 | 0 | 0 | 0 | 0 | 0 | 0 | 254 | 255 | 1 | 0 | 0 | 0 |
| 9521 to 9536 | 0 | 128 | 255 | 255 | 3 | 0 | 0 | 0 | 240 | 255 | 255 | 255 | 3 | 0 | 0 | 0 |
| 9537 to 9552 | 0 | 254 | 255 | 255 | 7 | 0 | 0 | 0 | 192 | 255 | 255 | 255 | 15 | 0 | 0 | 0 |
| 9553 to 9568 | 248 | 255 | 255 | 255 | 15 | 0 | 0 | 0 | 254 | 255 | 255 | 255 | 31 | 0 | 0 | 0 |
| 9569 to 9584 | 255 | 255 | 255 | 255 | 63 | 0 | 0 | 0 | 255 | 255 | 255 | 255 | 127 | 0 | 0 | 0 |
| 9585 to 9600 | 255 | 255 | 255 | 255 | 127 | 0 | 0 | 0 | 255 | 255 | 255 | 255 | 255 | 0 | 0 | 0 |
| 9601 to 9616 | 255 | 255 | 255 | 255 | 255 | 1 | 0 | 0 | 255 | 255 | 255 | 255 | 255 | 1 | 0 | 0 |
| 9617 to 9632 | 255 | 255 | 255 | 255 | 255 | 3 | 0 | 0 | 255 | 255 | 255 | 255 | 255 | 7 | 0 | 0 |
| 9633 to 9648 | 255 | 255 | 255 | 255 | 255 | 15 | 0 | 0 | 255 | 255 | 255 | 255 | 255 | 15 | 0 | 0 |
| 9649 to 9664 | 255 | 255 | 255 | 255 | 255 | 31 | 0 | 0 | 255 | 255 | 255 | 255 | 255 | 255 | 255 | 255 |
| 9665 to 9680 | 255 | 255 | 255 | 255 | 255 | 255 | 255 | 255 | 255 | 255 | 255 | 255 | 255 | 255 | 255 | 255 |
| 9681 to 9696 | 255 | 255 | 255 | 255 | 255 | 255 | 255 | 255 | 255 | 255 | 255 | 255 | 255 | 255 | 255 | 255 |
| 9697 to 9712 | 255 | 255 | 255 | 255 | 255 | 255 | 255 | 255 | 255 | 255 | 255 | 255 | 255 | 255 | 255 | 255 |
| 9713 to 9728 | 255 | 255 | 255 | 255 | 255 | 255 | 255 | 255 | 255 | 255 | 255 | 255 | 255 | 255 | 255 | 255 |
| 9729 to 9744 | 0 | 0 | 0 | 0 | 0 | 0 | 0 | 0 | 0 | 0 | 0 | 0 | 0 | 0 | 0 | 0 |
| 9745 to 9760 | 0 | 0 | 0 | 0 | 0 | 0 | 0 | 0 | 0 | 0 | 0 | 0 | 0 | 0 | 0 | 0 |
| 9761 to 9776 | 0 | 0 | 0 | 0 | 0 | 0 | 0 | 0 | 0 | 0 | 0 | 0 | 0 | 0 | 0 | 0 |
| 9777 to 9792 | 0 | 0 | 0 | 0 | 0 | 0 | 0 | 0 | 0 | 0 | 0 | 0 | 0 | 0 | 0 | 0 |
| 9793 to 9808 | 0 | 0 | 0 | 0 | 0 | 0 | 0 | 0 | 0 | 0 | 0 | 0 | 0 | 0 | 0 | 0 |
| 9809 to 9824 | 0 | 0 | 0 | 0 | 0 | 0 | 0 | 0 | 0 | 0 | 0 | 0 | 0 | 0 | 0 | 0 |
| 9825 to 9840 | 0 | 0 | 0 | 0 | 0 | 0 | 0 | 0 | 0 | 0 | 0 | 0 | 0 | 0 | 0 | 0 |
| 9841 to 9856 | 0 | 0 | 0 | 0 | 0 | 0 | 0 | 0 | 0 | 0 | 0 | 0 | 0 | 0 | 0 | 0 |

TABLE 1-continued

| Address | Content | | | | | | | | | | | | | | | |
|---|---|---|---|---|---|---|---|---|---|---|---|---|---|---|---|---|
| 9857 to 9872 | 0 | 0 | 0 | 0 | 0 | 0 | 0 | 0 | 0 | 0 | 0 | 0 | 0 | 0 | 0 | 0 |
| 9873 to 9888 | 0 | 0 | 0 | 0 | 0 | 0 | 0 | 0 | 0 | 0 | 0 | 0 | 0 | 0 | 0 | 0 |
| 9889 to 9904 | 0 | 0 | 0 | 0 | 0 | 0 | 0 | 0 | 0 | 0 | 0 | 0 | 0 | 0 | 0 | 0 |
| 9905 to 9920 | 0 | 0 | 0 | 0 | 0 | 0 | 0 | 0 | 0 | 0 | 0 | 0 | 0 | 0 | 0 | 0 |
| 9921 to 9936 | 0 | 0 | 0 | 0 | 0 | 0 | 0 | 0 | 0 | 0 | 0 | 0 | 0 | 0 | 0 | 0 |
| 9937 to 9952 | 0 | 0 | 0 | 0 | 0 | 0 | 0 | 0 | 0 | 0 | 0 | 0 | 0 | 0 | 0 | 0 |
| 9953 to 9968 | 0 | 0 | 0 | 0 | 0 | 0 | 0 | 0 | 0 | 0 | 0 | 0 | 0 | 0 | 0 | 0 |
| 9969 to 9984 | 0 | 0 | 0 | 0 | 0 | 0 | 0 | 0 | 0 | 0 | 0 | 0 | 0 | 0 | 0 | 0 |
| 9985 to 10000 | 0 | 0 | 4 | 0 | 0 | 0 | 0 | 0 | 0 | 0 | 0 | 0 | 0 | 0 | 0 | 0 |
| 10001 to 10016 | 0 | 0 | 0 | 112 | 0 | 0 | 0 | 0 | 0 | 2 | 0 | 254 | 0 | 0 | 0 | 0 |
| 10017 to 10032 | 0 | 0 | 192 | 255 | 0 | 0 | 0 | 0 | 0 | 248 | 255 | 1 | 0 | 0 | 0 | 0 |
| 10033 to 10048 | 0 | 0 | 255 | 255 | 3 | 0 | 0 | 0 | 0 | 192 | 255 | 255 | 7 | 0 | 0 | 0 |
| 10049 to 10064 | 0 | 248 | 255 | 255 | 7 | 0 | 0 | 0 | 0 | 255 | 255 | 255 | 15 | 0 | 0 | 0 |
| 10065 to 10080 | 224 | 255 | 255 | 255 | 31 | 0 | 0 | 0 | 252 | 255 | 255 | 255 | 31 | 0 | 0 | 0 |
| 10081 to 10096 | 255 | 255 | 255 | 255 | 63 | 0 | 0 | 0 | 255 | 255 | 255 | 255 | 127 | 0 | 0 | 0 |
| 10097 to 10112 | 255 | 255 | 255 | 255 | 255 | 0 | 0 | 0 | 255 | 255 | 255 | 255 | 255 | 0 | 0 | 0 |
| 10113 to 10128 | 255 | 255 | 255 | 255 | 255 | 1 | 0 | 0 | 255 | 255 | 255 | 255 | 255 | 3 | 0 | 0 |
| 10129 to 10144 | 255 | 255 | 255 | 255 | 255 | 3 | 0 | 0 | 255 | 255 | 255 | 255 | 255 | 7 | 0 | 0 |
| 10145 to 10160 | 255 | 255 | 255 | 255 | 255 | 15 | 0 | 0 | 255 | 255 | 255 | 255 | 255 | 31 | 0 | 0 |
| 10161 to 10176 | 255 | 255 | 255 | 255 | 255 | 31 | 0 | 0 | 255 | 255 | 255 | 255 | 255 | 63 | 0 | 0 |
| 10177 to 10192 | 255 | 255 | 255 | 255 | 255 | 127 | 0 | 0 | 255 | 255 | 255 | 255 | 255 | 255 | 255 | 255 |
| 10193 to 10208 | 255 | 255 | 255 | 255 | 255 | 255 | 255 | 255 | 255 | 255 | 255 | 255 | 255 | 255 | 255 | 255 |
| 10209 to 10224 | 255 | 255 | 255 | 255 | 255 | 255 | 255 | 255 | 255 | 255 | 255 | 255 | 255 | 255 | 255 | 255 |
| 10225 to 10240 | 255 | 255 | 255 | 255 | 255 | 255 | 255 | 255 | 255 | 255 | 255 | 255 | 255 | 255 | 255 | 255 |
| 10241 to 10256 | 0 | 0 | 0 | 0 | 0 | 0 | 0 | 0 | 0 | 0 | 0 | 0 | 0 | 0 | 0 | 0 |
| 10257 to 10272 | 0 | 0 | 0 | 0 | 0 | 0 | 0 | 0 | 0 | 0 | 0 | 0 | 0 | 0 | 0 | 0 |
| 10273 to 10288 | 0 | 0 | 0 | 0 | 0 | 0 | 0 | 0 | 0 | 0 | 0 | 0 | 0 | 0 | 0 | 0 |
| 10289 to 10304 | 0 | 0 | 0 | 0 | 0 | 0 | 0 | 0 | 0 | 0 | 0 | 0 | 0 | 0 | 0 | 0 |
| 10305 to 10320 | 0 | 0 | 0 | 0 | 0 | 0 | 0 | 0 | 0 | 0 | 0 | 0 | 0 | 0 | 0 | 0 |
| 10321 to 10336 | 0 | 0 | 0 | 0 | 0 | 0 | 0 | 0 | 0 | 0 | 0 | 0 | 0 | 0 | 0 | 0 |
| 10337 to 10352 | 0 | 0 | 0 | 0 | 0 | 0 | 0 | 0 | 0 | 0 | 0 | 0 | 0 | 0 | 0 | 0 |
| 10353 to 10368 | 0 | 0 | 0 | 0 | 0 | 0 | 0 | 0 | 0 | 0 | 0 | 0 | 0 | 0 | 0 | 0 |
| 10369 to 10384 | 0 | 0 | 0 | 0 | 0 | 0 | 0 | 0 | 0 | 0 | 0 | 0 | 0 | 0 | 0 | 0 |
| 10385 to 10400 | 0 | 0 | 0 | 0 | 0 | 0 | 0 | 0 | 0 | 0 | 0 | 0 | 0 | 0 | 0 | 0 |
| 10401 to 10416 | 0 | 0 | 0 | 0 | 0 | 0 | 0 | 0 | 0 | 0 | 0 | 0 | 0 | 0 | 0 | 0 |
| 10417 to 10432 | 0 | 0 | 0 | 0 | 0 | 0 | 0 | 0 | 0 | 0 | 0 | 0 | 0 | 0 | 0 | 0 |
| 10433 to 10448 | 0 | 0 | 0 | 0 | 0 | 0 | 0 | 0 | 0 | 0 | 0 | 0 | 0 | 0 | 0 | 0 |
| 10449 to 10464 | 0 | 0 | 0 | 0 | 0 | 0 | 0 | 0 | 0 | 0 | 0 | 0 | 0 | 0 | 0 | 0 |
| 10465 to 10480 | 0 | 0 | 0 | 0 | 0 | 0 | 0 | 0 | 0 | 0 | 0 | 0 | 0 | 0 | 0 | 0 |
| 10481 to 10496 | 0 | 0 | 0 | 0 | 0 | 0 | 0 | 0 | 0 | 0 | 0 | 0 | 0 | 0 | 0 | 0 |
| 10497 to 10512 | 0 | 0 | 0 | 0 | 0 | 0 | 0 | 0 | 0 | 0 | 0 | 0 | 0 | 0 | 0 | 0 |
| 10513 to 10528 | 0 | 0 | 0 | 96 | 0 | 0 | 0 | 0 | 0 | 0 | 0 | 248 | 0 | 0 | 0 | 0 |
| 10529 to 10544 | 0 | 0 | 0 | 255 | 1 | 0 | 0 | 0 | 0 | 0 | 224 | 255 | 3 | 0 | 0 | 0 |
| 10545 to 10560 | 0 | 0 | 252 | 255 | 3 | 0 | 0 | 0 | 0 | 128 | 255 | 255 | 7 | 0 | 0 | 0 |
| 10561 to 10576 | 0 | 224 | 255 | 255 | 15 | 0 | 0 | 0 | 0 | 252 | 255 | 255 | 15 | 0 | 0 | 0 |
| 10577 to 10592 | 128 | 255 | 255 | 255 | 31 | 0 | 0 | 0 | 240 | 255 | 255 | 255 | 63 | 0 | 0 | 0 |
| 10593 to 10608 | 254 | 255 | 255 | 255 | 127 | 0 | 0 | 0 | 255 | 255 | 255 | 255 | 127 | 0 | 0 | 0 |
| 10609 to 10624 | 255 | 255 | 255 | 255 | 255 | 0 | 0 | 0 | 255 | 255 | 255 | 255 | 255 | 1 | 0 | 0 |
| 10625 to 10640 | 255 | 255 | 255 | 255 | 255 | 1 | 0 | 0 | 255 | 255 | 255 | 255 | 255 | 3 | 0 | 0 |
| 10641 to 10656 | 255 | 255 | 255 | 255 | 255 | 7 | 0 | 0 | 255 | 255 | 255 | 255 | 255 | 15 | 0 | 0 |
| 10657 to 10672 | 255 | 255 | 255 | 255 | 255 | 15 | 0 | 0 | 255 | 255 | 255 | 255 | 255 | 31 | 0 | 0 |
| 10673 to 10688 | 255 | 255 | 255 | 255 | 255 | 63 | 0 | 0 | 255 | 255 | 255 | 255 | 255 | 63 | 0 | 0 |
| 10689 to 10704 | 255 | 255 | 255 | 255 | 255 | 127 | 0 | 0 | 255 | 255 | 255 | 255 | 255 | 255 | 0 | 0 |
| 10705 to 10720 | 255 | 255 | 255 | 255 | 255 | 255 | 255 | 255 | 255 | 255 | 255 | 255 | 255 | 255 | 255 | 255 |
| 10721 to 10736 | 255 | 255 | 255 | 255 | 255 | 255 | 255 | 255 | 255 | 255 | 255 | 255 | 255 | 255 | 255 | 255 |
| 10737 to 10752 | 255 | 255 | 255 | 255 | 255 | 255 | 255 | 255 | 255 | 255 | 255 | 255 | 255 | 255 | 255 | 255 |
| 10753 to 10768 | 0 | 0 | 0 | 0 | 0 | 0 | 0 | 0 | 0 | 0 | 0 | 0 | 0 | 0 | 0 | 0 |
| 10769 to 10784 | 0 | 0 | 0 | 0 | 0 | 0 | 0 | 0 | 0 | 0 | 0 | 0 | 0 | 0 | 0 | 0 |
| 10785 to 10800 | 0 | 0 | 0 | 0 | 0 | 0 | 0 | 0 | 0 | 0 | 0 | 0 | 0 | 0 | 0 | 0 |
| 10801 to 10816 | 0 | 0 | 0 | 0 | 0 | 0 | 0 | 0 | 0 | 0 | 0 | 0 | 0 | 0 | 0 | 0 |
| 10817 to 10832 | 0 | 0 | 0 | 0 | 0 | 0 | 0 | 0 | 0 | 0 | 0 | 0 | 0 | 0 | 0 | 0 |
| 10833 to 10848 | 0 | 0 | 0 | 0 | 0 | 0 | 0 | 0 | 0 | 0 | 0 | 0 | 0 | 0 | 0 | 0 |
| 10849 to 10864 | 0 | 0 | 0 | 0 | 0 | 0 | 0 | 0 | 0 | 0 | 0 | 0 | 0 | 0 | 0 | 0 |
| 10865 to 10880 | 0 | 0 | 0 | 0 | 0 | 0 | 0 | 0 | 0 | 0 | 0 | 0 | 0 | 0 | 0 | 0 |
| 10881 to 10896 | 0 | 0 | 0 | 0 | 0 | 0 | 0 | 0 | 0 | 0 | 0 | 0 | 0 | 0 | 0 | 0 |
| 10897 to 10912 | 0 | 0 | 0 | 0 | 0 | 0 | 0 | 0 | 0 | 0 | 0 | 0 | 0 | 0 | 0 | 0 |
| 10913 to 10928 | 0 | 0 | 0 | 0 | 0 | 0 | 0 | 0 | 0 | 0 | 0 | 0 | 0 | 0 | 0 | 0 |
| 10929 to 10944 | 0 | 0 | 0 | 0 | 0 | 0 | 0 | 0 | 0 | 0 | 0 | 0 | 0 | 0 | 0 | 0 |
| 10945 to 10960 | 0 | 0 | 0 | 0 | 0 | 0 | 0 | 0 | 0 | 0 | 0 | 0 | 0 | 0 | 0 | 0 |
| 10961 to 10976 | 0 | 0 | 0 | 0 | 0 | 0 | 0 | 0 | 0 | 0 | 0 | 0 | 0 | 0 | 0 | 0 |
| 10977 to 10992 | 0 | 0 | 0 | 0 | 0 | 0 | 0 | 0 | 0 | 0 | 0 | 0 | 0 | 0 | 0 | 0 |
| 10993 to 11008 | 0 | 0 | 0 | 0 | 0 | 0 | 0 | 0 | 0 | 0 | 0 | 0 | 0 | 0 | 0 | 0 |
| 11009 to 11024 | 0 | 0 | 0 | 0 | 0 | 0 | 0 | 0 | 0 | 0 | 0 | 0 | 0 | 0 | 0 | 0 |
| 11025 to 11040 | 0 | 0 | 0 | 128 | 0 | 0 | 0 | 0 | 0 | 0 | 0 | 240 | 0 | 0 | 0 | 0 |
| 11041 to 11056 | 0 | 0 | 0 | 252 | 1 | 0 | 0 | 0 | 0 | 0 | 128 | 255 | 3 | 0 | 0 | 0 |
| 11057 to 11072 | 0 | 0 | 240 | 255 | 7 | 0 | 0 | 0 | 0 | 0 | 254 | 255 | 7 | 0 | 0 | 0 |
| 11073 to 11088 | 0 | 192 | 255 | 255 | 15 | 0 | 0 | 0 | 0 | 240 | 255 | 255 | 31 | 0 | 0 | 0 |

TABLE 1-continued

| Address | Content | | | | | | | | | | | | | | | |
|---|---|---|---|---|---|---|---|---|---|---|---|---|---|---|---|---|
| 11089 to 11104 | 0 | 254 | 255 | 255 | 31 | 0 | 0 | 0 | 192 | 255 | 255 | 255 | 63 | 0 | 0 | 0 |
| 11105 to 11120 | 248 | 255 | 255 | 255 | 127 | 0 | 0 | 0 | 255 | 255 | 255 | 255 | 255 | 0 | 0 | 0 |
| 11121 to 11136 | 255 | 255 | 255 | 255 | 255 | 0 | 0 | 0 | 255 | 255 | 255 | 255 | 255 | 1 | 0 | 0 |
| 11137 to 11152 | 255 | 255 | 255 | 255 | 255 | 3 | 0 | 0 | 255 | 255 | 255 | 255 | 255 | 3 | 0 | 0 |
| 11153 to 11168 | 255 | 255 | 255 | 255 | 255 | 7 | 0 | 0 | 255 | 255 | 255 | 255 | 255 | 15 | 0 | 0 |
| 11169 to 11184 | 255 | 255 | 255 | 255 | 255 | 31 | 0 | 0 | 255 | 255 | 255 | 255 | 255 | 31 | 0 | 0 |
| 11185 to 11200 | 255 | 255 | 255 | 255 | 255 | 63 | 0 | 0 | 255 | 255 | 255 | 255 | 255 | 127 | 0 | 0 |
| 11201 to 11216 | 255 | 255 | 255 | 255 | 255 | 127 | 0 | 0 | 255 | 255 | 255 | 255 | 255 | 255 | 0 | 0 |
| 11217 to 11232 | 255 | 255 | 255 | 255 | 255 | 255 | 1 | 0 | 255 | 255 | 255 | 255 | 255 | 255 | 255 | 255 |
| 11233 to 11248 | 255 | 255 | 255 | 255 | 255 | 255 | 255 | 255 | 255 | 255 | 255 | 255 | 255 | 255 | 255 | 255 |
| 11249 to 11264 | 255 | 255 | 255 | 255 | 255 | 255 | 255 | 255 | 255 | 255 | 255 | 255 | 255 | 255 | 255 | 255 |
| 11265 to 11280 | 0 | 0 | 0 | 0 | 0 | 0 | 0 | 0 | 0 | 0 | 0 | 0 | 0 | 0 | 0 | 0 |
| 11281 to 11296 | 0 | 0 | 0 | 0 | 0 | 0 | 0 | 0 | 0 | 0 | 0 | 0 | 0 | 0 | 0 | 0 |
| 11297 to 11312 | 0 | 0 | 0 | 0 | 0 | 0 | 0 | 0 | 0 | 0 | 0 | 0 | 0 | 0 | 0 | 0 |
| 11313 to 11328 | 0 | 0 | 0 | 0 | 0 | 0 | 0 | 0 | 0 | 0 | 0 | 0 | 0 | 0 | 0 | 0 |
| 11329 to 11344 | 0 | 0 | 0 | 0 | 0 | 0 | 0 | 0 | 0 | 0 | 0 | 0 | 0 | 0 | 0 | 0 |
| 11345 to 11360 | 0 | 0 | 0 | 0 | 0 | 0 | 0 | 0 | 0 | 0 | 0 | 0 | 0 | 0 | 0 | 0 |
| 11361 to 11376 | 0 | 0 | 0 | 0 | 0 | 0 | 0 | 0 | 0 | 0 | 0 | 0 | 0 | 0 | 0 | 0 |
| 11377 to 11392 | 0 | 0 | 0 | 0 | 0 | 0 | 0 | 0 | 0 | 0 | 0 | 0 | 0 | 0 | 0 | 0 |
| 11393 to 11408 | 0 | 0 | 0 | 0 | 0 | 0 | 0 | 0 | 0 | 0 | 0 | 0 | 0 | 0 | 0 | 0 |
| 11409 to 11424 | 0 | 0 | 0 | 0 | 0 | 0 | 0 | 0 | 0 | 0 | 0 | 0 | 0 | 0 | 0 | 0 |
| 11425 to 11440 | 0 | 0 | 0 | 0 | 0 | 0 | 0 | 0 | 0 | 0 | 0 | 0 | 0 | 0 | 0 | 0 |
| 11441 to 11456 | 0 | 0 | 0 | 0 | 0 | 0 | 0 | 0 | 0 | 0 | 0 | 0 | 0 | 0 | 0 | 0 |
| 11457 to 11472 | 0 | 0 | 0 | 0 | 0 | 0 | 0 | 0 | 0 | 0 | 0 | 0 | 0 | 0 | 0 | 0 |
| 11473 to 11488 | 0 | 0 | 0 | 0 | 0 | 0 | 0 | 0 | 0 | 0 | 0 | 0 | 0 | 0 | 0 | 0 |
| 11489 to 11504 | 0 | 0 | 0 | 0 | 0 | 0 | 0 | 0 | 0 | 0 | 0 | 0 | 0 | 0 | 0 | 0 |
| 11505 to 11520 | 0 | 0 | 0 | 0 | 0 | 0 | 0 | 0 | 0 | 0 | 0 | 0 | 0 | 0 | 0 | 0 |
| 11521 to 11536 | 0 | 0 | 0 | 0 | 0 | 0 | 0 | 0 | 0 | 0 | 0 | 0 | 0 | 0 | 0 | 0 |
| 11537 to 11552 | 0 | 0 | 0 | 0 | 0 | 0 | 0 | 0 | 0 | 0 | 0 | 192 | 1 | 0 | 0 | 0 |
| 11553 to 11568 | 0 | 0 | 0 | 248 | 1 | 0 | 0 | 0 | 0 | 0 | 0 | 254 | 3 | 0 | 0 | 0 |
| 11569 to 11584 | 0 | 0 | 192 | 255 | 7 | 0 | 0 | 0 | 0 | 0 | 248 | 255 | 15 | 0 | 0 | 0 |
| 11585 to 11600 | 0 | 0 | 255 | 255 | 15 | 0 | 0 | 0 | 0 | 224 | 255 | 255 | 31 | 0 | 0 | 0 |
| 11601 to 11616 | 0 | 252 | 255 | 255 | 63 | 0 | 0 | 0 | 0 | 255 | 255 | 255 | 127 | 0 | 0 | 0 |
| 11617 to 11632 | 224 | 255 | 255 | 255 | 127 | 0 | 0 | 0 | 252 | 255 | 255 | 255 | 255 | 0 | 0 | 0 |
| 11633 to 11648 | 255 | 255 | 255 | 255 | 255 | 0 | 0 | 0 | 255 | 255 | 255 | 255 | 255 | 1 | 0 | 0 |
| 11649 to 11664 | 255 | 255 | 255 | 255 | 255 | 3 | 0 | 0 | 255 | 255 | 255 | 255 | 255 | 7 | 0 | 0 |
| 11665 to 11680 | 255 | 255 | 255 | 255 | 255 | 15 | 0 | 0 | 255 | 255 | 255 | 255 | 255 | 15 | 0 | 0 |
| 11681 to 11696 | 255 | 255 | 255 | 255 | 255 | 31 | 0 | 0 | 255 | 255 | 255 | 255 | 255 | 63 | 0 | 0 |
| 11697 to 11712 | 255 | 255 | 255 | 255 | 255 | 63 | 0 | 0 | 255 | 255 | 255 | 255 | 255 | 127 | 0 | 0 |
| 11713 to 11728 | 255 | 255 | 255 | 255 | 255 | 255 | 0 | 0 | 255 | 255 | 255 | 255 | 255 | 255 | 1 | 0 |
| 11729 to 11744 | 255 | 255 | 255 | 255 | 255 | 255 | 1 | 0 | 255 | 255 | 255 | 255 | 255 | 255 | 3 | 0 |
| 11745 to 11760 | 255 | 255 | 255 | 255 | 255 | 255 | 255 | 255 | 255 | 255 | 255 | 255 | 255 | 255 | 255 | 255 |
| 11761 to 11776 | 255 | 255 | 255 | 255 | 255 | 255 | 255 | 255 | 255 | 255 | 255 | 255 | 255 | 255 | 255 | 255 |
| 11777 to 11792 | 0 | 0 | 0 | 0 | 0 | 0 | 0 | 0 | 0 | 0 | 0 | 0 | 0 | 0 | 0 | 0 |
| 11793 to 11808 | 0 | 0 | 0 | 0 | 0 | 0 | 0 | 0 | 0 | 0 | 0 | 0 | 0 | 0 | 0 | 0 |
| 11809 to 11824 | 0 | 0 | 0 | 0 | 0 | 0 | 0 | 0 | 0 | 0 | 0 | 0 | 0 | 0 | 0 | 0 |
| 11825 to 11840 | 0 | 0 | 0 | 0 | 0 | 0 | 0 | 0 | 0 | 0 | 0 | 0 | 0 | 0 | 0 | 0 |
| 11841 to 11856 | 0 | 0 | 0 | 0 | 0 | 0 | 0 | 0 | 0 | 0 | 0 | 0 | 0 | 0 | 0 | 0 |
| 11857 to 11872 | 0 | 0 | 0 | 0 | 0 | 0 | 0 | 0 | 0 | 0 | 0 | 0 | 0 | 0 | 0 | 0 |
| 11873 to 11888 | 0 | 0 | 0 | 0 | 0 | 0 | 0 | 0 | 0 | 0 | 0 | 0 | 0 | 0 | 0 | 0 |
| 11889 to 11904 | 0 | 0 | 0 | 0 | 0 | 0 | 0 | 0 | 0 | 0 | 0 | 0 | 0 | 0 | 0 | 0 |
| 11905 to 11920 | 0 | 0 | 0 | 0 | 0 | 0 | 0 | 0 | 0 | 0 | 0 | 0 | 0 | 0 | 0 | 0 |
| 11921 to 11936 | 0 | 0 | 0 | 0 | 0 | 0 | 0 | 0 | 0 | 0 | 0 | 0 | 0 | 0 | 0 | 0 |
| 11937 to 11952 | 0 | 0 | 0 | 0 | 0 | 0 | 0 | 0 | 0 | 0 | 0 | 0 | 0 | 0 | 0 | 0 |
| 11953 to 11968 | 0 | 0 | 0 | 0 | 0 | 0 | 0 | 0 | 0 | 0 | 0 | 0 | 0 | 0 | 0 | 0 |
| 11969 to 11984 | 0 | 0 | 0 | 0 | 0 | 0 | 0 | 0 | 0 | 0 | 0 | 0 | 0 | 0 | 0 | 0 |
| 11985 to 12000 | 0 | 0 | 0 | 0 | 0 | 0 | 0 | 0 | 0 | 0 | 0 | 0 | 0 | 0 | 0 | 0 |
| 12001 to 12016 | 0 | 0 | 0 | 0 | 0 | 0 | 0 | 0 | 0 | 0 | 0 | 0 | 0 | 0 | 0 | 0 |
| 12017 to 12032 | 0 | 0 | 0 | 0 | 0 | 0 | 0 | 0 | 0 | 0 | 0 | 0 | 0 | 0 | 0 | 0 |
| 12033 to 12048 | 0 | 0 | 0 | 0 | 0 | 0 | 0 | 0 | 0 | 0 | 0 | 0 | 0 | 0 | 0 | 0 |
| 12049 to 12064 | 0 | 0 | 0 | 0 | 0 | 0 | 0 | 0 | 0 | 0 | 0 | 0 | 0 | 1 | 0 | 0 |
| 12065 to 12080 | 0 | 0 | 0 | 224 | 3 | 0 | 0 | 0 | 0 | 0 | 0 | 252 | 7 | 0 | 0 | 0 |
| 12081 to 12096 | 0 | 0 | 0 | 255 | 7 | 0 | 0 | 0 | 0 | 224 | 255 | 255 | 15 | 0 | 0 | 255 |
| 12097 to 12112 | 0 | 252 | 255 | 255 | 31 | 0 | 0 | 0 | 0 | 128 | 255 | 255 | 31 | 0 | 0 | 0 |
| 12113 to 12128 | 0 | 240 | 255 | 255 | 63 | 0 | 0 | 0 | 0 | 254 | 255 | 255 | 127 | 0 | 0 | 0 |
| 12129 to 12144 | 128 | 255 | 255 | 255 | 255 | 0 | 0 | 0 | 240 | 255 | 255 | 255 | 255 | 0 | 0 | 0 |
| 12145 to 12160 | 254 | 255 | 255 | 255 | 255 | 1 | 0 | 0 | 255 | 255 | 255 | 255 | 255 | 3 | 0 | 0 |
| 12161 to 12176 | 255 | 255 | 255 | 255 | 255 | 3 | 0 | 0 | 255 | 255 | 255 | 255 | 255 | 7 | 0 | 0 |
| 12177 to 12192 | 255 | 255 | 255 | 255 | 255 | 15 | 0 | 0 | 255 | 255 | 255 | 255 | 255 | 31 | 0 | 0 |
| 12193 to 12208 | 255 | 255 | 255 | 255 | 255 | 31 | 0 | 0 | 255 | 255 | 255 | 255 | 255 | 63 | 0 | 0 |
| 12209 to 12224 | 255 | 255 | 255 | 255 | 255 | 127 | 0 | 0 | 255 | 255 | 255 | 255 | 255 | 127 | 0 | 0 |
| 12225 to 12240 | 255 | 255 | 255 | 255 | 255 | 255 | 0 | 0 | 255 | 255 | 255 | 255 | 255 | 255 | 1 | 0 |
| 12241 to 12256 | 255 | 255 | 255 | 255 | 255 | 255 | 3 | 0 | 255 | 255 | 255 | 255 | 255 | 255 | 3 | 0 |
| 12257 to 12272 | 255 | 255 | 255 | 255 | 255 | 255 | 7 | 0 | 255 | 255 | 255 | 255 | 255 | 255 | 15 | 0 |
| 12273 to 12288 | 255 | 255 | 255 | 255 | 255 | 255 | 255 | 255 | 255 | 255 | 255 | 255 | 255 | 255 | 255 | 255 |
| 12289 to 12304 | 0 | 0 | 0 | 0 | 0 | 0 | 0 | 0 | 0 | 0 | 0 | 0 | 0 | 0 | 0 | 0 |
| 12305 to 12320 | 0 | 0 | 0 | 0 | 0 | 0 | 0 | 0 | 0 | 0 | 0 | 0 | 0 | 0 | 0 | 0 |

TABLE 1-continued

| Address | Content | | | | | | | | | | | | | | | |
|---|---|---|---|---|---|---|---|---|---|---|---|---|---|---|---|---|
| 12321 to 12336 | 0 | 0 | 0 | 0 | 0 | 0 | 0 | 0 | 0 | 0 | 0 | 0 | 0 | 0 | 0 | 0 |
| 12337 to 12352 | 0 | 0 | 0 | 0 | 0 | 0 | 0 | 0 | 0 | 0 | 0 | 0 | 0 | 0 | 0 | 0 |
| 12353 to 12368 | 0 | 0 | 0 | 0 | 0 | 0 | 0 | 0 | 0 | 0 | 0 | 0 | 0 | 0 | 0 | 0 |
| 12369 to 12384 | 0 | 0 | 0 | 0 | 0 | 0 | 0 | 0 | 0 | 0 | 0 | 0 | 0 | 0 | 0 | 0 |
| 12385 to 12400 | 0 | 0 | 0 | 0 | 0 | 0 | 0 | 0 | 0 | 0 | 0 | 0 | 0 | 0 | 0 | 0 |
| 12401 to 12416 | 0 | 0 | 0 | 0 | 0 | 0 | 0 | 0 | 0 | 0 | 0 | 0 | 0 | 0 | 0 | 0 |
| 12417 to 12432 | 0 | 0 | 0 | 0 | 0 | 0 | 0 | 0 | 0 | 0 | 0 | 0 | 0 | 0 | 0 | 0 |
| 12433 to 12448 | 0 | 0 | 0 | 0 | 0 | 0 | 0 | 0 | 0 | 0 | 0 | 0 | 0 | 0 | 0 | 0 |
| 12449 to 12464 | 0 | 0 | 0 | 0 | 0 | 0 | 0 | 0 | 0 | 0 | 0 | 0 | 0 | 0 | 0 | 0 |
| 12465 to 12480 | 0 | 0 | 0 | 0 | 0 | 0 | 0 | 0 | 0 | 0 | 0 | 0 | 0 | 0 | 0 | 0 |
| 12481 to 12496 | 0 | 0 | 0 | 0 | 0 | 0 | 0 | 0 | 0 | 0 | 0 | 0 | 0 | 0 | 0 | 0 |
| 12497 to 12512 | 0 | 0 | 0 | 0 | 0 | 0 | 0 | 0 | 0 | 0 | 0 | 0 | 0 | 0 | 0 | 0 |
| 12513 to 12528 | 0 | 0 | 0 | 0 | 0 | 0 | 0 | 0 | 0 | 0 | 0 | 0 | 0 | 0 | 0 | 0 |
| 12529 to 12544 | 0 | 0 | 0 | 0 | 0 | 0 | 0 | 0 | 0 | 0 | 0 | 0 | 0 | 0 | 0 | 0 |
| 12545 to 12560 | 0 | 0 | 0 | 0 | 0 | 0 | 0 | 0 | 0 | 0 | 0 | 0 | 0 | 0 | 0 | 0 |
| 12561 to 12576 | 0 | 0 | 0 | 0 | 0 | 0 | 0 | 0 | 0 | 0 | 0 | 0 | 0 | 0 | 0 | 0 |
| 12577 to 12592 | 0 | 0 | 0 | 128 | 3 | 0 | 0 | 0 | 0 | 0 | 0 | 240 | 7 | 0 | 0 | 0 |
| 12593 to 12608 | 0 | 0 | 0 | 254 | 15 | 0 | 0 | 0 | 0 | 0 | 192 | 255 | 15 | 0 | 0 | 0 |
| 12609 to 12624 | 0 | 0 | 240 | 255 | 31 | 0 | 0 | 0 | 0 | 0 | 254 | 255 | 63 | 0 | 0 | 0 |
| 12625 to 12640 | 0 | 192 | 255 | 255 | 63 | 0 | 0 | 0 | 0 | 248 | 255 | 255 | 127 | 0 | 0 | 0 |
| 12641 to 12656 | 0 | 255 | 255 | 255 | 255 | 0 | 0 | 0 | 192 | 255 | 255 | 255 | 255 | 1 | 0 | 0 |
| 12657 to 12672 | 248 | 255 | 255 | 255 | 255 | 1 | 0 | 0 | 255 | 255 | 255 | 255 | 255 | 3 | 0 | 0 |
| 12673 to 12688 | 255 | 255 | 255 | 255 | 255 | 7 | 0 | 0 | 255 | 255 | 255 | 255 | 255 | 15 | 0 | 0 |
| 12689 to 12704 | 255 | 255 | 255 | 255 | 255 | 15 | 0 | 0 | 255 | 255 | 255 | 255 | 255 | 31 | 0 | 0 |
| 12705 to 12720 | 255 | 255 | 255 | 255 | 255 | 63 | 0 | 0 | 255 | 255 | 255 | 255 | 255 | 63 | 0 | 0 |
| 12721 to 12736 | 255 | 255 | 255 | 255 | 255 | 127 | 0 | 0 | 255 | 255 | 255 | 255 | 255 | 255 | 0 | 0 |
| 12737 to 12752 | 255 | 255 | 255 | 255 | 255 | 255 | 1 | 0 | 255 | 255 | 255 | 255 | 255 | 255 | 1 | 0 |
| 12753 to 12768 | 255 | 255 | 255 | 255 | 255 | 255 | 3 | 0 | 255 | 255 | 255 | 255 | 255 | 255 | 7 | 0 |
| 12769 to 12784 | 255 | 255 | 255 | 255 | 255 | 255 | 7 | 0 | 255 | 255 | 255 | 255 | 255 | 255 | 15 | 0 |
| 12785 to 12800 | 255 | 255 | 255 | 255 | 255 | 255 | 31 | 0 | 255 | 255 | 255 | 255 | 255 | 255 | 255 | 255 |
| 12801 to 12816 | 0 | 0 | 0 | 0 | 0 | 0 | 0 | 0 | 0 | 0 | 0 | 0 | 0 | 0 | 0 | 0 |
| 12817 to 12832 | 0 | 0 | 0 | 0 | 0 | 0 | 0 | 0 | 0 | 0 | 0 | 0 | 0 | 0 | 0 | 0 |
| 12833 to 12848 | 0 | 0 | 0 | 0 | 0 | 0 | 0 | 0 | 0 | 0 | 0 | 0 | 0 | 0 | 0 | 0 |
| 12849 to 12864 | 0 | 0 | 0 | 0 | 0 | 0 | 0 | 0 | 0 | 0 | 0 | 0 | 0 | 0 | 0 | 0 |
| 12865 to 12880 | 0 | 0 | 0 | 0 | 0 | 0 | 0 | 0 | 0 | 0 | 0 | 0 | 0 | 0 | 0 | 0 |
| 12881 to 12896 | 0 | 0 | 0 | 0 | 0 | 0 | 0 | 0 | 0 | 0 | 0 | 0 | 0 | 0 | 0 | 0 |
| 12897 to 12912 | 0 | 0 | 0 | 0 | 0 | 0 | 0 | 0 | 0 | 0 | 0 | 0 | 0 | 0 | 0 | 0 |
| 12913 to 12928 | 0 | 0 | 0 | 0 | 0 | 0 | 0 | 0 | 0 | 0 | 0 | 0 | 0 | 0 | 0 | 0 |
| 12929 to 12944 | 0 | 0 | 0 | 0 | 0 | 0 | 0 | 0 | 0 | 0 | 0 | 0 | 0 | 0 | 0 | 0 |
| 12945 to 12960 | 0 | 0 | 0 | 0 | 0 | 0 | 0 | 0 | 0 | 0 | 0 | 0 | 0 | 0 | 0 | 0 |
| 12961 to 12976 | 0 | 0 | 0 | 0 | 0 | 0 | 0 | 0 | 0 | 0 | 0 | 0 | 0 | 0 | 0 | 0 |
| 12977 to 12992 | 0 | 0 | 0 | 0 | 0 | 0 | 0 | 0 | 0 | 0 | 0 | 0 | 0 | 0 | 0 | 0 |
| 12993 to 13008 | 0 | 0 | 0 | 0 | 0 | 0 | 0 | 0 | 0 | 0 | 0 | 0 | 0 | 0 | 0 | 0 |
| 13009 to 13024 | 0 | 0 | 0 | 0 | 0 | 0 | 0 | 0 | 0 | 0 | 0 | 0 | 0 | 0 | 0 | 0 |
| 13025 to 13040 | 0 | 0 | 0 | 0 | 0 | 0 | 0 | 0 | 0 | 0 | 0 | 0 | 0 | 0 | 0 | 0 |
| 13041 to 13056 | 0 | 0 | 0 | 0 | 0 | 0 | 0 | 0 | 0 | 0 | 0 | 0 | 0 | 0 | 0 | 0 |
| 13057 to 13072 | 0 | 0 | 0 | 0 | 0 | 0 | 0 | 0 | 0 | 0 | 0 | 0 | 0 | 0 | 0 | 0 |
| 13073 to 13088 | 0 | 0 | 0 | 0 | 0 | 0 | 0 | 0 | 0 | 0 | 0 | 0 | 0 | 0 | 0 | 0 |
| 13089 to 13104 | 0 | 0 | 0 | 0 | 6 | 0 | 0 | 0 | 0 | 0 | 0 | 192 | 7 | 0 | 0 | 0 |
| 13105 to 13120 | 0 | 0 | 0 | 248 | 15 | 0 | 0 | 0 | 0 | 0 | 0 | 255 | 31 | 0 | 0 | 0 |
| 13121 to 13136 | 0 | 0 | 224 | 255 | 31 | 0 | 0 | 0 | 0 | 0 | 248 | 255 | 63 | 0 | 0 | 0 |
| 13137 to 13152 | 0 | 0 | 255 | 255 | 127 | 0 | 0 | 0 | 0 | 224 | 255 | 255 | 255 | 0 | 0 | 0 |
| 13153 to 13168 | 0 | 252 | 255 | 255 | 255 | 0 | 0 | 0 | 128 | 255 | 255 | 255 | 255 | 1 | 0 | 0 |
| 13169 to 13184 | 224 | 255 | 255 | 255 | 255 | 3 | 0 | 0 | 252 | 255 | 255 | 255 | 255 | 3 | 0 | 0 |
| 13185 to 13200 | 255 | 255 | 255 | 255 | 255 | 7 | 0 | 0 | 255 | 255 | 255 | 255 | 255 | 15 | 0 | 0 |
| 13201 to 13216 | 255 | 255 | 255 | 255 | 255 | 31 | 0 | 0 | 255 | 255 | 255 | 255 | 255 | 31 | 0 | 0 |
| 13217 to 13232 | 255 | 255 | 255 | 255 | 255 | 63 | 0 | 0 | 255 | 255 | 255 | 255 | 255 | 127 | 0 | 0 |
| 13233 to 13248 | 255 | 255 | 255 | 255 | 255 | 127 | 0 | 0 | 255 | 255 | 255 | 255 | 255 | 255 | 0 | 0 |
| 13249 to 13264 | 255 | 255 | 255 | 255 | 255 | 255 | 1 | 0 | 255 | 255 | 255 | 255 | 255 | 255 | 3 | 0 |
| 13265 to 13280 | 255 | 255 | 255 | 255 | 255 | 255 | 3 | 0 | 255 | 255 | 255 | 255 | 255 | 255 | 7 | 0 |
| 13281 to 13296 | 255 | 255 | 255 | 255 | 255 | 255 | 15 | 0 | 255 | 255 | 255 | 255 | 255 | 255 | 15 | 0 |
| 13297 to 13312 | 255 | 255 | 255 | 255 | 255 | 255 | 31 | 0 | 255 | 255 | 255 | 255 | 255 | 255 | 63 | 0 |
| 13313 to 13328 | 0 | 0 | 0 | 0 | 0 | 0 | 0 | 0 | 0 | 0 | 0 | 0 | 0 | 0 | 0 | 0 |
| 13329 to 13344 | 0 | 0 | 0 | 0 | 0 | 0 | 0 | 0 | 0 | 0 | 0 | 0 | 0 | 0 | 0 | 0 |
| 13345 to 13360 | 0 | 0 | 0 | 0 | 0 | 0 | 0 | 0 | 0 | 0 | 0 | 0 | 0 | 0 | 0 | 0 |
| 13361 to 13376 | 0 | 0 | 0 | 0 | 0 | 0 | 0 | 0 | 0 | 0 | 0 | 0 | 0 | 0 | 0 | 0 |
| 13377 to 13392 | 0 | 0 | 0 | 0 | 0 | 0 | 0 | 0 | 0 | 0 | 0 | 0 | 0 | 0 | 0 | 0 |
| 13393 to 13408 | 0 | 0 | 0 | 0 | 0 | 0 | 0 | 0 | 0 | 0 | 0 | 0 | 0 | 0 | 0 | 0 |
| 13409 to 13424 | 0 | 0 | 0 | 0 | 0 | 0 | 0 | 0 | 0 | 0 | 0 | 0 | 0 | 0 | 0 | 0 |
| 13425 to 13440 | 0 | 0 | 0 | 0 | 0 | 0 | 0 | 0 | 0 | 0 | 0 | 0 | 0 | 0 | 0 | 0 |
| 13441 to 13456 | 0 | 0 | 0 | 0 | 0 | 0 | 0 | 0 | 0 | 0 | 0 | 0 | 0 | 0 | 0 | 0 |
| 13457 to 13472 | 0 | 0 | 0 | 0 | 0 | 0 | 0 | 0 | 0 | 0 | 0 | 0 | 0 | 0 | 0 | 0 |
| 13473 to 13488 | 0 | 0 | 0 | 0 | 0 | 0 | 0 | 0 | 0 | 0 | 0 | 0 | 0 | 0 | 0 | 0 |
| 13489 to 13504 | 0 | 0 | 0 | 0 | 0 | 0 | 0 | 0 | 0 | 0 | 0 | 0 | 0 | 0 | 0 | 0 |
| 13505 to 13520 | 0 | 0 | 0 | 0 | 0 | 0 | 0 | 0 | 0 | 0 | 0 | 0 | 0 | 0 | 0 | 0 |
| 13521 to 13536 | 0 | 0 | 0 | 0 | 0 | 0 | 0 | 0 | 0 | 0 | 0 | 0 | 0 | 0 | 0 | 0 |
| 13537 to 13552 | 0 | 0 | 0 | 0 | 0 | 0 | 0 | 0 | 0 | 0 | 0 | 0 | 0 | 0 | 0 | 0 |

TABLE 1-continued

| Address | Content | | | | | | | | | | | | | | | |
|---|---|---|---|---|---|---|---|---|---|---|---|---|---|---|---|---|
| 13553 to 13568 | 0 | 0 | 0 | 0 | 0 | 0 | 0 | 0 | 0 | 0 | 0 | 0 | 0 | 0 | 0 | 0 |
| 13569 to 13584 | 0 | 0 | 0 | 0 | 0 | 0 | 0 | 0 | 0 | 0 | 0 | 0 | 0 | 0 | 0 | 0 |
| 13585 to 13600 | 0 | 0 | 0 | 0 | 0 | 0 | 0 | 0 | 0 | 0 | 0 | 0 | 0 | 0 | 0 | 0 |
| 13601 to 13616 | 0 | 0 | 0 | 0 | 4 | 0 | 0 | 0 | 0 | 0 | 0 | 0 | 15 | 0 | 0 | 0 |
| 13617 to 13632 | 0 | 0 | 0 | 224 | 15 | 0 | 0 | 0 | 0 | 0 | 0 | 252 | 31 | 0 | 0 | 0 |
| 13633 to 13648 | 0 | 0 | 128 | 255 | 63 | 0 | 0 | 0 | 0 | 0 | 240 | 255 | 63 | 0 | 0 | 0 |
| 13649 to 13664 | 0 | 0 | 252 | 255 | 127 | 0 | 0 | 0 | 0 | 128 | 255 | 255 | 255 | 0 | 0 | 0 |
| 13665 to 13680 | 0 | 240 | 255 | 255 | 255 | 1 | 0 | 0 | 0 | 254 | 255 | 255 | 255 | 1 | 0 | 0 |
| 13681 to 13696 | 192 | 255 | 255 | 255 | 255 | 3 | 0 | 0 | 240 | 255 | 255 | 255 | 255 | 7 | 0 | 0 |
| 13697 to 13712 | 254 | 255 | 255 | 255 | 255 | 7 | 0 | 0 | 255 | 255 | 255 | 255 | 255 | 15 | 0 | 0 |
| 13713 to 13728 | 255 | 255 | 255 | 255 | 255 | 31 | 0 | 0 | 255 | 255 | 255 | 255 | 255 | 63 | 0 | 0 |
| 13729 to 13744 | 255 | 255 | 255 | 255 | 255 | 63 | 0 | 0 | 255 | 255 | 255 | 255 | 255 | 127 | 0 | 0 |
| 13745 to 13760 | 255 | 255 | 255 | 255 | 255 | 255 | 0 | 0 | 255 | 255 | 255 | 255 | 255 | 255 | 1 | 0 |
| 13761 to 13776 | 255 | 255 | 255 | 255 | 255 | 255 | 1 | 0 | 255 | 255 | 255 | 255 | 255 | 255 | 3 | 0 |
| 13777 to 13792 | 255 | 255 | 255 | 255 | 255 | 255 | 7 | 0 | 255 | 255 | 255 | 255 | 255 | 255 | 7 | 0 |
| 13793 to 13808 | 255 | 255 | 255 | 255 | 255 | 255 | 15 | 0 | 255 | 255 | 255 | 255 | 255 | 255 | 31 | 0 |
| 13809 to 13824 | 255 | 255 | 255 | 255 | 255 | 255 | 63 | 0 | 255 | 255 | 255 | 255 | 255 | 255 | 63 | 0 |
| 13825 to 13840 | 0 | 0 | 0 | 0 | 0 | 0 | 0 | 0 | 0 | 0 | 0 | 0 | 0 | 0 | 0 | 0 |
| 13841 to 13856 | 0 | 0 | 0 | 0 | 0 | 0 | 0 | 0 | 0 | 0 | 0 | 0 | 0 | 0 | 0 | 0 |
| 13857 to 13872 | 0 | 0 | 0 | 0 | 0 | 0 | 0 | 0 | 0 | 0 | 0 | 0 | 0 | 0 | 0 | 0 |
| 13873 to 13888 | 0 | 0 | 0 | 0 | 0 | 0 | 0 | 0 | 0 | 0 | 0 | 0 | 0 | 0 | 0 | 0 |
| 13889 to 13904 | 0 | 0 | 0 | 0 | 0 | 0 | 0 | 0 | 0 | 0 | 0 | 0 | 0 | 0 | 0 | 0 |
| 13905 to 13920 | 0 | 0 | 0 | 0 | 0 | 0 | 0 | 0 | 0 | 0 | 0 | 0 | 0 | 0 | 0 | 0 |
| 13921 to 13936 | 0 | 0 | 0 | 0 | 0 | 0 | 0 | 0 | 0 | 0 | 0 | 0 | 0 | 0 | 0 | 0 |
| 13937 to 13952 | 0 | 0 | 0 | 0 | 0 | 0 | 0 | 0 | 0 | 0 | 0 | 0 | 0 | 0 | 0 | 0 |
| 13953 to 13968 | 0 | 0 | 0 | 0 | 0 | 0 | 0 | 0 | 0 | 0 | 0 | 0 | 0 | 0 | 0 | 0 |
| 13969 to 13984 | 0 | 0 | 0 | 0 | 0 | 0 | 0 | 0 | 0 | 0 | 0 | 0 | 0 | 0 | 0 | 0 |
| 13985 to 14000 | 0 | 0 | 0 | 0 | 0 | 0 | 0 | 0 | 0 | 0 | 0 | 0 | 0 | 0 | 0 | 0 |
| 14001 to 14016 | 0 | 0 | 0 | 0 | 0 | 0 | 0 | 0 | 0 | 0 | 0 | 0 | 0 | 0 | 0 | 0 |
| 14017 to 14032 | 0 | 0 | 0 | 0 | 0 | 0 | 0 | 0 | 0 | 0 | 0 | 0 | 0 | 0 | 0 | 0 |
| 14033 to 14048 | 0 | 0 | 0 | 0 | 0 | 0 | 0 | 0 | 0 | 0 | 0 | 0 | 0 | 0 | 0 | 0 |
| 14049 to 14064 | 0 | 0 | 0 | 0 | 0 | 0 | 0 | 0 | 0 | 0 | 0 | 0 | 0 | 0 | 0 | 0 |
| 14065 to 14080 | 0 | 0 | 0 | 0 | 0 | 0 | 0 | 0 | 0 | 0 | 0 | 0 | 0 | 0 | 0 | 0 |
| 14081 to 14096 | 0 | 0 | 0 | 0 | 0 | 0 | 0 | 0 | 0 | 0 | 0 | 0 | 0 | 0 | 0 | 0 |
| 14097 to 14112 | 0 | 0 | 0 | 0 | 0 | 0 | 0 | 0 | 0 | 0 | 0 | 0 | 0 | 0 | 0 | 0 |
| 14113 to 14128 | 0 | 0 | 0 | 0 | 0 | 0 | 0 | 0 | 0 | 0 | 0 | 0 | 14 | 0 | 0 | 0 |
| 14129 to 14144 | 0 | 0 | 0 | 128 | 31 | 0 | 0 | 0 | 0 | 0 | 0 | 240 | 31 | 0 | 0 | 0 |
| 14145 to 14160 | 0 | 0 | 0 | 254 | 63 | 0 | 0 | 0 | 0 | 0 | 192 | 255 | 127 | 0 | 0 | 0 |
| 14161 to 14176 | 0 | 0 | 248 | 255 | 255 | 0 | 0 | 0 | 0 | 0 | 254 | 255 | 255 | 0 | 0 | 0 |
| 14177 to 14192 | 0 | 192 | 255 | 255 | 255 | 1 | 0 | 0 | 0 | 248 | 255 | 255 | 255 | 3 | 0 | 0 |
| 14193 to 14208 | 0 | 255 | 255 | 255 | 255 | 3 | 0 | 0 | 224 | 255 | 255 | 255 | 255 | 7 | 0 | 0 |
| 14209 to 14224 | 252 | 255 | 255 | 255 | 255 | 15 | 0 | 0 | 255 | 255 | 255 | 255 | 255 | 31 | 0 | 0 |
| 14225 to 14240 | 255 | 255 | 255 | 255 | 255 | 31 | 0 | 0 | 255 | 255 | 255 | 255 | 255 | 63 | 0 | 0 |
| 14241 to 14256 | 255 | 255 | 255 | 255 | 255 | 127 | 0 | 0 | 255 | 255 | 255 | 255 | 255 | 127 | 0 | 0 |
| 14257 to 14272 | 255 | 255 | 255 | 255 | 255 | 255 | 0 | 0 | 255 | 255 | 255 | 255 | 255 | 255 | 1 | 0 |
| 14273 to 14288 | 255 | 255 | 255 | 255 | 255 | 255 | 3 | 0 | 255 | 255 | 255 | 255 | 255 | 255 | 3 | 0 |
| 14289 to 14304 | 255 | 255 | 255 | 255 | 255 | 255 | 7 | 0 | 255 | 255 | 255 | 255 | 255 | 255 | 15 | 0 |
| 14305 to 14320 | 255 | 255 | 255 | 255 | 255 | 255 | 15 | 0 | 255 | 255 | 255 | 255 | 255 | 255 | 31 | 0 |
| 14321 to 14336 | 255 | 255 | 255 | 255 | 255 | 255 | 63 | 0 | 255 | 255 | 255 | 255 | 255 | 255 | 127 | 0 |
| 14337 to 14352 | 0 | 0 | 0 | 0 | 0 | 0 | 0 | 0 | 0 | 0 | 0 | 0 | 0 | 0 | 0 | 0 |
| 14353 to 14368 | 0 | 0 | 0 | 0 | 0 | 0 | 0 | 0 | 0 | 0 | 0 | 0 | 0 | 0 | 0 | 0 |
| 14369 to 14384 | 0 | 0 | 0 | 0 | 0 | 0 | 0 | 0 | 0 | 0 | 0 | 0 | 0 | 0 | 0 | 0 |
| 14385 to 14400 | 0 | 0 | 0 | 0 | 0 | 0 | 0 | 0 | 0 | 0 | 0 | 0 | 0 | 0 | 0 | 0 |
| 14401 to 14416 | 0 | 0 | 0 | 0 | 0 | 0 | 0 | 0 | 0 | 0 | 0 | 0 | 0 | 0 | 0 | 0 |
| 14417 to 14432 | 0 | 0 | 0 | 0 | 0 | 0 | 0 | 0 | 0 | 0 | 0 | 0 | 0 | 0 | 0 | 0 |
| 14433 to 14448 | 0 | 0 | 0 | 0 | 0 | 0 | 0 | 0 | 0 | 0 | 0 | 0 | 0 | 0 | 0 | 0 |
| 14449 to 14464 | 0 | 0 | 0 | 0 | 0 | 0 | 0 | 0 | 0 | 0 | 0 | 0 | 0 | 0 | 0 | 0 |
| 14465 to 14480 | 0 | 0 | 0 | 0 | 0 | 0 | 0 | 0 | 0 | 0 | 0 | 0 | 0 | 0 | 0 | 0 |
| 14481 to 14496 | 0 | 0 | 0 | 0 | 0 | 0 | 0 | 0 | 0 | 0 | 0 | 0 | 0 | 0 | 0 | 0 |
| 14497 to 14512 | 0 | 0 | 0 | 0 | 0 | 0 | 0 | 0 | 0 | 0 | 0 | 0 | 0 | 0 | 0 | 0 |
| 14513 to 14528 | 0 | 0 | 0 | 0 | 0 | 0 | 0 | 0 | 0 | 0 | 0 | 0 | 0 | 0 | 0 | 0 |
| 14529 to 14544 | 0 | 0 | 0 | 0 | 0 | 0 | 0 | 0 | 0 | 0 | 0 | 0 | 0 | 0 | 0 | 0 |
| 14545 to 14560 | 0 | 0 | 0 | 0 | 0 | 0 | 0 | 0 | 0 | 0 | 0 | 0 | 0 | 0 | 0 | 0 |
| 14561 to 14576 | 0 | 0 | 0 | 0 | 0 | 0 | 0 | 0 | 0 | 0 | 0 | 0 | 0 | 0 | 0 | 0 |
| 14577 to 14592 | 0 | 0 | 0 | 0 | 0 | 0 | 0 | 0 | 0 | 0 | 0 | 0 | 0 | 0 | 0 | 0 |
| 14593 to 14608 | 0 | 0 | 0 | 0 | 0 | 0 | 0 | 0 | 0 | 0 | 0 | 0 | 0 | 0 | 0 | 0 |
| 14609 to 14624 | 0 | 0 | 0 | 0 | 0 | 0 | 0 | 0 | 0 | 0 | 0 | 0 | 0 | 0 | 0 | 0 |
| 14625 to 14640 | 0 | 0 | 0 | 0 | 0 | 0 | 0 | 0 | 0 | 0 | 0 | 0 | 8 | 0 | 0 | 0 |
| 14641 to 14656 | 0 | 0 | 0 | 0 | 31 | 0 | 0 | 0 | 0 | 0 | 0 | 192 | 63 | 0 | 0 | 0 |
| 14657 to 14672 | 0 | 0 | 0 | 248 | 63 | 0 | 0 | 0 | 0 | 0 | 0 | 255 | 127 | 0 | 0 | 0 |
| 14673 to 14688 | 0 | 0 | 224 | 255 | 255 | 0 | 0 | 0 | 0 | 0 | 252 | 255 | 255 | 1 | 0 | 0 |
| 14689 to 14704 | 0 | 0 | 255 | 255 | 255 | 1 | 0 | 0 | 0 | 224 | 255 | 255 | 255 | 3 | 0 | 0 |
| 14705 to 14720 | 0 | 252 | 255 | 255 | 255 | 7 | 0 | 0 | 128 | 255 | 255 | 255 | 255 | 7 | 0 | 0 |
| 14721 to 14736 | 240 | 255 | 255 | 255 | 255 | 15 | 0 | 0 | 254 | 255 | 255 | 255 | 255 | 31 | 0 | 0 |
| 14737 to 14752 | 255 | 255 | 255 | 255 | 255 | 63 | 0 | 0 | 255 | 255 | 255 | 255 | 255 | 63 | 0 | 0 |
| 14753 to 14768 | 255 | 255 | 255 | 255 | 255 | 127 | 0 | 0 | 255 | 255 | 255 | 255 | 255 | 255 | 0 | 0 |
| 14769 to 14784 | 255 | 255 | 255 | 255 | 255 | 255 | 0 | 0 | 255 | 255 | 255 | 255 | 255 | 255 | 1 | 0 |

TABLE 1-continued

| Address | Content | | | | | | | | | | | | | | | |
|---|---|---|---|---|---|---|---|---|---|---|---|---|---|---|---|---|
| 14785 to 14800 | 255 | 255 | 255 | 255 | 255 | 255 | 3 | 0 | 255 | 255 | 255 | 255 | 255 | 255 | 7 | 0 |
| 14801 to 14816 | 255 | 255 | 255 | 255 | 255 | 255 | 7 | 0 | 255 | 255 | 255 | 255 | 255 | 255 | 15 | 0 |
| 14817 to 14832 | 255 | 255 | 255 | 255 | 255 | 255 | 31 | 0 | 255 | 255 | 255 | 255 | 255 | 255 | 31 | 0 |
| 14833 to 14848 | 255 | 255 | 255 | 255 | 255 | 255 | 63 | 0 | 255 | 255 | 255 | 255 | 255 | 255 | 127 | 0 |
| 14849 to 14864 | 0 | 0 | 0 | 0 | 0 | 0 | 0 | 0 | 0 | 0 | 0 | 0 | 0 | 0 | 0 | 0 |
| 14865 to 14880 | 0 | 0 | 0 | 0 | 0 | 0 | 0 | 0 | 0 | 0 | 0 | 0 | 0 | 0 | 0 | 0 |
| 14881 to 14896 | 0 | 0 | 0 | 0 | 0 | 0 | 0 | 0 | 0 | 0 | 0 | 0 | 0 | 0 | 0 | 0 |
| 14897 to 14912 | 0 | 0 | 0 | 0 | 0 | 0 | 0 | 0 | 0 | 0 | 0 | 0 | 0 | 0 | 0 | 0 |
| 14913 to 14928 | 0 | 0 | 0 | 0 | 0 | 0 | 0 | 0 | 0 | 0 | 0 | 0 | 0 | 0 | 0 | 0 |
| 14929 to 14944 | 0 | 0 | 0 | 0 | 0 | 0 | 0 | 0 | 0 | 0 | 0 | 0 | 0 | 0 | 0 | 0 |
| 14945 to 14960 | 0 | 0 | 0 | 0 | 0 | 0 | 0 | 0 | 0 | 0 | 0 | 0 | 0 | 0 | 0 | 0 |
| 14961 to 14976 | 0 | 0 | 0 | 0 | 0 | 0 | 0 | 0 | 0 | 0 | 0 | 0 | 0 | 0 | 0 | 0 |
| 14977 to 14992 | 0 | 0 | 0 | 0 | 0 | 0 | 0 | 0 | 0 | 0 | 0 | 0 | 0 | 0 | 0 | 0 |
| 14993 to 15008 | 0 | 0 | 0 | 0 | 0 | 0 | 0 | 0 | 0 | 0 | 0 | 0 | 0 | 0 | 0 | 0 |
| 15009 to 15024 | 0 | 0 | 0 | 0 | 0 | 0 | 0 | 0 | 0 | 0 | 0 | 0 | 0 | 0 | 0 | 0 |
| 15025 to 15040 | 0 | 0 | 0 | 0 | 0 | 0 | 0 | 0 | 0 | 0 | 0 | 0 | 0 | 0 | 0 | 0 |
| 15041 to 15056 | 0 | 0 | 0 | 0 | 0 | 0 | 0 | 0 | 0 | 0 | 0 | 0 | 0 | 0 | 0 | 0 |
| 15057 to 15072 | 0 | 0 | 0 | 0 | 0 | 0 | 0 | 0 | 0 | 0 | 0 | 0 | 0 | 0 | 0 | 0 |
| 15073 to 15088 | 0 | 0 | 0 | 0 | 0 | 0 | 0 | 0 | 0 | 0 | 0 | 0 | 0 | 0 | 0 | 0 |
| 15089 to 15104 | 0 | 0 | 0 | 0 | 0 | 0 | 0 | 0 | 0 | 0 | 0 | 0 | 0 | 0 | 0 | 0 |
| 15105 to 15120 | 0 | 0 | 0 | 0 | 0 | 0 | 0 | 0 | 0 | 0 | 0 | 0 | 0 | 0 | 0 | 0 |
| 15121 to 15136 | 0 | 0 | 0 | 0 | 0 | 0 | 0 | 0 | 0 | 0 | 0 | 0 | 0 | 0 | 0 | 0 |
| 15137 to 15152 | 0 | 0 | 0 | 0 | 0 | 0 | 0 | 0 | 0 | 0 | 0 | 0 | 0 | 0 | 0 | 0 |
| 15153 to 15168 | 0 | 0 | 0 | 0 | 28 | 0 | 0 | 0 | 0 | 0 | 0 | 128 | 63 | 0 | 0 | 0 |
| 15169 to 15184 | 0 | 0 | 0 | 224 | 127 | 0 | 0 | 0 | 0 | 0 | 0 | 252 | 255 | 0 | 0 | 0 |
| 15185 to 15200 | 0 | 0 | 128 | 255 | 255 | 0 | 0 | 0 | 0 | 0 | 240 | 255 | 255 | 1 | 0 | 0 |
| 15201 to 15216 | 0 | 0 | 254 | 255 | 255 | 3 | 0 | 0 | 0 | 192 | 255 | 255 | 255 | 3 | 0 | 0 |
| 15217 to 15232 | 0 | 240 | 255 | 255 | 255 | 7 | 0 | 0 | 0 | 254 | 255 | 255 | 255 | 15 | 0 | 0 |
| 15233 to 15248 | 192 | 255 | 255 | 255 | 255 | 31 | 0 | 0 | 248 | 255 | 255 | 255 | 255 | 31 | 0 | 0 |
| 15249 to 15264 | 255 | 255 | 255 | 255 | 255 | 63 | 0 | 0 | 255 | 255 | 255 | 255 | 255 | 127 | 0 | 0 |
| 15265 to 15280 | 255 | 255 | 255 | 255 | 255 | 127 | 0 | 0 | 255 | 255 | 255 | 255 | 255 | 255 | 0 | 0 |
| 15281 to 15296 | 255 | 255 | 255 | 255 | 255 | 255 | 1 | 0 | 255 | 255 | 255 | 255 | 255 | 255 | 3 | 0 |
| 15297 to 15312 | 255 | 255 | 255 | 255 | 255 | 255 | 3 | 0 | 255 | 255 | 255 | 255 | 255 | 255 | 7 | 0 |
| 15313 to 15328 | 255 | 255 | 255 | 255 | 255 | 255 | 15 | 0 | 255 | 255 | 255 | 255 | 255 | 255 | 15 | 0 |
| 15329 to 15344 | 255 | 255 | 255 | 255 | 255 | 255 | 31 | 0 | 255 | 255 | 255 | 255 | 255 | 255 | 63 | 0 |
| 15345 to 15360 | 255 | 255 | 255 | 255 | 255 | 255 | 127 | 0 | 255 | 255 | 255 | 255 | 255 | 255 | 127 | 0 |
| 15361 to 15376 | 0 | 0 | 0 | 0 | 0 | 0 | 0 | 0 | 0 | 0 | 0 | 0 | 0 | 0 | 0 | 0 |
| 15377 to 15392 | 0 | 0 | 0 | 0 | 0 | 0 | 0 | 0 | 0 | 0 | 0 | 0 | 0 | 0 | 0 | 0 |
| 15393 to 15408 | 0 | 0 | 0 | 0 | 0 | 0 | 0 | 0 | 0 | 0 | 0 | 0 | 0 | 0 | 0 | 0 |
| 15409 to 15424 | 0 | 0 | 0 | 0 | 0 | 0 | 0 | 0 | 0 | 0 | 0 | 0 | 0 | 0 | 0 | 0 |
| 15425 to 15440 | 0 | 0 | 0 | 0 | 0 | 0 | 0 | 0 | 0 | 0 | 0 | 0 | 0 | 0 | 0 | 0 |
| 15441 to 15456 | 0 | 0 | 0 | 0 | 0 | 0 | 0 | 0 | 0 | 0 | 0 | 0 | 0 | 0 | 0 | 0 |
| 15457 to 15472 | 0 | 0 | 0 | 0 | 0 | 0 | 0 | 0 | 0 | 0 | 0 | 0 | 0 | 0 | 0 | 0 |
| 15473 to 15488 | 0 | 0 | 0 | 0 | 0 | 0 | 0 | 0 | 0 | 0 | 0 | 0 | 0 | 0 | 0 | 0 |
| 15489 to 15504 | 0 | 0 | 0 | 0 | 0 | 0 | 0 | 0 | 0 | 0 | 0 | 0 | 0 | 0 | 0 | 0 |
| 15505 to 15520 | 0 | 0 | 0 | 0 | 0 | 0 | 0 | 0 | 0 | 0 | 0 | 0 | 0 | 0 | 0 | 0 |
| 15521 to 15536 | 0 | 0 | 0 | 0 | 0 | 0 | 0 | 0 | 0 | 0 | 0 | 0 | 0 | 0 | 0 | 0 |
| 15537 to 15552 | 0 | 0 | 0 | 0 | 0 | 0 | 0 | 0 | 0 | 0 | 0 | 0 | 0 | 0 | 0 | 0 |
| 15553 to 15568 | 0 | 0 | 0 | 0 | 0 | 0 | 0 | 0 | 0 | 0 | 0 | 0 | 0 | 0 | 0 | 0 |
| 15569 to 15584 | 0 | 0 | 0 | 0 | 0 | 0 | 0 | 0 | 0 | 0 | 0 | 0 | 0 | 0 | 0 | 0 |
| 15585 to 15600 | 0 | 0 | 0 | 0 | 0 | 0 | 0 | 0 | 0 | 0 | 0 | 0 | 0 | 0 | 0 | 0 |
| 15601 to 15616 | 0 | 0 | 0 | 0 | 0 | 0 | 0 | 0 | 0 | 0 | 0 | 0 | 0 | 0 | 0 | 0 |
| 15617 to 15632 | 0 | 0 | 0 | 0 | 0 | 0 | 0 | 0 | 0 | 0 | 0 | 0 | 0 | 0 | 0 | 0 |
| 15633 to 15648 | 0 | 0 | 0 | 0 | 0 | 0 | 0 | 0 | 0 | 0 | 0 | 0 | 0 | 0 | 0 | 0 |
| 15649 to 15664 | 0 | 0 | 0 | 0 | 0 | 0 | 0 | 0 | 0 | 0 | 0 | 0 | 0 | 0 | 0 | 0 |
| 15665 to 15680 | 0 | 0 | 0 | 0 | 48 | 0 | 0 | 0 | 0 | 0 | 0 | 0 | 62 | 0 | 0 | 0 |
| 15681 to 15696 | 0 | 0 | 0 | 192 | 127 | 0 | 0 | 0 | 0 | 0 | 0 | 240 | 255 | 0 | 0 | 0 |
| 15697 to 15712 | 0 | 0 | 0 | 254 | 255 | 1 | 0 | 0 | 0 | 0 | 192 | 255 | 255 | 1 | 0 | 0 |
| 15713 to 15728 | 0 | 0 | 248 | 255 | 255 | 3 | 0 | 0 | 0 | 0 | 255 | 255 | 255 | 7 | 0 | 0 |
| 15729 to 15744 | 0 | 224 | 255 | 255 | 255 | 7 | 0 | 0 | 0 | 248 | 255 | 255 | 255 | 15 | 0 | 0 |
| 15745 to 15760 | 0 | 255 | 255 | 255 | 255 | 31 | 0 | 0 | 224 | 255 | 255 | 255 | 255 | 63 | 0 | 0 |
| 15761 to 15776 | 252 | 255 | 255 | 255 | 255 | 63 | 0 | 0 | 255 | 255 | 255 | 255 | 255 | 127 | 0 | 0 |
| 15777 to 15792 | 255 | 255 | 255 | 255 | 255 | 255 | 0 | 0 | 255 | 255 | 255 | 255 | 255 | 255 | 0 | 0 |
| 15793 to 15808 | 255 | 255 | 255 | 255 | 255 | 255 | 1 | 0 | 255 | 255 | 255 | 255 | 255 | 255 | 3 | 0 |
| 15809 to 15824 | 255 | 255 | 255 | 255 | 255 | 255 | 7 | 0 | 255 | 255 | 255 | 255 | 255 | 255 | 7 | 0 |
| 15825 to 15840 | 255 | 255 | 255 | 255 | 255 | 255 | 15 | 0 | 255 | 255 | 255 | 255 | 255 | 255 | 31 | 0 |
| 15841 to 15856 | 255 | 255 | 255 | 255 | 255 | 255 | 31 | 0 | 255 | 255 | 255 | 255 | 255 | 255 | 63 | 0 |
| 15857 to 15872 | 255 | 255 | 255 | 255 | 255 | 255 | 127 | 0 | 255 | 255 | 255 | 255 | 255 | 255 | 255 | 0 |
| 15873 to 15888 | 0 | 0 | 0 | 0 | 0 | 0 | 0 | 0 | 0 | 0 | 0 | 0 | 0 | 0 | 0 | 0 |
| 15889 to 15904 | 0 | 0 | 0 | 0 | 0 | 0 | 0 | 0 | 0 | 0 | 0 | 0 | 0 | 0 | 0 | 0 |
| 15905 to 15920 | 0 | 0 | 0 | 0 | 0 | 0 | 0 | 0 | 0 | 0 | 0 | 0 | 0 | 0 | 0 | 0 |
| 15921 to 15936 | 0 | 0 | 0 | 0 | 0 | 0 | 0 | 0 | 0 | 0 | 0 | 0 | 0 | 0 | 0 | 0 |
| 15937 to 15952 | 0 | 0 | 0 | 0 | 0 | 0 | 0 | 0 | 0 | 0 | 0 | 0 | 0 | 0 | 0 | 0 |
| 15953 to 15968 | 0 | 0 | 0 | 0 | 0 | 0 | 0 | 0 | 0 | 0 | 0 | 0 | 0 | 0 | 0 | 0 |
| 15969 to 15984 | 0 | 0 | 0 | 0 | 0 | 0 | 0 | 0 | 0 | 0 | 0 | 0 | 0 | 0 | 0 | 0 |
| 15985 to 16000 | 0 | 0 | 0 | 0 | 0 | 0 | 0 | 0 | 0 | 0 | 0 | 0 | 0 | 0 | 0 | 0 |
| 16001 to 16016 | 0 | 0 | 0 | 0 | 0 | 0 | 0 | 0 | 0 | 0 | 0 | 0 | 0 | 0 | 0 | 0 |

TABLE 1-continued

| Address | Content | | | | | | | | | | | | | | | |
|---|---|---|---|---|---|---|---|---|---|---|---|---|---|---|---|---|
| 16017 to 16032 | 0 | 0 | 0 | 0 | 0 | 0 | 0 | 0 | 0 | 0 | 0 | 0 | 0 | 0 | 0 | 0 |
| 16033 to 16048 | 0 | 0 | 0 | 0 | 0 | 0 | 0 | 0 | 0 | 0 | 0 | 0 | 0 | 0 | 0 | 0 |
| 16049 to 16064 | 0 | 0 | 0 | 0 | 0 | 0 | 0 | 0 | 0 | 0 | 0 | 0 | 0 | 0 | 0 | 0 |
| 16065 to 16080 | 0 | 0 | 0 | 0 | 0 | 0 | 0 | 0 | 0 | 0 | 0 | 0 | 0 | 0 | 0 | 0 |
| 16081 to 16096 | 0 | 0 | 0 | 0 | 0 | 0 | 0 | 0 | 0 | 0 | 0 | 0 | 0 | 0 | 0 | 0 |
| 16097 to 16112 | 0 | 0 | 0 | 0 | 0 | 0 | 0 | 0 | 0 | 0 | 0 | 0 | 0 | 0 | 0 | 0 |
| 16113 to 16128 | 0 | 0 | 0 | 0 | 0 | 0 | 0 | 0 | 0 | 0 | 0 | 0 | 0 | 0 | 0 | 0 |
| 16129 to 16144 | 0 | 0 | 0 | 0 | 0 | 0 | 0 | 0 | 0 | 0 | 0 | 0 | 0 | 0 | 0 | 0 |
| 16145 to 16160 | 0 | 0 | 0 | 0 | 0 | 0 | 0 | 0 | 0 | 0 | 0 | 0 | 0 | 0 | 0 | 0 |
| 16161 to 16176 | 0 | 0 | 0 | 0 | 0 | 0 | 0 | 0 | 0 | 0 | 0 | 0 | 0 | 0 | 0 | 0 |
| 16177 to 16192 | 0 | 0 | 0 | 0 | 0 | 0 | 0 | 0 | 0 | 0 | 0 | 0 | 0 | 120 | 0 | 0 |
| 16193 to 16208 | 0 | 0 | 0 | 0 | 127 | 0 | 0 | 0 | 0 | 0 | 0 | 224 | 255 | 0 | 0 | 0 |
| 16209 to 16224 | 0 | 0 | 0 | 252 | 255 | 1 | 0 | 0 | 0 | 0 | 0 | 255 | 255 | 3 | 0 | 0 |
| 16225 to 16240 | 0 | 0 | 224 | 255 | 255 | 3 | 0 | 0 | 0 | 0 | 252 | 255 | 255 | 7 | 0 | 0 |
| 16241 to 16256 | 0 | 128 | 255 | 255 | 255 | 15 | 0 | 0 | 0 | 240 | 255 | 255 | 255 | 15 | 0 | 0 |
| 16257 to 16272 | 0 | 252 | 255 | 255 | 255 | 31 | 0 | 0 | 128 | 255 | 255 | 255 | 255 | 63 | 0 | 0 |
| 16273 to 16288 | 240 | 255 | 255 | 255 | 255 | 127 | 0 | 0 | 254 | 255 | 255 | 255 | 255 | 127 | 0 | 0 |
| 16289 to 16304 | 255 | 255 | 255 | 255 | 255 | 255 | 0 | 0 | 255 | 255 | 255 | 255 | 255 | 255 | 1 | 0 |
| 16305 to 16320 | 255 | 255 | 255 | 255 | 255 | 255 | 3 | 0 | 255 | 255 | 255 | 255 | 255 | 255 | 3 | 0 |
| 16321 to 16336 | 255 | 255 | 255 | 255 | 255 | 255 | 7 | 0 | 255 | 255 | 255 | 255 | 255 | 255 | 15 | 0 |
| 16337 to 16352 | 255 | 255 | 255 | 255 | 255 | 255 | 15 | 0 | 255 | 255 | 255 | 255 | 255 | 255 | 31 | 0 |
| 16353 to 16368 | 255 | 255 | 255 | 255 | 255 | 255 | 63 | 0 | 255 | 255 | 255 | 255 | 255 | 255 | 127 | 0 |
| 16369 to 16384 | 255 | 255 | 255 | 255 | 255 | 255 | 127 | 0 | 255 | 255 | 255 | 255 | 255 | 255 | 255 | 0 |

Step 603 begins the process of accessing the information when so arranged. More specifically, in step 603, $$y_{(i,j)}^{(p,q)} = Y_{(i,j)}^{(p,q)} >> 5$$

$$u_{(i,j)}^{(p,q)} = U_{(i,j)}^{(p,q)} >> 2$$

and $$v_{(i,j)}^{(p,q)} = V_{(i,j)}^{(p,q)} >> 2$$

are calculated, wherein, similar to that described hereinabove, p points to the particular horizontal slice of the frame is being processed and q points to the particular column, or vertical slice, of the frame, i points to the particular row within the block that is being processed, j points to the particular column within the block that is being processed, and ">>" is a right shift operation. Doing so leaves only the desired $8^{th}$ to $3^{rd}$ least significant bits of the pixels U value, the $8^{th}$ to $3^{rd}$ least significant bits of the pixels V value, and the $8^{th}$ to $6^{th}$ least significant bits of the pixels Y value. Thereafter, in step 605 the lookup table address for the current pixel is calculated as $$\text{LUT\_Address}_{(i,j)}^{(p,q)} = u_{(i,j)}^{(p,q)} << 9 + v_{(i,j)}^{(p,q)} << 3 y_{(i,j)}^{p,q},$$

where "<<" is a left-shift operation.

Doing so combines the extracted bits into a combined address and points to the one byte that corresponds to the pixel. Thereafter, in step 607, the particular bit within the byte that corresponds to the pixel is determined, by using the value made up of the $2^{nd}$ to $5^{th}$ least significant bits of the Y component as an index into the byte. To this end, step 607 calculates $$b = \text{mod}(Y_{i,j}^{(p,q)} << 2, 8)$$

where mod is the modulo function.

In step 609, the value of the $b^{th}$ bit position of the byte at the calculated lookup table address is extracted, assigned as the value of a variable m, which is supplied as an output. Again, in this exemplary embodiment, if the extracted bit is a 1, U is the selected chrominance portion while if the extracted bit is a 0, V is the selected chrominance portion.

The process then exits in step 611.

Those of ordinary skill in the art will readily recognize how to adapt the foregoing to pixels in other formats, e.g., RGB or YIQ, Note that if Huffman encoding of the table is desired, it may be advantageous that the forgoing correspondence of select U being a 1 and select V being a zero should be reversed, assuming, as has been seen experimentally, that U is selected for a majority of pixel combinations.

Figure 8:
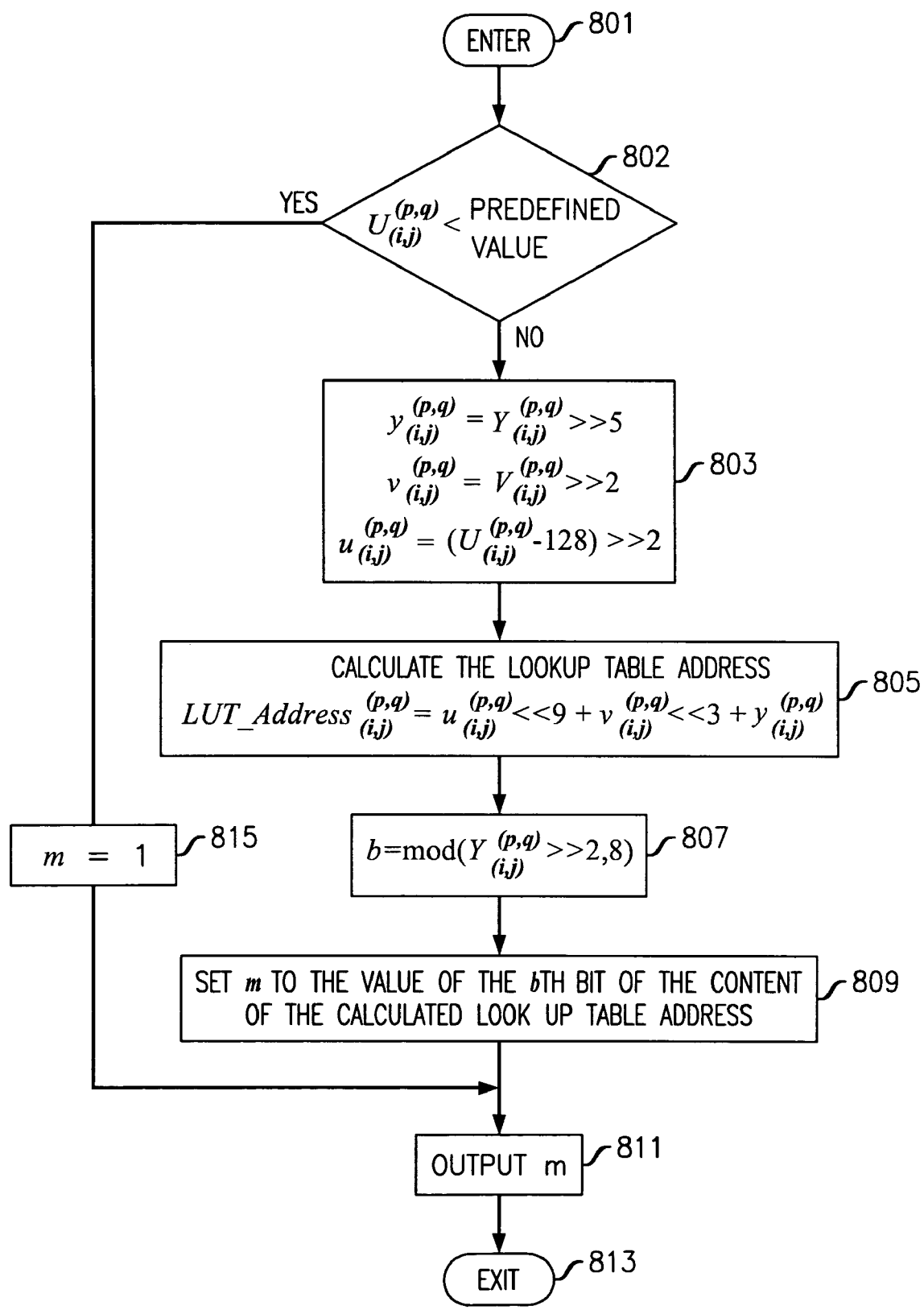
FIG. 8 shows another exemplary process by which the particular chrominance portion is selected to contain the watermarking information for a pixel, in accordance with the principles of the invention.

FIG. 8 shows another exemplary process by which the particular chrominance portion is selected to contain the watermarking information for a pixel, in accordance with the principles of the invention. The process is entered in step 801 when it is necessary to select a chrominance portion suitable to contain watermarking information. As in FIG. 6, for purposes of discussion of FIG. 8, it is assumed that the pixel is represented in YUV format. Furthermore, it is noted that, preferably, for each original 2×2 luminance block of original video, had the original video been in 4-4-4 representation, there should only one Y value for each chrominance component, i.e., each pair of respective corresponding U and V values. To this end, the Y values of the original block may be downsampled so as to have the same resolution as the U and V. Alternatively, the average, or some other combination, of the Y values associated with a particular U and V values may be computed and used as the Y value for the process of FIG. 8.

In order to further reduce the storage requirements in the embodiment of FIG. 8, as compared to the embodiment of FIG. 6, in accordance with an aspect of the invention, not only is the YUV colorspace divided into regions, each region including positions corresponding to at least one set of Y, U, and V values, with each region being assigned a chrominance portion, e.g., based on experimental observations, that is to be selected for any pixel whose Y, U, and V values fall within the region, as described in connection with FIG. 6, but any pixel that has a U value less than a predefined value, e.g., one-half the maximum value, has the U chrominance portion selected for watermarking. Thus, for 8 bit Y, U, and V, values, if the value of U is less than 128, the U chrominance portion is always selected for watermarking regardless of the values of V or Y. This is because human visual system is less sensitive to the blue component U than the V component.

In accordance with an aspect of the invention, by having the most significant address bits of the chrominance portion selection table correspond to the U-value-derived bits of the address, advantageously, the size of the table can be reduced by up to one half. This is achieved by adding a test to determine if the U value is less than one half the maximum value prior to forming the table address, and if the test result is YES, simply indicating to select the U chrominance portion and skipping the rest of the process of accessing the table, and also by subtracting one half the maximum U value from the actual U value prior to calculating the U-value-derived bits of the address. Thus, the section of the table employed for FIG. 6 corresponding to the most significant U bit being 0 is eliminated, and only that portion of the table where the most significant U bit is 1 is retained. However, the indexing into the remaining portion of the table is shifted by the subtraction from the U value of the one half of the maximum U value prior to forming the U-value-derived bits.

Thus, the table is arranged to be addressed using an address that has the most significant bits corresponding to the U values, the next least significant values corresponding to the V values and the least significant values corresponding to the Y values. In other words, the address of the bytes may be formed as follows:

U6|U5|U4|U3|U2|V7|V6|V5|V4|V3|V2|Y7|Y6|Y5 where U6,U5,U4,U3, and U2 are the values of the $7^{th}$ to $3^{rd}$ least significant bits of the pixels U value, V7,V6,V5,V4,V3, and V2 are the values of the $8^{th}$ to $3^{rd}$ least significant bits of the pixels V value, and Y7, Y6, and Y5, are the values of the $8^{th}$ to $6^{th}$ least significant bits of the pixels Y value. Then, the particular bit within the byte is specified by using the $5^{th}$ to $2^{nd}$ least significant bits of the Y component, e.g., Y4, Y3, and Y2.

To this end, conditional branch point 802 tests to determine if $U_{(i,j)}^{(p,q)}<$predefined_value, where predefined_value is, for example, one half the maximum U value. Note that to save a bit, and half the table size, preferably predefined_value should be a power of 2. If the test result in step 802 is NO, indicating that the value of U is less than the predefined value, e.g., one half the maximum value of U, e.g., 128, and hence the chrominance portion to be selected will be a function of Y, U, and V, and so the table must be accessed, control passes to step 803 to begin the process of accessing the table. In step 803, $$y_{(i,j)}^{(p,q)} = Y_{(i,j)}^{(p,q)} >> 5$$

$$u_{(i,j)}^{(p,q)} = (U_{(i,j)}^{(p,q)} - \text{predetrmined value}) >> 2,$$
$$\text{e.g., } u_{(i,j)}^{(p,q)} = (U_{(i,j)}^{(p,q)} - 128) >> 2$$

and $$v_{(i,j)}^{(p,q)} = V_{(i,j)}^{(p,q)} >> 2$$

are calculated, where, similar to that described hereinabove, where p points to the particular horizontal slice of the frame is being processed and q points to the particular column, or vertical slice, of the frame, i points to the particular row within the block that is being processed, j points to the particular column within the block that is being processed, and ">>" is a right-shift operation. Doing so leaves only the desired $7^{th}$ to $3^{rd}$ least significant bits of the pixels U value, the $8^{th}$ to $3^{rd}$ least significant bits of the pixels V value, and the $8^{th}$ to $6^{th}$ least significant bits of the pixels Y value. Thereafter, in step 805 the lookup table address for the current pixel is calculated as $$\text{LUT\_Address}_{(i,j)}^{(p,q)} = u_{(i,j)}^{(p,q)} << 9 + v_{(i,j)}^{(p,q)} << 3 + y_{(i,j)}^{(p,q)},$$

where "<<" is a left-shift operation.

Doing so combines the extracted bits into a combined address and points to the one byte that corresponds to the pixel. Thereafter, in step 807, the particular bit within the byte that corresponds to the pixel is determined, by using the value made up of the $5^{th}$ to $2^{nd}$ least significant bits of the Y component as an index into the byte. To this end, step 807 calculates $$b = \text{mod}(Y_{i,j}^{p,q} << 2, 8)$$

where mod is the modulo function.

In step 809, the value of the $b^{th}$ bit position of the byte at the calculated lookup table address is extracted and stored in the variable m. The value of variable m is supplied as an output in step 811. Again, if the output bit is a 1, U is the selected chrominance portion while if the extracted bit is a 0, V is the selected chrominance portion. The process then exits in step 813.

If the test result in step 802 is YES, indicating that the U chrominance portion should be selected, because the pixel color is not primarily blue and hence changing the blue color of the pixel will not be detected by the human visual system, control passes to step 815, in which the variable m is set equal to 1. Doing so assures that U is selected. Control then passes to step 811, and the process continues as described above.

Notwithstanding the foregoing improvements in color selection, with certain Y, U, and V values for a pixel, there is still, disadvantageously, a possibility that a slightly detectable flickering be manifest. This is because in order to survive MPEG-like encoding there may be a need to add large values to the average value of the selected chrominance portion.

Figure 9:
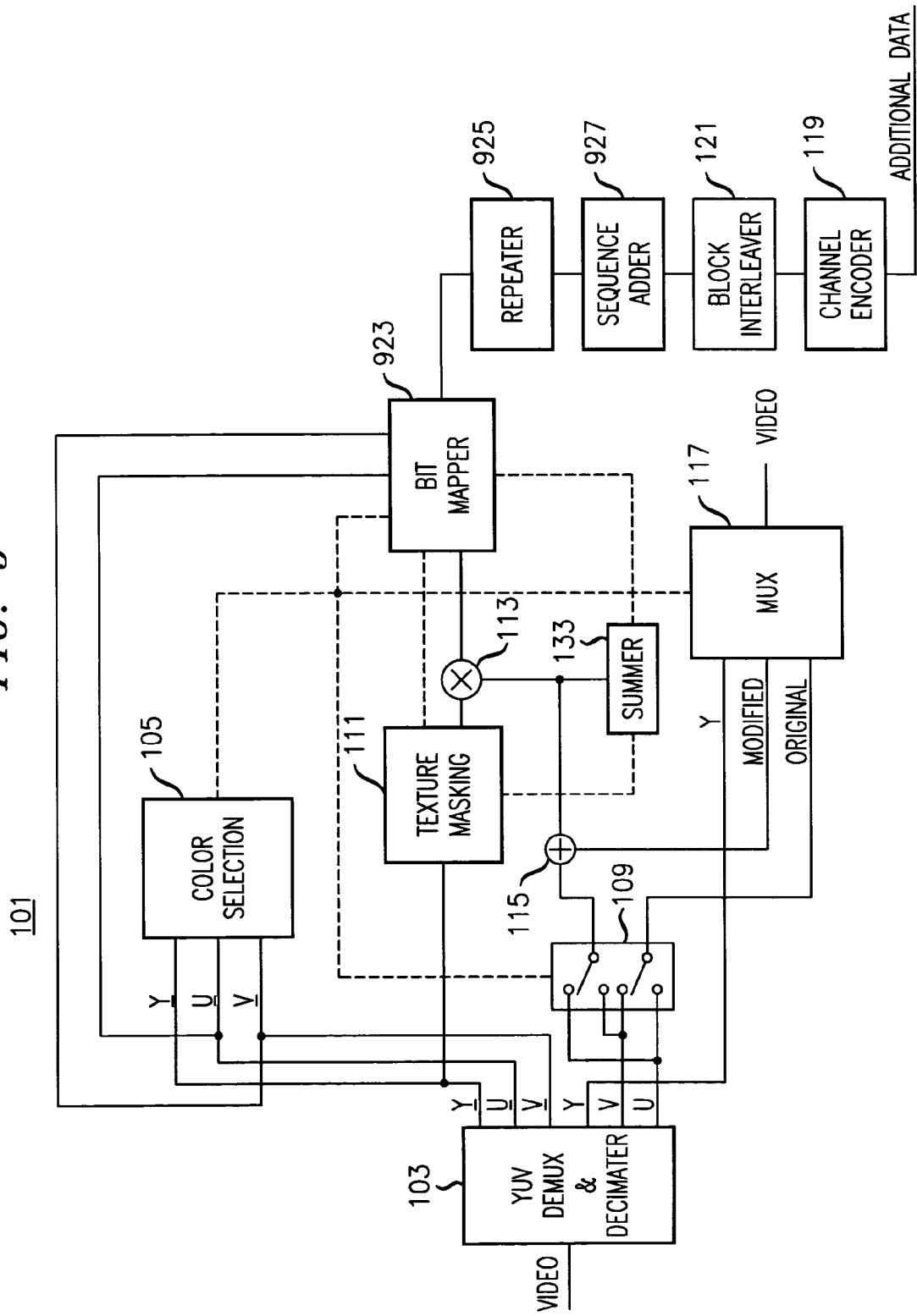
FIG. 9 shows an exemplary transmitter arranged in accordance with the principles of the invention, in which flickering may be reduced by replicating the data to be impressed, at least once, and preferably two or more times, prior to its being impressed upon the average value of a chrominance portion of a block.

FIG. 9 shows an exemplary transmitter arranged in accordance with the principles of the invention, and in which the flickering may be reduced by replicating the data to be impressed, at least once, and preferably two or more times, prior to its being impressed upon the average value of a chrominance portion of a block. The original and each replica are transmitted in the same block position of separate consecutive frames. Preferably, the frames having like-positioned blocks carrying the same data are consecutive in display order. Furthermore, specific blocks of the frame may be embedded with a particular known data sequence, e.g., a Barker sequence, rather than encoded user data.

The embodiment of the invention in FIG. 9 is similar to that of FIG. 1. All like-numbered elements of FIG. 9 operate substantially the same as in FIG. 1. In addition to those elements of FIG. 1 that are shown in FIG. 9 are repeater 925 and optional sequence adder 927. In addition, bit mapper 123 of FIG. 1 is optionally replaced in FIG. 9 by bit mapper 923. Replacement of bit mapper 123 by bit mapper 923 is necessary only if the additional functionality described hereinbelow in connection with bit mapper 923 is desired.

Repeater 925 receives bits either from block interleaver 121 or optional sequence adder 927. Repeater 925 stores the received bits and outputs them for like-positioned blocks of at least two frames. In one embodiment of the invention, it has been found that good results are achieved when repeater 925 stores the received bits and outputs them for the like-positioned blocks of three frames. Those of ordinary skill in the art will be able to trade-off any perceived flicker with desired throughput of the watermark data by choosing the number frames for which the data is repeated.

Optional sequence adder 927 embeds a particular known data sequence, e.g., a Barker sequence, in specific blocks of the frame, the data sequence being in lieu of encoded user data. The specific blocks in which the data sequence is encoded may be scattered throughout the blocks of a frame. Each group of initial and repeated data frames may employ a different known sequence. Doing so will enable the receiver to detect the grouping of the frames. Alternatively, the same sequence may be employed for each group but the specific blocks used for the sequence may be different for consecutive groups.

Figure 10:
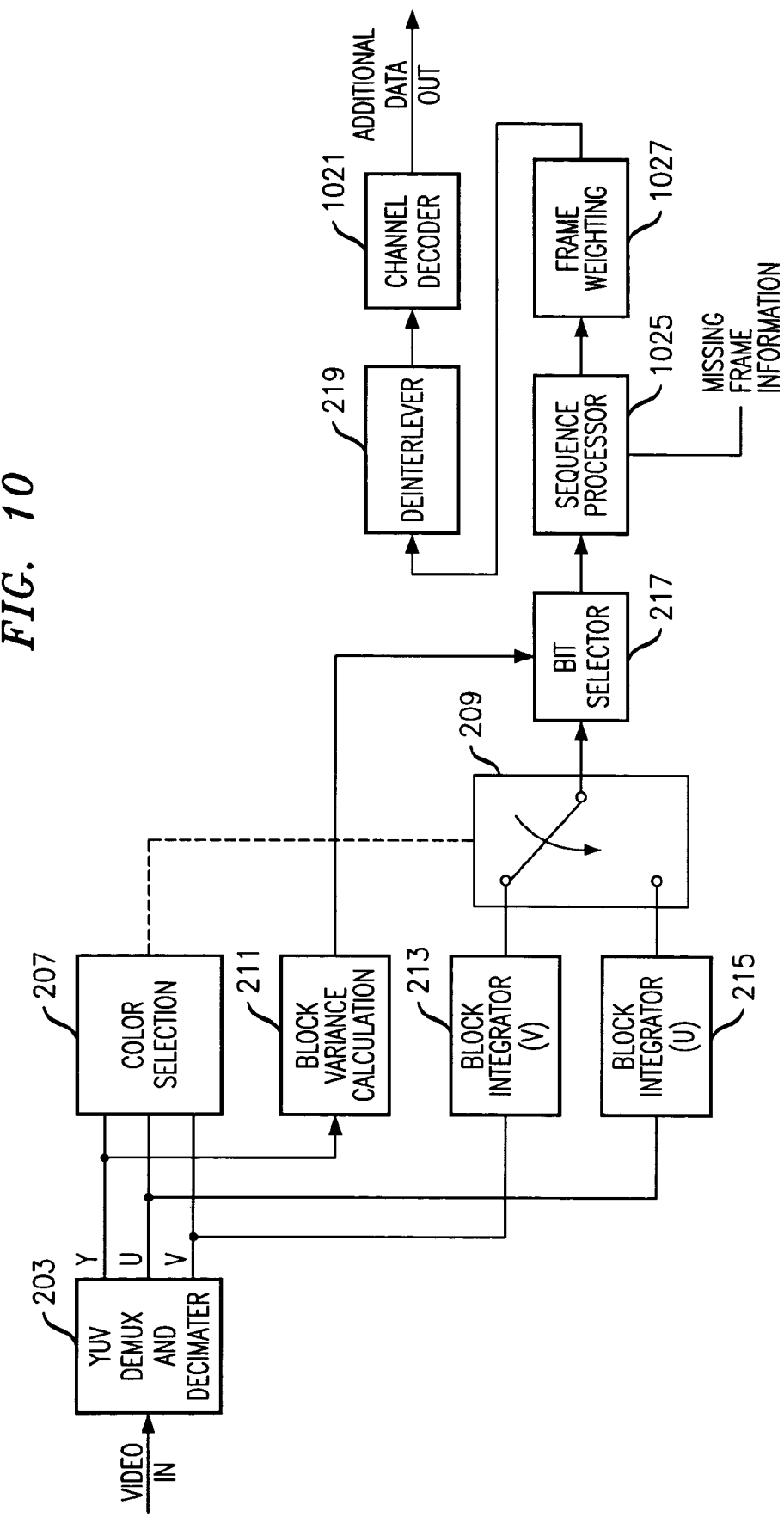
FIG. 10 shows an exemplary embodiment of a receiver arranged in accordance with the principles of the invention for use in receiving a watermarked video signal such as that produced by the transmitter of FIG. 9.

FIG. 10 shows an exemplary embodiment of a receiver arranged in accordance with the principles of the invention for use in receiving a watermarked video signal, such as that produced by the transmitter of FIG. 9. The embodiment of the invention in FIG. 10 is similar to that of FIG. 2. All like-numbered elements of FIG. 10 operate substantially the same as they do in FIG. 2. In addition to those elements of FIG. 2 there are shown in FIG. 10 sequence processor 1025 and frame weighting unit 1027. Furthermore, channel decoder 221 of FIG. 2 is optionally replaced in FIG. 10 by channel decoder 1021.

A receiver, e.g., as shown in FIG. 10, may detect group synchronization using sequence processor 1025. This may be performed by adding up the values of the group identification sequence from each frame of a group-length-number of consecutive frames, which thus are employed as a synchronization pattern, and determining if the result exceeds a prescribed threshold. If the threshold is exceeded, it is assumed that the first frame whose expected synchronization pattern value was added is the first frame in the group. If the threshold is not exceeded, it is assumed that the first frame whose value was added is not the first frame of a group. This is analogous to performing an autocorrelation on the synchronization pattern. Those of ordinary skill in the art will recognize that other conventional techniques for avoiding false matches, as well as handling missing the first frame due to errors, such as searching for a maximum prior to declaring group synchronization, may be employed.

Advantageously, once the receiver detects the regular group pattern, any time there is a deviation from the pattern the receiver will be able to recognize that a frame of the original video sequence has been removed. Such information may be supplied as an output by sequence processor 1025.

For example, various commercials of a vendor within a video signal may be monitored. The vendor may be assigned a unique code that is embedded in each frame of its commercial. A receiver is made aware of the particular unique code and which blocks of the watermarked frames should contain the code. By detecting the appearance of the code within watermarked frames, the receiver can identify a frame as being one that belongs to one of the commercials of the vendor. Once a frame with the code is detected, the number of sequential frames incorporating the code can be counted to determine the length of the commercial. If the number of frames counted is less than the anticipated number of frames based on the known length of the commercial when it was originally watermarked, it may be assumed that the commercial was inappropriately shortened by removing the number of frames that corresponds to the difference between the anticipated number of frames and the counted number of frames. Those of ordinary skill in the art will recognize that other conventional techniques for avoiding false matches, as well as handling missing the first frame due to errors, may be employed.

Each frame of the commercial, or groups of frames within the commercial, may be watermarked with a unique identifier, e.g., a frame or group number, which is part of a distinct sequence over the frame. When a gap in the expected sequence is detected due to one or more missing frames, the missing frames may be specifically identified when each frame has a unique identifier. When identifiers are assigned only to groups and the number of frames in each group is known, only the particular group to which any missing frames belongs may be identified, along with the count of how many frames are missing.

Although replication of the data may be employed to reduce flicker, as indicated hereinabove, doing so may limit the ability to detect missing frames to merely identifying the group from which the frame is missing, rather than being able to identify the particular frame. Therefore, although the watermark data is generally replicated, at least an individual frame identifier may not be replicated. The blocks containing such non-replicated frames are placed where they will be least likely to attract attention should they cause flickering, e.g., the corners of the frame. Doing so provides the majority of the benefit of reducing detectable flicker, while also allowing particular individual frames that are missing to be detected.

If a vendor has different commercials, each of the commercials may have a further sequence embedded in at least one of its frames to identify the particular commercial of that vendor that is being received.

Should multiple vendors have watermarked commercials, so long as each vendor is assigned a unique code, a system monitoring for the appearance of the commercials of a first vendor with a first unique code will ignore commercials of a second vendor with a second unique code. Alternatively, a single system may monitor a video signal for the appearance of commercials from different vendors that each have a unique code, and the results may be segregated by vendor based on their codes.

In another arrangement in which multiple vendors have watermarked commercials, each vendor employs the same code, and the code may even be at the same block locations within the frame for each vendor. However, all the subsequent data contained within the frame is encrypted using a unique key for each vendor and each vendor has a receiver that knows only the key for that vendor. Therefore, each vendor can only decrypt and receive data from its own commercials. In another arrangement, the data for each vendor may be encrypted by scrambling the data over the blocks of a frame. Each receiver would know only the scrambling pattern for its associated vendor.

Monitoring for an initial appearance of a code indicating the start of a commercial may be performed continuously, or within a window of time during which the commercial is expected to be broadcast.

In accordance with an aspect of the invention, instead of simply repeating the data over the multiple frames of a group and then using bit mapper 123 (FIG. 1), the amount added to the average value of a chrominance portion of a block, which depends on the complexity of the block and its anticipated quantization level, may be changed slightly from frame to frame over a group, even when the complexity of the block is the same at corresponding locations from frame to frame. The change that is made is small with respect to the value being added to the average to place the watermark bit within the average value. Such changes may be performed by bit mapper 923 (FIG. 9), thereby providing additional coding gain that may be advantageously employed to improve the reliability of the data at the receiver. However, doing so may cause a slight reduction in visual quality of low texture areas, because a few pixels within the block may have different values than their predecessors in the same location. However, because such reduction is at the pixel level, it is typically not noticeable.

In one arrangement, groups of three time-consecutive frames are transmitted with the same watermark data being impressed thereon. The middle frame of the group is watermarked as described above in connection with FIG. 3, without changing the amount added to the average value of the selected chrominance portion of the block from the value determined in FIG. 3.

The first-in-time frame of the group also has a value computed to be added, i.e., an offset bias, by bit mapper 923 (FIG. 9), to the average value of the selected chrominance portion of the block that is developed as described in connection with FIG. 3. However, the bias, e.g., one quarter or, preferably one half, of the absolute value of the value being added to the average to place the watermark bit within the average value, is additionally added to the computed average value of the chrominance portion selected to carry the watermark data. Thus, for example, if one is being added to the average value to place the watermark bit within the average value, then one half is added to the average value. This translates to adding 32 to the sum of the values of the selected chrominance portion of all the pixels of the block when there are 64 pixels in a block. Thus, summer 133 will received a higher value than it would have had the bias not been added. Similarly, as another example, if −4 is being added to the average value to place the watermark bit within the average value, if one half of the absolute value of the value added to the average value is employed, this translates to adding 128 to the sum of the values of the selected chrominance portion of all the pixels of the block when there are 64 pixels in a block.

Note that this additional bias amount, e.g., 32, will be distributed throughout the various pixels based on their luminance variances. Also, this addition of the bias is independent of any value added to the average to bring it with a safe range. As a result, the average value may fall outside of the safe range. However, the increase in error probability engendered by moving out of the safe range is more than offset by the resulting coding gain resulting from employing the bias.

The last-in-time frame of the group has a value computed to be subtracted, i.e., an offset bias, by bit mapper 923 (FIG. 9), from the average value of the selected chrominance portion of the block that is developed as described in connection with FIG. 3. However, the bias, e.g., one quarter or, preferably one half, of the absolute value of the value being added to the average to place the watermark bit within the average value, is additionally subtracted from the computed average value of the chrominance portion selected to carry the watermark data. Thus, for example, if −3 is being added to the average value to place the watermark bit within the average value, then one half of the absolute value of −3, i.e., 1.5, is subtracted from the average value. This translates to subtracting 96 from the sum of the values of the selected chrominance portion of all the pixels of the block when there are 64 pixels in a block. Thus, summer 133 will received a lower value than it would have had the bias not been subtracted. Similarly, as another example, if 2 is being added to the average value to place the watermark bit within the average value, then one half of the absolute value of 2, i.e., 1, is subtracted from the average value. This translates to subtracting 64 from the sum of the values of the selected chrominance portion of all the pixels of the block when there are 64 pixels in a block.

Note that the loss of the subtracted bias amount, e.g., 32, will be distributed throughout the various pixels based on their luminance variances. Further note that this subtraction of bias is independent of any value added to the average to bring it with a safe range. As a result, the average value may fall outside of the safe range. However, the increase in error probability engendered by moving out of the safe range is more than offset by the resulting coding gain.

One way to think about how this works is to look at FIG. 5. As described hereinabove, without considering the bias amount oftentimes just enough is added to, or subtracted from, the average value of the selected chrominance portion of a block in order to reach one of the outer borders of the safe range. Thus, prior to any bias, many frames are on or near the border of the safe range. The middle frame to which nothing is added or subtracted remains right on the border. The frame to which a slight bias is added may move slightly to be better positioned within the safe range, or it may move slightly out of the safe range. The frame from which a slight bias is subtracted moves in the opposite direction as the frame to which the bias is added. Thus, in the worst case, for a group of three frames one will be within the safe range, one will be on the border of the safe range, and one will be slightly out of the safe range. This results in an independent spread of values.

The effect of the bias may be further magnified because of the quantization that is performed by MPEG-like encoding and the separate MPEG-bias that is added during the MPEG dequantization. This can result in significant differences in the received data values for like-positioned blocks within consecutive frames even when the same bit is transmitted over those consecutive frames.

At the receiver, e.g., as shown in FIG. 10, the data extracted from each frame is weighted appropriately using maximum ratio combining based on a quality level that is believed to be present for each frame, e.g., in frame weighting unit 1027. To this end, sequence processor 1025 may supply to frame weighting unit 1027 a) frame synchronization information, so that frame weighting 1027 can know which frames are grouped together, and b) the number of errors in the synchronization pattern of each frame. The quality level is determined based on how many errors are believed to be in the received frame, which can be determined based on how many errors there are in the synchronization pattern that is expected for that frame, as extracted by sequence processor 1025. Table 1 shows a number of errors for each synchronization pattern and a respective weight that has been empirically derived to be appropriate for a frame with such a number of errors in its synchronization pattern. In other words, the values of the extracted data from each frame may be treated as soft data that is weighted by its associated weight as part of the combining process.

Based on the weights, the multiple instances of the same data bit for corresponding block locations in successive frames are extracted and combined to form a single received bit. This may be achieved by computing $$\text{bit\_out} = (2^n - 1)\frac{w_1 bit_1 + w_2 bit_2 + w_3 bit_3}{(w_1 + w_2 + w_3)},$$

where
  bit_out is the final output bit for the group of three frames;
  $W_1$, $W_2$, and $W_3$ are the weights for each of the first, second and third in time frames;
  $bit_1$, $bit_2$, and $bit_3$ are the bits from the like-positioned block of the first, second and third in time frames; and
  n is the number of bits that the soft decoder input precision.

To best make use of the soft information, channel decoder 1021 is a so-called soft decoder that employs soft data bits, i.e., data bits that are each represented as a non binary number the range of which depends on the soft decoder input precision. For example, an 8 bit input precision soft decoder operates with values between 0 and 255. To this end the weighted average of the received hard bits, $$\frac{w_1 bit_1 + w_2 bit_2 + w_3 bit_3}{(w_1 + w_2 + w_3)},$$

is multiplied by $2^n-1$, thereby converting the weighted average into a soft value of the appropriate precision that can be processed by the soft decoder.

When the determined quality of a particular frame is below a prescribed threshold, it may be assumed that the particular frame does not contain any watermarking data and no data is extracted for that frame.

Those of ordinary skill in the art will readily recognize that which frame has the value added, which has it subtracted and which has no change; whether addition and subtraction are both necessary; the number of frames in a group; and any rounding to be performed on the value to be added or subtracted or the resulting value are at the discretion of the implementer.

| Number of synchronization bit errors | Weight factor w |
| --- | --- |
| 0 | 1 |
| 1 | 0.9 |
| 2 | 0.8 |
| 3 | 0.7 |
| 4 | 0.6 |
| 5 | 0.5 |
| 6 | 0.4 |

What is claimed is:

1. A method performed by an apparatus for watermarking a video signal, the method comprising the step of:
automatically selecting a chrominance portion of a pixel of an image of a video signal to be watermarked, said video signal to be watermarked without changing its luminance, said selecting step employing a perception-based table that is independent of said image and indicates for each of at least a plurality of possible pixels in a colorspace which, if any, of the chrominance portions of said plurality of pixels in said colorspace should be selected for watermarking, said table being stored in a computer readable medium.

2. The invention as defined in claim 1 wherein said perception-based table indicates for each entry therein whether to watermark only a first chrominance portion or only a second chrominance portion.

3. The invention as defined in claim 1 wherein said perception-based table indicates for each entry therein whether to watermark a first chrominance portion, a second chrominance portion, or not to watermark at all.

4. The invention as defined in claim 1 wherein said perception-based table is in computer readable form.

5. The invention as defined in claim 1 wherein said perception-based table divides an entire colorspace into regions, at least one of said possible pixels within each said region, and said perception-based table supplies an indication for said pixel based on which region of said perception-based table said pixel falls.

6. The invention as defined in claim 1 wherein said pixel of said image is part of a digital video bitstream represented in YUV format and wherein said perception-based table indicates for any pixel that could possibly be in said image to watermark U or V as a function of the Y, U, and V values of said pixel.

7. The invention as defined in claim 1 wherein said pixel of said image is part of a digital video bitstream represented in YUV format, and wherein said selecting step is performed using only said YUV formatted digital bitstream directly and no other version of said digital bitstream formatted in any other format.

8. The invention as defined in claim 1 wherein said pixel of said image is part of a digital video bitstream represented using a first colorspace type representation, and wherein, said selecting step is performed using only a digital bitstream formatted in said first colorspace type representation directly and other colorspace type representation.

9. The invention as defined in claim 1 wherein said pixel of said image is a decimated pixel derived from an original digital video bitstream.

10. The invention as defined in claim 1 wherein said pixel of said image is a decimated pixel derived from an original digital video bitstream represented in YUV format.

11. The invention as defined in claim 1 wherein said pixel of said image is a quantized pixel derived from an original digital video bitstream.

12. The invention as defined in claim 1 wherein said pixel of said image is a quantized pixel derived from an original digital video bitstream represented in YUV format.

13. The invention as defined in claim 1 wherein said perception-based table contains information to indicate which, if any, of the chrominance portions should be selected for watermarking for every possible pixel value of the entirety of said colorspace.

14. The invention as defined in claim 1 wherein said perception-based table contains information to indicate which, if any, of the chrominance portions should be selected for watermarking for each possible pixel of only a prescribed portion of said colorspace, and wherein said selecting step further comprises the step of determining that pixel of said image is within said prescribed portion of said colorspace for which said perception-based table contains information.

15. The invention as defined in claim 1 wherein said perception-based table contains information to indicate which, if any, of the chrominance portions should be selected for watermarking for each possible pixel of only a portion of said colorspace, and wherein said method further comprises the steps of:
determining that pixel of said image is not within said portion of said colorspace for which said perception-based table contains information; and
determining which, if any, of the chrominance portions should be selected for watermarking for said pixel of said image, as a computed function of at least one value of said pixel.

16. The invention as defined in claim 1 wherein a chrominance portion of said pixel of said image is watermarked by having its value changed to represent the conveyance of additional data other than the original value of said chrominance portion.

17. Apparatus for supplying an indication as to which chrominance portion of a pixel an image of a video signal, if any, is better suited to be altered so as to carry additional watermark information without changing said pixel's luminance, said apparatus comprising a perception-based table in a computer readable media for at least a portion of the possible pixel colorspace, said table being independent of said image, said table specifying for pixels that are within said portion of said colorspace the chrominance portion to be indicated by said apparatus.

18. The invention as defined in claim 17 further comprising a computation unit for indicating for a pixel of said image that is not within said portion of said colorspace which chrominance portion is to be indicated based on at least a value of one of said chrominance portions of said pixel of said image.

19. The invention as defined in claim 17 wherein said chrominance portion is better suited to be altered when altering said chrominance portion will produce less, if any, visible artifact than altering any other chrominance portion of said pixel of said image.

20. A method for that is performed by an apparatus for detecting watermark data that was added to a video signal, the method comprising the step of:
automatically selecting a chrominance portion of a pixel of an image of a video signal, said video signal having been watermarked without changing its luminance, said selecting step employing a perception-based table that is independent of said image and which indicates for each of at least a plurality of possible pixels in a colorspace which, if any, of the chrominance portions most likely had watermark data added thereto, said table being stored in a computer readable medium.

21. Apparatus for selecting a chrominance portion of a pixel of an image of a video signal to be watermarked, said apparatus comprising a perception-based table in a computer readable medium that indicates for each of at least a plurality of possible pixels in at least a portion of a colorspace which if any, of the chrominance portions would be least likely to introduce a visible artifact should watermark data be added thereto, said video signal to be watermarked without changing its luminance.

22. Apparatus for selecting a chrominance portion of a pixel of an image of a video signal to be watermarked so that there are effectively no changes to a luminance of said video signal, said apparatus comprising:
a computer readable store containing a perception-based table that is independent of said image and which indicates for each of at least a plurality of possible pixels in at least a portion of a colorspace which, if any, of the chrominance portions should be selected for watermarking; and
means for accessing said store to determine which chrominance portion, if any, to select, when said pixel of said image to be watermarked is one of said pixels in said portion of said colorspace.

23. The invention as defined in claim 22 further comprising means for computing as a function of a least one value of said pixel of said image which, if any, of the chrominance portions should be selected for watermarking, said means for computing operating only when said pixel is not one of said pixels in said portion of said colorspace.

24. Apparatus for selecting a chrominance portion of a pixel of an image of a video signal, said video signal having been watermarked without changing its luminance, said apparatus comprising:
a computer readable store containing a perception-based table that is independent of said image and which indicates for each of at least a plurality of possible pixels in at least a portion of a colorspace which, if any, of the chrominance portions most likely had watermarking data added thereto; and
means for accessing said store to determine which chrominance portion, if any, to select, when said pixel is one of said pixels in said portion of said colorspace.

25. Apparatus in a receiver for selecting a chrominance portion of a pixel of an image of a video signal that may have been watermarked in a transmitter, said video signal having been watermarked so as not to change its luminance, the apparatus comprising:
a computer readable store containing a perception-based table that is independent of said image and which indicates for each of at least a plurality of possible pixels in at least a portion of a colorspace which, if any, of the chrominance portions was most likely selected to be watermarked; and
means for accessing said store to determine which chrominance portion, if any, to select, when said pixel of said image is within said portion of said colorspace.

26. A method performed by an apparatus for watermarking a video signal, the method comprising the step of:
automatically selecting at most one chrominance portion of a pixel of an image of a video signal to be watermarked by adding thereto additional information, said selecting step employing a perception-based table that is independent of (i) said image and (ii) said additional information, said table indicating for each of at least a plurality of possible pixels in a colorspace which one, if any, of the chrominance portions of said plurality of pixels in said colorspace should be selected to have said additional information added thereto, said table being stored in a computer readable medium.

27. Apparatus for supplying an indication as to which chrominance portion of a pixel an image of a video signal, if any, is better suited to be altered so as to carry additional watermark information, said apparatus comprising a perception-based table in a computer readable media for at least a portion of the possible pixel colorspace, said table being independent of (i) said image and (ii) said additional watermark information, said table specifying for pixels that are within said portion of said colorspace the chrominance portion to be indicated by said apparatus.

28. A method that is performed by an apparatus for detecting watermark information that was added to a video signal, the method comprising the step of:
automatically selecting a chrominance pardon of a pixel of an image of a video signal, said video signal having been watermarked with watermark information, said selecting step employing a perception-based table that is independent of (i) said image and (ii) said watermark information and which indicates for each of at least a plurality of possible pixels in a colorspace which, if any, of the chrominance portions most likely had watermark information added thereto, said table being stored in a computer readable medium.

29. Apparatus for selecting a chrominance portion of a pixel of an image of a video signal to be watermarked by adding thereto additional information, said apparatus comprising a perception-based table in a computer readable medium that is independent of (i) said image and (ii) said additional information and which indicates for each of at least a plurality of possible pixels in at least a portion of a colorspace which, if any, of the chrominance portions would be least likely to introduce a visible artifact should watermark data be added thereto.

30. A method that is performed by an apparatus for detecting watermark data that was added to a video signal, the method comprising the step of:

automatically selecting a chrominance portion of a pixel of an image of a video signal that had watermark data added thereto, said selecting step employing a perception-based table that is independent of (i) said image and (ii) said watermark data and which indicates for each of at least a plurality of possible pixels in a colorspace which, if any, of the chrominance portions most likely had watermark data added thereto, said table being stored in a computer readable medium.

31. A method performed by an apparatus for watermarking a video signal, the method comprising the step of:
automatically selecting no more than one chrominance portion of a pixel of an image of a video signal to be watermarked, said selecting step employing a perception-based table that is independent of said image and indicates for each of at least a plurality of possible pixels in a colorspace which, if any, of the chrominance portions of said plurality of pixels in said colorspace should be selected for watermarking, said table being stored in a computer readable medium.

32. Apparatus for supplying an indication as to only one of which, if any, chrominance portion of a pixel an image of a video signal, is better suited to be altered so as to carry additional watermark information, said apparatus comprising a perception-based table in a computer readable media for at least a portion of the possible pixel colorspace, said table being independent of said image, said table specifying for pixels that are within said portion of said colorspace the particular no more than one chrominance portion to be indicated by said apparatus.

33. A method for that is performed by an apparatus for detecting watermark data that was added to a video signal, the method comprising the step of:
automatically selecting no more than one of a chrominance portion of a pixel of an image of a video signal, said video signal having been watermarked, said selecting step employing a perception-based table that is independent of said image and which indicates for each of at least a plurality of possible pixels in a colorspace which, if any, of the chrominance portions most likely had said watermark data added thereto, said table being stored in a computer readable medium.

34. Apparatus for selecting no more than one chrominance portion of a pixel of an image of a video signal to be watermarked, said apparatus comprising a perception-based table in a computer readable medium that indicates for each of at least a plurality of possible pixels in at least a portion of a colorspace which, if any, of the chrominance portions would be least likely to introduce a visible artifact should watermark data be added thereto.

* * * * *

UNITED STATES PATENT AND TRADEMARK OFFICE
CERTIFICATE OF CORRECTION

PATENT NO. : 7,630,509 B2
APPLICATION NO. : 10/673893
DATED : December 8, 2009
INVENTOR(S) : Mohammad Hossein Zarrabizadeh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1508 days.

Signed and Sealed this

Twenty-first Day of December, 2010

David J. Kappos
*Director of the United States Patent and Trademark Office*